US012694007B2

(12) United States Patent
Bendre et al.

(10) Patent No.: US 12,694,007 B2
(45) Date of Patent: Jul. 28, 2026

(54) DISTRIBUTED BICLIQUE QUANTIFICATION FOR LARGE-SCALE BIPARTITE GRAPHS

(71) Applicant: Visa International Service Association, San Francisco, CA (US)

(72) Inventors: Mangesh Bendre, Sunnyvale, CA (US); Yuxin Tang, Houston, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 18/637,309

(22) Filed: Apr. 16, 2024

(65) Prior Publication Data

US 2025/0321942 A1 Oct. 16, 2025

(51) Int. Cl.
*G06F 16/00* (2019.01)
*G06F 16/22* (2019.01)
*G06F 16/242* (2019.01)

(52) U.S. Cl.
CPC ........ *G06F 16/221* (2019.01); *G06F 16/2433* (2019.01)

(58) Field of Classification Search
CPC .......................... G06F 16/221; G06F 16/2433
See application file for complete search history.

(56) References Cited

U.S. PATENT DOCUMENTS

2017/0316111 A1* 11/2017 Turner ................ G06F 16/9024
2021/0004864 A1* 1/2021 Daub .................. G06F 16/2255

FOREIGN PATENT DOCUMENTS

CN 114048207 A 2/2022

OTHER PUBLICATIONS

Seyed-Vahid Sanei-Mehri et al; Butterfly Counting in Bipartite Networks;Aug. 19-23, 2018; https://doi.org/10.1145/3219819.3220097 (Year: 2018).*
"Efficient Way to Select All Pairs of Vertices that Share Common Neighbors in a Bipartite Network", Available online at: https://stackoverflow.com/questions/38338351/efficient-way-to-select-all-pairs-of-vertices-that-share-common-neighbors-in-a-b, Jul. 13, 2016, 3 pages.

(Continued)

*Primary Examiner* — Alex Gofman
*Assistant Examiner* — Suman Rajaputra
(74) *Attorney, Agent, or Firm* — Kilpatrick Townsend & Stockton LLP

(57) ABSTRACT

Methods and systems for quantifying interactions between data objects in databases based on bipartite graph analysis are disclosed, particularly related to the identification, counting, and enumeration of 2×2-bicliques, also referred to as "butterflies." A computer system (which can comprise, e.g., a distributed computing system comprising multiple distributed computing nodes) can enumerate through pairs of vertices that are common neighbors to other vertices in a bipartite graph. Based on these pairs of neighbor vertices, the computer system can count 2×2-bicliques, including counting the total number of 2×2-bicliques, the number of 2×2-bicliques per vertex in the bipartite graph, and the number of 2×2-bicliques per edge in the bipartite graph. Additionally, methods according to embodiments can be used to enumerate and list all 2×2-bicliques in a bipartite graph.

20 Claims, 25 Drawing Sheets

(56)     References Cited

OTHER PUBLICATIONS

Sheshbolouki et al., "sGrapp: Butterfly Approximation in Streaming Graphs", Available Online at: https://arxiv.org/abs/2101.12334, Feb. 3, 2021, 29 pages.

Sayed-Vahid, et al., "Butterfly Counting in Bipartite Networks" In Proceedings of the 24th ACM SIGKDD International Conference on Knowledge Discovery & Data Mining (London, United Kingdom) (KDD '18), Association for Computing Machinery, New York, NY USA, 2150-2159, https://doi.org/10.1146/3219819. 3220097, 10 pages.

Kai Wang, et al. "Butterfly Counting the Large-Scale Bipartite Networks", Proc. VLDB Endow, 12, 10 (Jun. 2019), 1139-1152, https://doi.org/10/14778/339490.3339497, 14 pages.

Zhibin Wang, et al., Efficient Counting at Scale., Proc. ACM Manag. Data 1, 1, Article 34 (Mar. 2023), https://doi.org./10.1148/2688714, 27 pages.

* cited by examiner

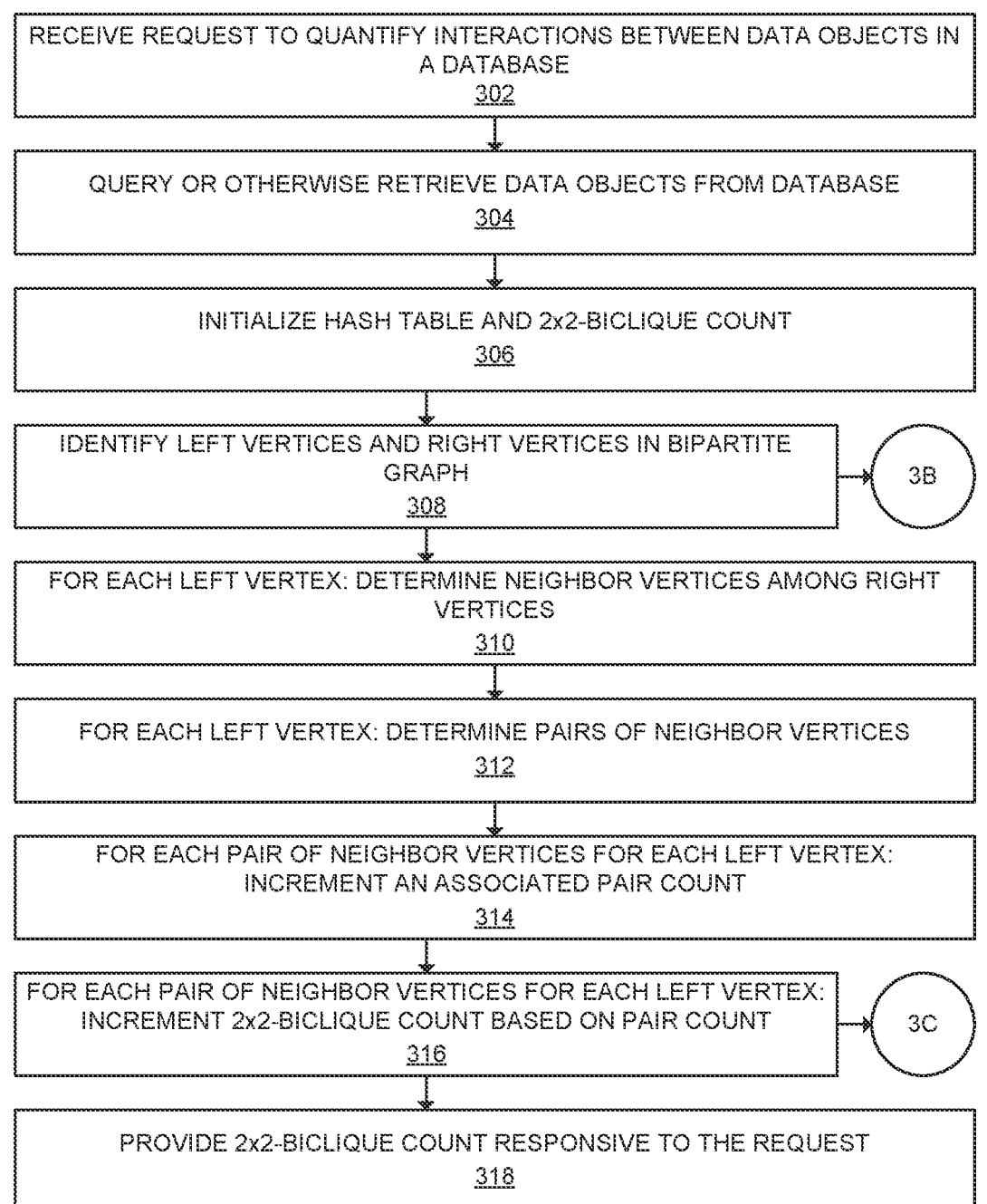

RECEIVE REQUEST TO QUANTIFY INTERACTIONS BETWEEN DATA OBJECTS IN A DATABASE
302

QUERY OR OTHERWISE RETRIEVE DATA OBJECTS FROM DATABASE
304

INITIALIZE HASH TABLE AND 2x2-BICLIQUE COUNT
306

IDENTIFY LEFT VERTICES AND RIGHT VERTICES IN BIPARTITE GRAPH
308

3B

FOR EACH LEFT VERTEX: DETERMINE NEIGHBOR VERTICES AMONG RIGHT VERTICES
310

FOR EACH LEFT VERTEX: DETERMINE PAIRS OF NEIGHBOR VERTICES
312

FOR EACH PAIR OF NEIGHBOR VERTICES FOR EACH LEFT VERTEX: INCREMENT AN ASSOCIATED PAIR COUNT
314

FOR EACH PAIR OF NEIGHBOR VERTICES FOR EACH LEFT VERTEX: INCREMENT 2x2-BICLIQUE COUNT BASED ON PAIR COUNT
316

3C

PROVIDE 2x2-BICLIQUE COUNT RESPONSIVE TO THE REQUEST
318

*FIG. 3A*

IDENTIFY FIRST VERTICES AND SECOND VERTICES IN BIPARTITE
GRAPH
320

DETERMINE FIRST SUM OF DEGREE SQUARED CORRESPONDING TO FIRST
VERTICES
322

DETERMINE SECOND SUM OF DEGREE SQUARED CORRESPONDING TO
SECOND VERTICES
324

IDENTIFY THE PLURALITY OF LEFT VERTICES BY COMPARING THE FIRST SUM
OF DEGREE SQUARED TO THE SECOND SUM OF DEGREE SQUARED
326

DETERMINE WHETHER THE PAIR COUNT IS GREATER THAN ONE
328

DETERMINE CURRENT VALUE OF THE 2x2-BICLIQUE COUNT
330

ADD PAIR COUNT TO CURRENT VALUE OF 2x2-BICLIQUE COUNT AND
SUBTRACT 1
332

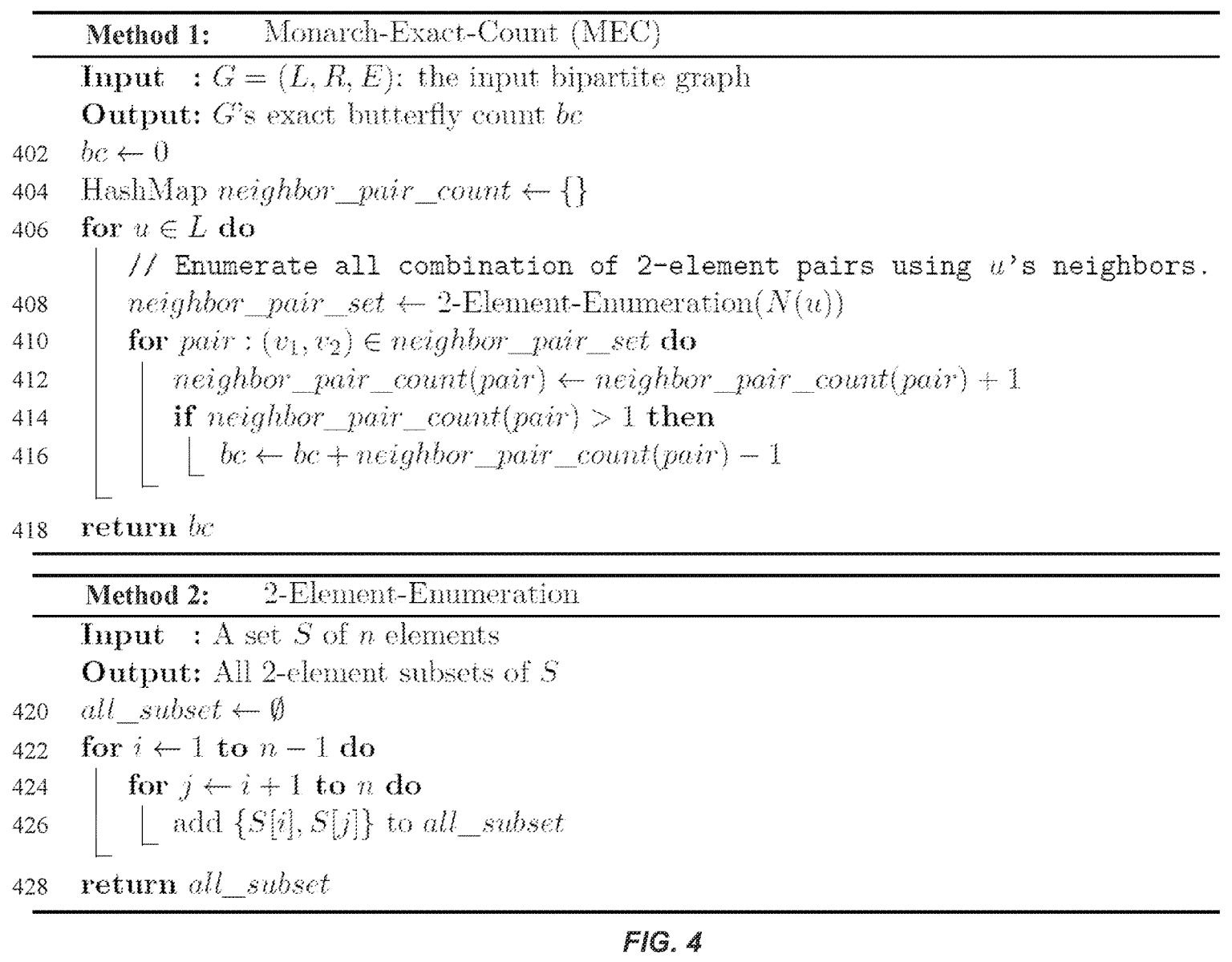

Method 1:    Monarch-Exact-Count (MEC)

Input : $G = (L, R, E)$: the input bipartite graph

Output: $G$'s exact butterfly count $bc$

402    $bc \leftarrow 0$

404    HashMap $neighbor\_pair\_count \leftarrow \{\}$

406    for $u \in L$ do

// Enumerate all combination of 2-element pairs using $u$'s neighbors.

408       $neighbor\_pair\_set \leftarrow$ 2-Element-Enumeration$(N(u))$

410       for $pair : (v_1, v_2) \in neighbor\_pair\_set$ do

412          $neighbor\_pair\_count(pair) \leftarrow neighbor\_pair\_count(pair) + 1$ 414          if $neighbor\_pair\_count(pair) > 1$ then

416             $bc \leftarrow bc + neighbor\_pair\_count(pair) - 1$

418    return $bc$

Method 2:    2-Element-Enumeration

Input : A set $S$ of $n$ elements

Output: All 2-element subsets of $S$

420    $all\_subset \leftarrow \emptyset$

422    for $i \leftarrow 1$ to $n - 1$ do

424       for $j \leftarrow i + 1$ to $n$ do

426          add $\{S[i], S[j]\}$ to $all\_subset$

428    return $all\_subset$

*FIG. 4*

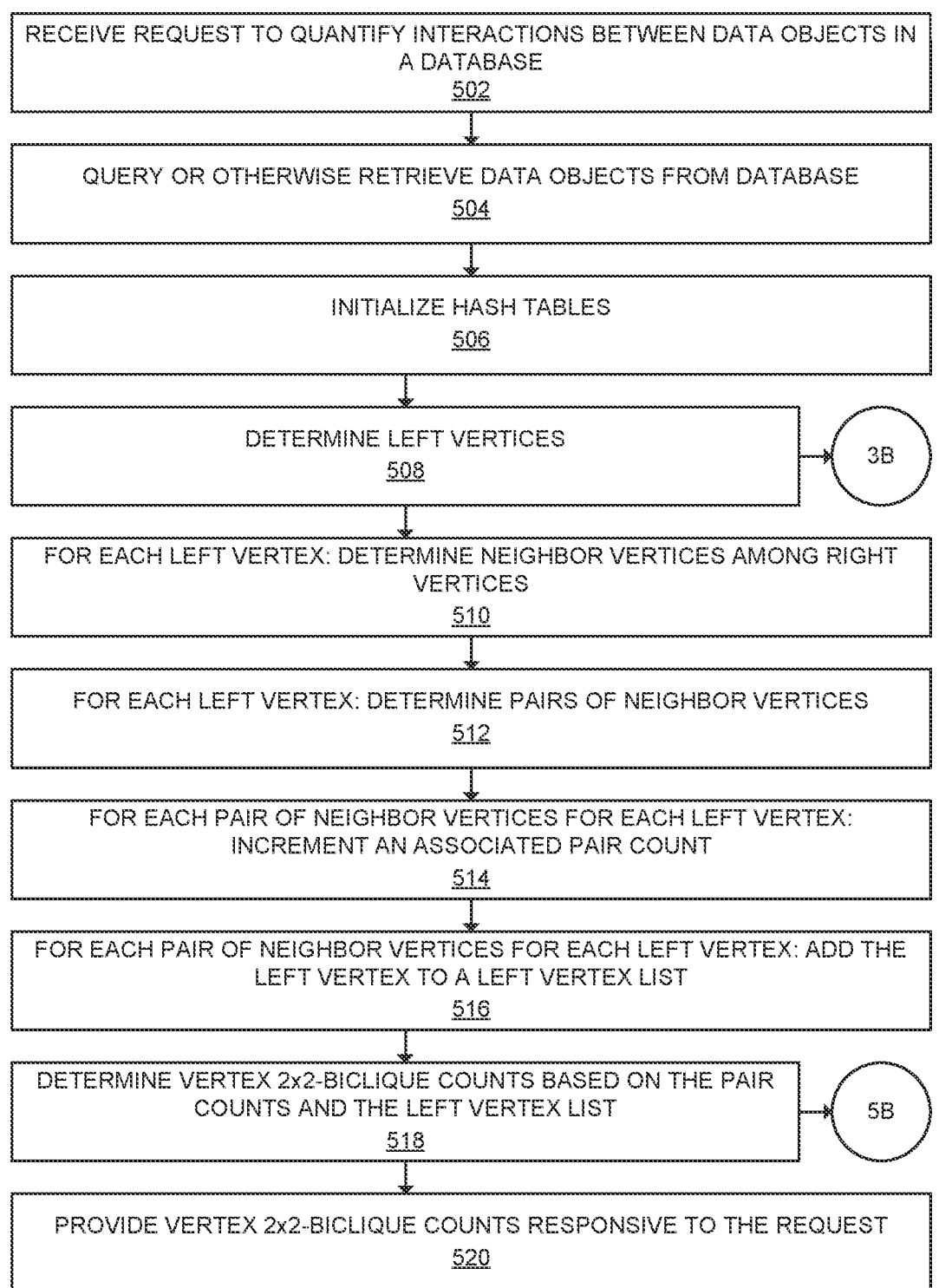

RECEIVE REQUEST TO QUANTIFY INTERACTIONS BETWEEN DATA OBJECTS IN A DATABASE
502

QUERY OR OTHERWISE RETRIEVE DATA OBJECTS FROM DATABASE
504

INITIALIZE HASH TABLES
506

DETERMINE LEFT VERTICES
508

3B

FOR EACH LEFT VERTEX: DETERMINE NEIGHBOR VERTICES AMONG RIGHT VERTICES
510

FOR EACH LEFT VERTEX: DETERMINE PAIRS OF NEIGHBOR VERTICES
512

FOR EACH PAIR OF NEIGHBOR VERTICES FOR EACH LEFT VERTEX: INCREMENT AN ASSOCIATED PAIR COUNT
514

FOR EACH PAIR OF NEIGHBOR VERTICES FOR EACH LEFT VERTEX: ADD THE LEFT VERTEX TO A LEFT VERTEX LIST
516

DETERMINE VERTEX 2x2-BICLIQUE COUNTS BASED ON THE PAIR COUNTS AND THE LEFT VERTEX LIST
518

5B

PROVIDE VERTEX 2x2-BICLIQUE COUNTS RESPONSIVE TO THE REQUEST
520

*FIG. 5A*

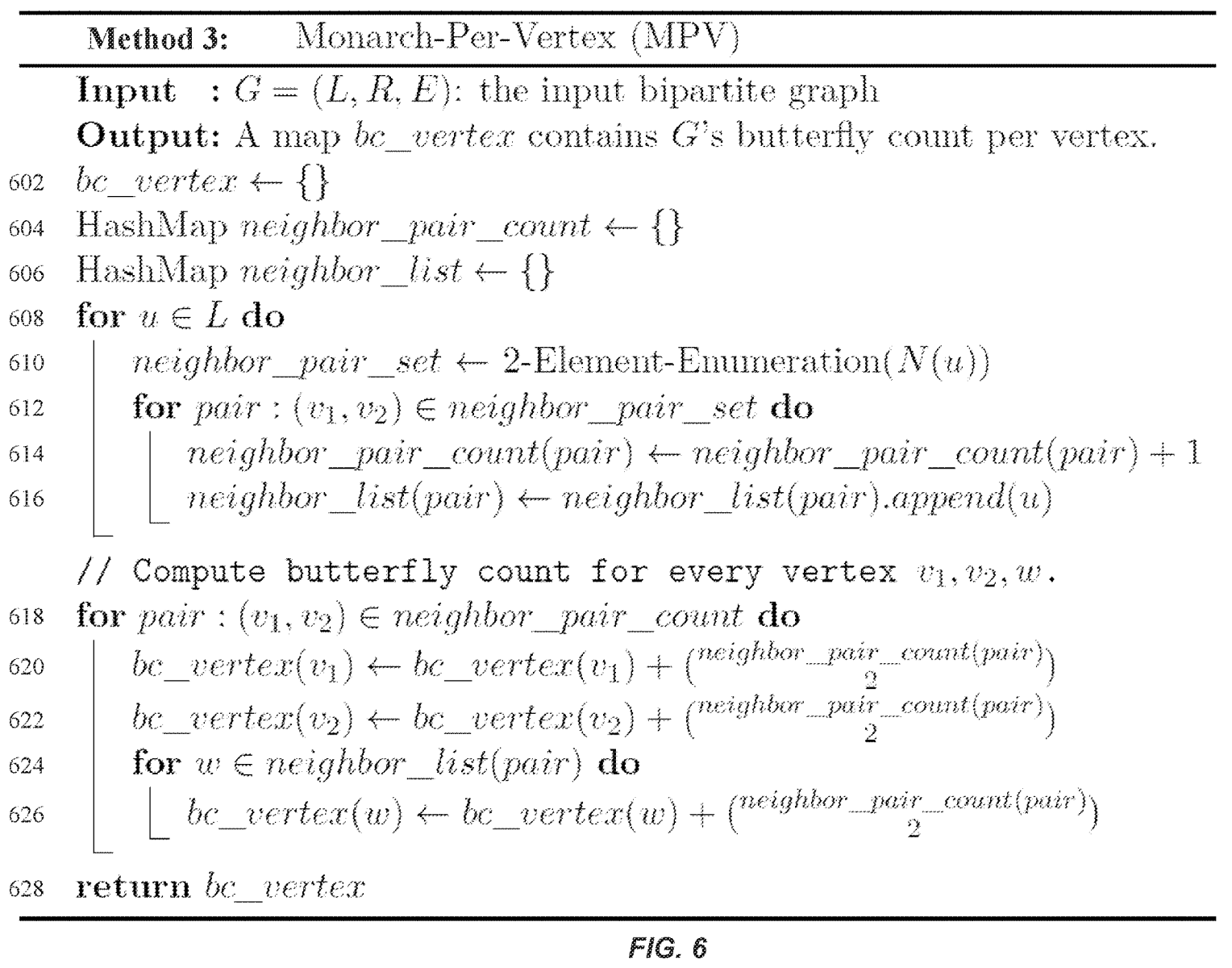

Method 3:    Monarch-Per-Vertex (MPV)

Input : $G = (L, R, E)$: the input bipartite graph
Output: A map $bc\_vertex$ contains $G$'s butterfly count per vertex.

602   $bc\_vertex \leftarrow \{\}$
604   HashMap $neighbor\_pair\_count \leftarrow \{\}$
606   HashMap $neighbor\_list \leftarrow \{\}$
608   for $u \in L$ do
610     $neighbor\_pair\_set \leftarrow$ 2-Element-Enumeration$(N(u))$
612     for $pair : (v_1, v_2) \in neighbor\_pair\_set$ do
614       $neighbor\_pair\_count(pair) \leftarrow neighbor\_pair\_count(pair) + 1$
616       $neighbor\_list(pair) \leftarrow neighbor\_list(pair).append(u)$ 618   // Compute butterfly count for every vertex $v_1, v_2, w$.
    for $pair : (v_1, v_2) \in neighbor\_pair\_count$ do
620     $bc\_vertex(v_1) \leftarrow bc\_vertex(v_1) + \binom{neighbor\_pair\_count(pair)}{2}$
622     $bc\_vertex(v_2) \leftarrow bc\_vertex(v_2) + \binom{neighbor\_pair\_count(pair)}{2}$
624     for $w \in neighbor\_list(pair)$ do
626       $bc\_vertex(w) \leftarrow bc\_vertex(w) + \binom{neighbor\_pair\_count(pair)}{2}$ 628   return $bc\_vertex$

*FIG. 6*

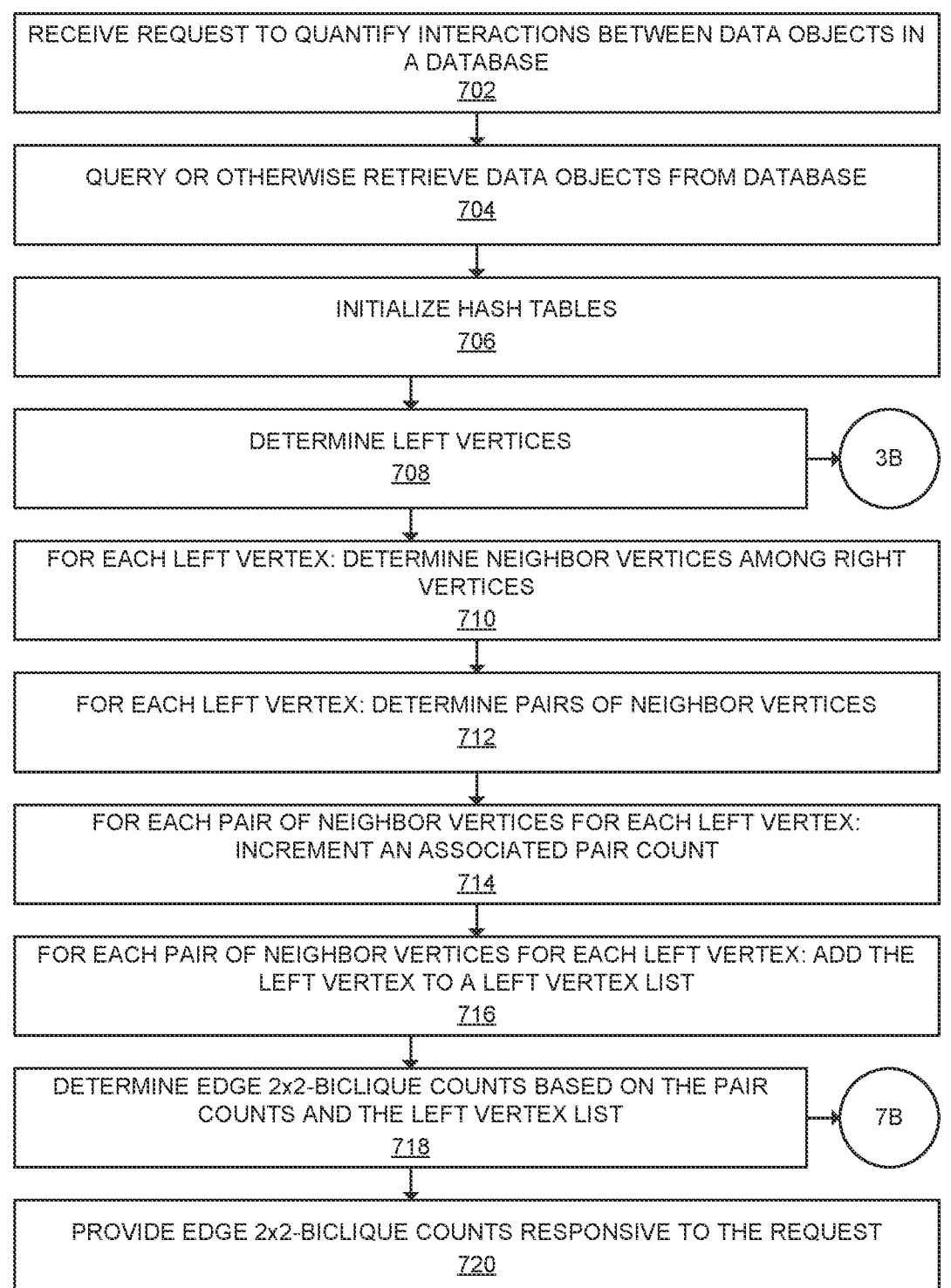

RECEIVE REQUEST TO QUANTIFY INTERACTIONS BETWEEN DATA OBJECTS IN A DATABASE
702

QUERY OR OTHERWISE RETRIEVE DATA OBJECTS FROM DATABASE
704

INITIALIZE HASH TABLES
706

DETERMINE LEFT VERTICES
708

3B

FOR EACH LEFT VERTEX: DETERMINE NEIGHBOR VERTICES AMONG RIGHT VERTICES
710

FOR EACH LEFT VERTEX: DETERMINE PAIRS OF NEIGHBOR VERTICES
712

FOR EACH PAIR OF NEIGHBOR VERTICES FOR EACH LEFT VERTEX: INCREMENT AN ASSOCIATED PAIR COUNT
714

FOR EACH PAIR OF NEIGHBOR VERTICES FOR EACH LEFT VERTEX: ADD THE LEFT VERTEX TO A LEFT VERTEX LIST
716

DETERMINE EDGE 2x2-BICLIQUE COUNTS BASED ON THE PAIR COUNTS AND THE LEFT VERTEX LIST
718

7B

PROVIDE EDGE 2x2-BICLIQUE COUNTS RESPONSIVE TO THE REQUEST
720

*FIG. 7A*

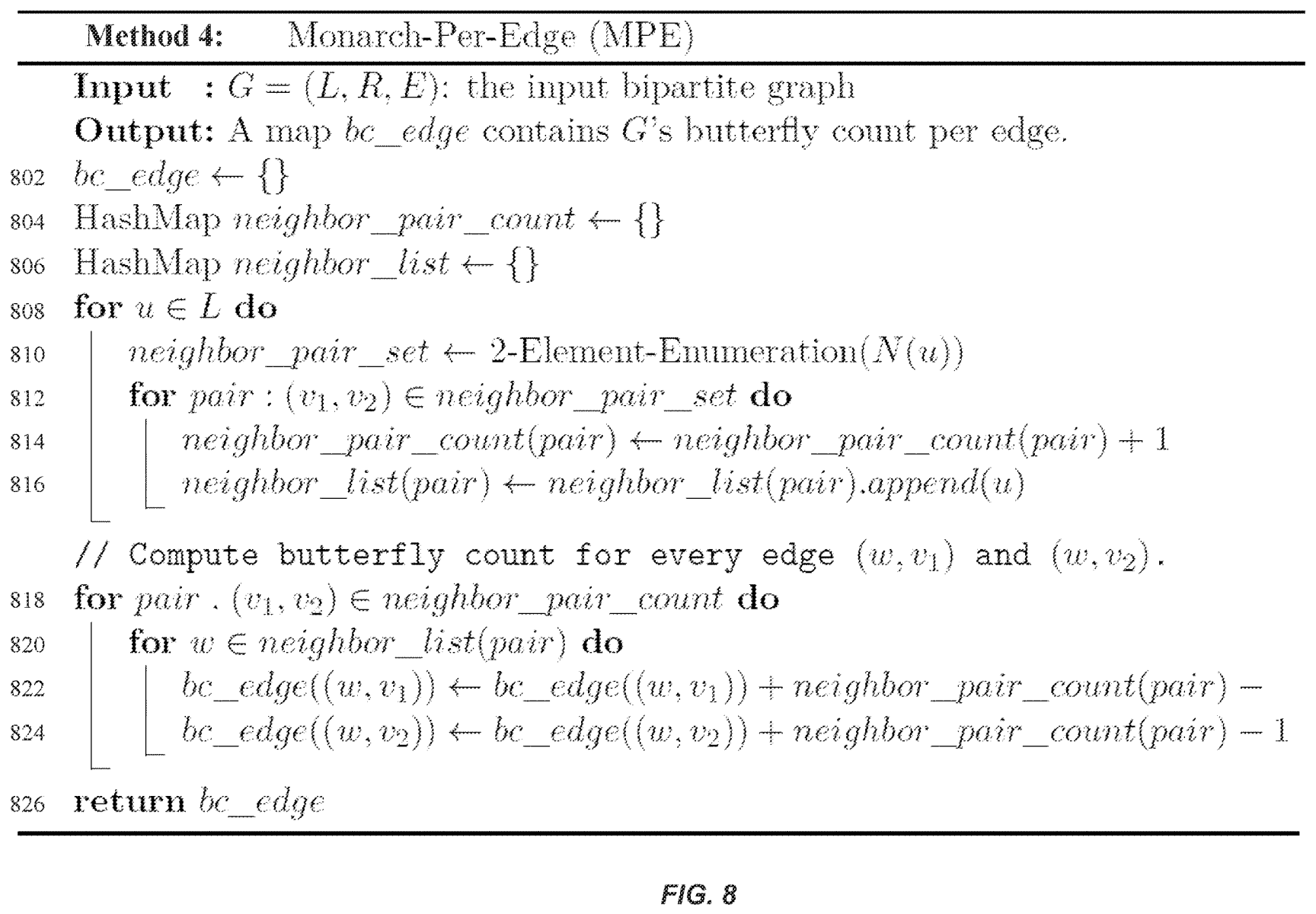

Method 4: Monarch-Per-Edge (MPE)

Input : $G = (L, R, E)$: the input bipartite graph

Output: A map $bc\_edge$ contains $G$'s butterfly count per edge.

802  $bc\_edge \leftarrow \{\}$

804  HashMap $neighbor\_pair\_count \leftarrow \{\}$

806  HashMap $neighbor\_list \leftarrow \{\}$

808  for $u \in L$ do

810  $\quad neighbor\_pair\_set \leftarrow$ 2-Element-Enumeration($N(u)$)

812  $\quad$ for $pair : (v_1, v_2) \in neighbor\_pair\_set$ do

814  $\quad\quad neighbor\_pair\_count(pair) \leftarrow neighbor\_pair\_count(pair) + 1$ 816  $\quad\quad neighbor\_list(pair) \leftarrow neighbor\_list(pair).append(u)$ 818  // Compute butterfly count for every edge $(w, v_1)$ and $(w, v_2)$.

818  for $pair : (v_1, v_2) \in neighbor\_pair\_count$ do

820  $\quad$ for $w \in neighbor\_list(pair)$ do

822  $\quad\quad bc\_edge((w, v_1)) \leftarrow bc\_edge((w, v_1)) + neighbor\_pair\_count(pair) - 1$ 824  $\quad\quad bc\_edge((w, v_2)) \leftarrow bc\_edge((w, v_2)) + neighbor\_pair\_count(pair) - 1$ 826  return $bc\_edge$

*FIG. 8*

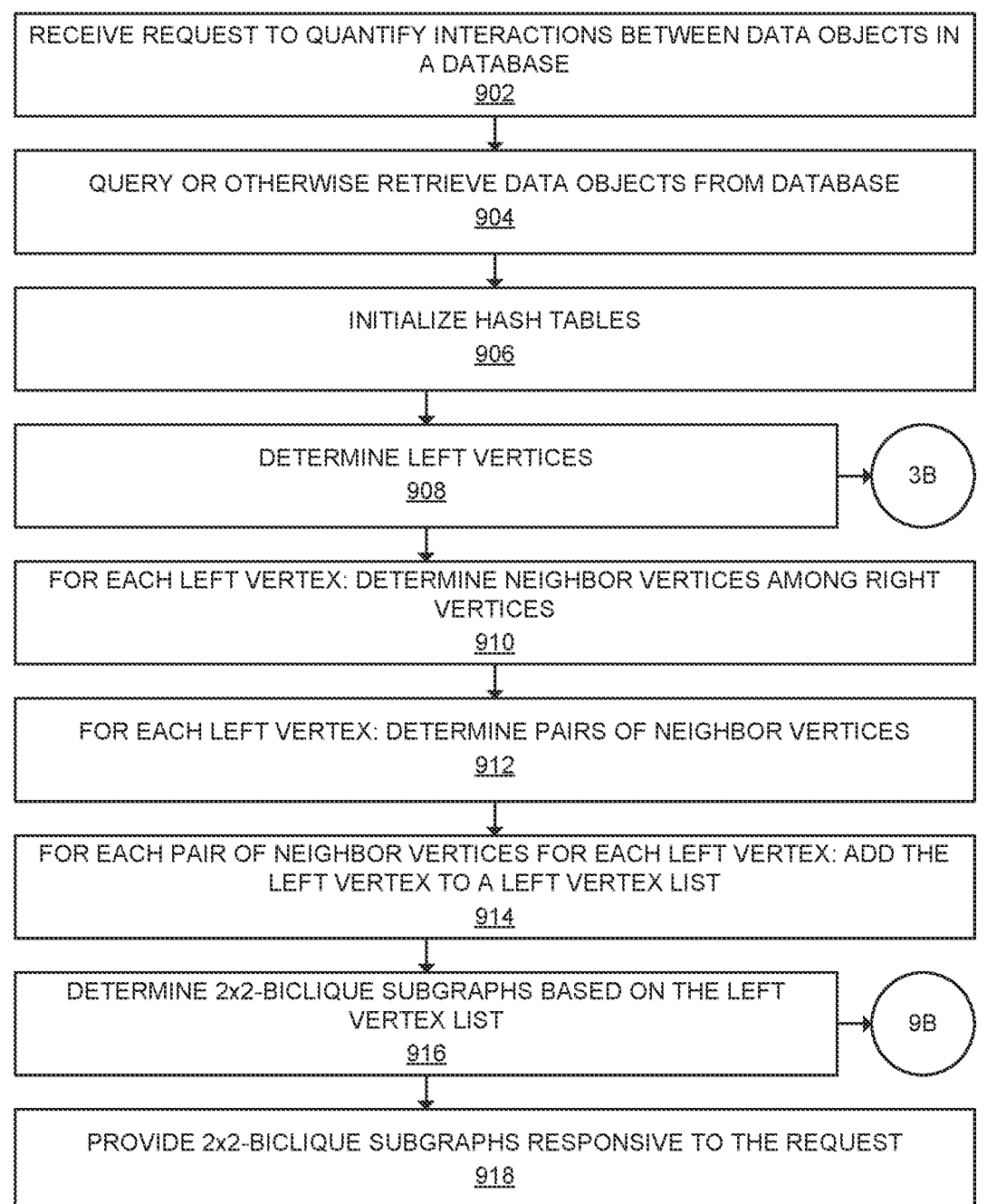

RECEIVE REQUEST TO QUANTIFY INTERACTIONS BETWEEN DATA OBJECTS IN A DATABASE
902

QUERY OR OTHERWISE RETRIEVE DATA OBJECTS FROM DATABASE
904

INITIALIZE HASH TABLES
906

DETERMINE LEFT VERTICES
908

3B

FOR EACH LEFT VERTEX: DETERMINE NEIGHBOR VERTICES AMONG RIGHT VERTICES
910

FOR EACH LEFT VERTEX: DETERMINE PAIRS OF NEIGHBOR VERTICES
912

FOR EACH PAIR OF NEIGHBOR VERTICES FOR EACH LEFT VERTEX: ADD THE LEFT VERTEX TO A LEFT VERTEX LIST
914

DETERMINE 2x2-BICLIQUE SUBGRAPHS BASED ON THE LEFT VERTEX LIST
916

9B

PROVIDE 2x2-BICLIQUE SUBGRAPHS RESPONSIVE TO THE REQUEST
918

*FIG. 9A*

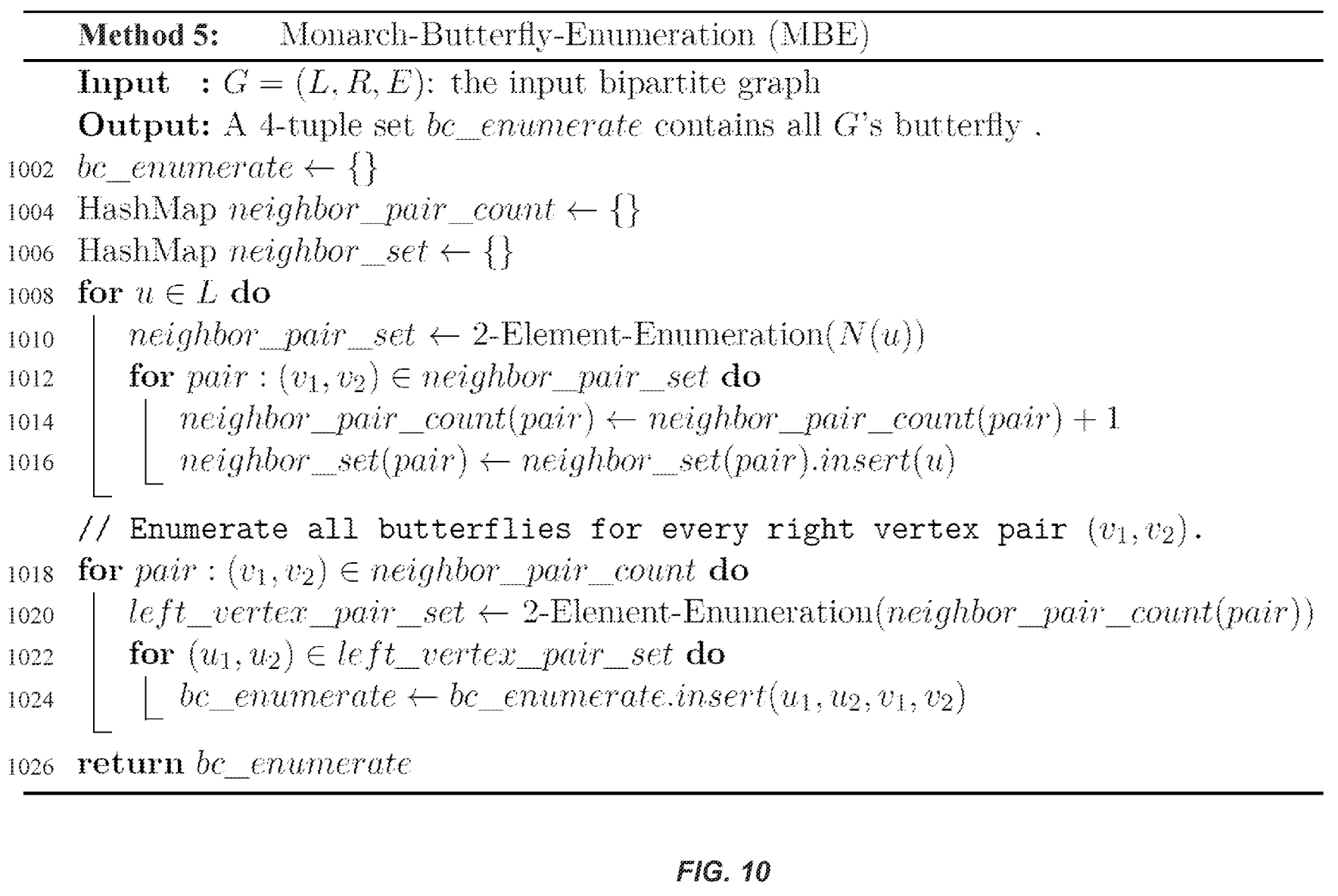

Method 5: Monarch-Butterfly-Enumeration (MBE)

Input : $G = (L, R, E)$: the input bipartite graph

Output: A 4-tuple set $bc\_enumerate$ contains all $G$'s butterfly .

1002 $bc\_enumerate \leftarrow \{\}$

1004 HashMap $neighbor\_pair\_count \leftarrow \{\}$

1006 HashMap $neighbor\_set \leftarrow \{\}$

1008 for $u \in L$ do

1010      $neighbor\_pair\_set \leftarrow$ 2-Element-Enumeration($N(u)$)

1012      for $pair : (v_1, v_2) \in neighbor\_pair\_set$ do

1014          $neighbor\_pair\_count(pair) \leftarrow neighbor\_pair\_count(pair) + 1$ 1016          $neighbor\_set(pair) \leftarrow neighbor\_set(pair).insert(u)$ // Enumerate all butterflies for every right vertex pair $(v_1, v_2)$ .

1018 for $pair : (v_1, v_2) \in neighbor\_pair\_count$ do

1020      $left\_vertex\_pair\_set \leftarrow$ 2-Element-Enumeration($neighbor\_pair\_count(pair)$)

1022      for $(u_1, u_2) \in left\_vertex\_pair\_set$ do

1024          $bc\_enumerate \leftarrow bc\_enumerate.insert(u_1, u_2, v_1, v_2)$ 1026 return $bc\_enumerate$

*FIG. 10*

```
1102  SELECT SUM(neighbor_size*(neighbor_size-1)/2) FROM
1104    (SELECT type21, type22, COUNT(DISTINCT type1) AS neighbor_size FROM
1106      (SELECT d1.type1 AS type1, d1.type2 AS type21, d2.type2 AS type22
1108       FROM dataset AS d1 Join dataset AS d2
1110       WHERE d1.type1=d2.type1 and d1.type2 < d2.type2)
1112     GROUP BY type21, type22)
```

RELATIONAL IMPLEMENTATION OF MONARCH-EXACT-COUNT

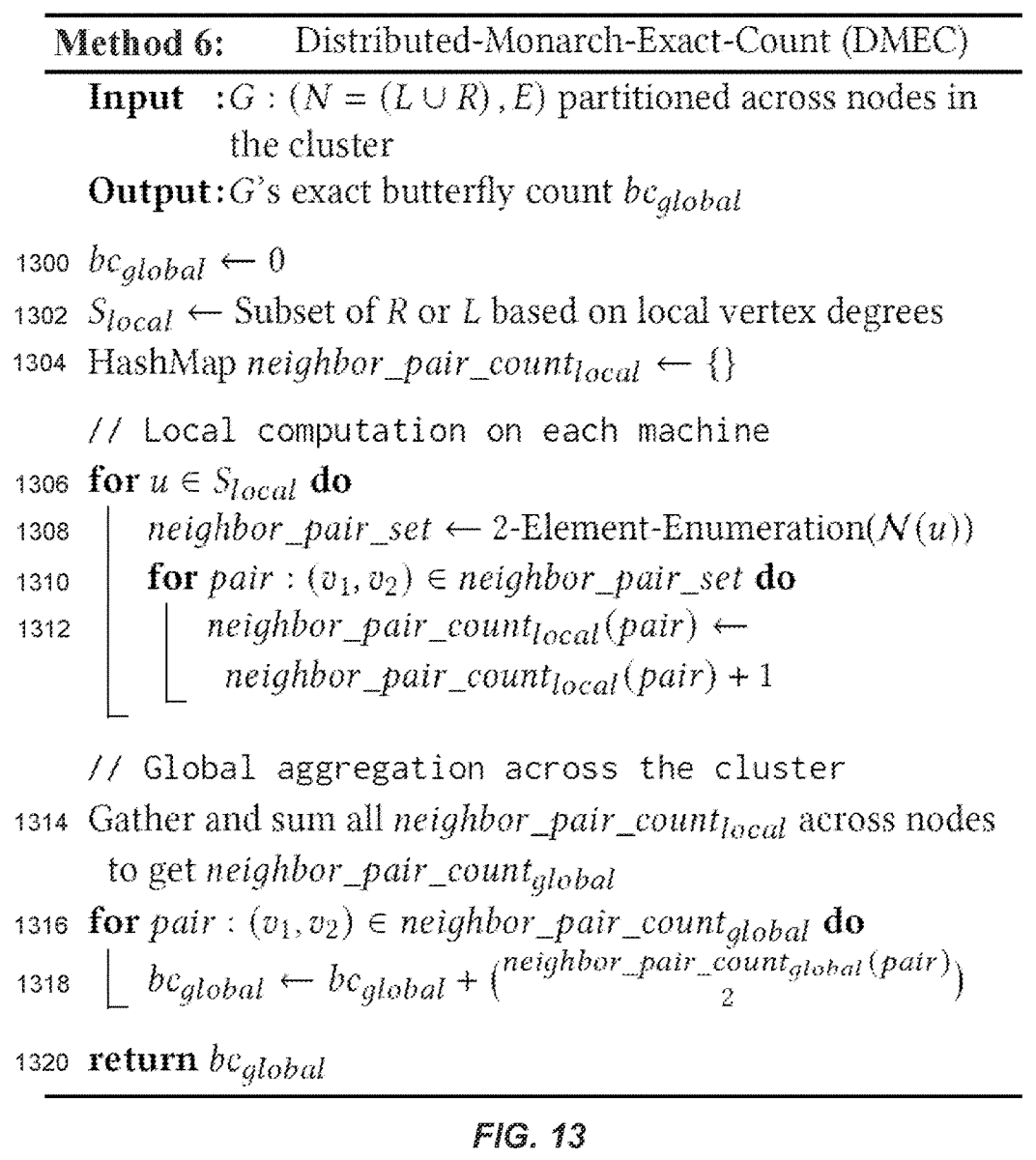

Method 6: Distributed-Monarch-Exact-Count (DMEC)

Input : $G$ : ($N = (L \cup R), E$) partitioned across nodes in the cluster

Output: $G$'s exact butterfly count $bc_{global}$

1300 $bc_{global} \leftarrow 0$

1302 $S_{local} \leftarrow$ Subset of $R$ or $L$ based on local vertex degrees

1304 HashMap $neighbor\_pair\_count_{local} \leftarrow \{\}$

// Local computation on each machine

1306 for $u \in S_{local}$ do

1308     $neighbor\_pair\_set \leftarrow$ 2-Element-Enumeration($\mathcal{N}(u)$)

1310     for $pair$ : $(v_1, v_2) \in neighbor\_pair\_set$ do

1312        $neighbor\_pair\_count_{local}(pair) \leftarrow$   $neighbor\_pair\_count_{local}(pair) + 1$ // Global aggregation across the cluster 1314 Gather and sum all $neighbor\_pair\_count_{local}$ across nodes to get $neighbor\_pair\_count_{global}$ 1316 for $pair$ : $(v_1, v_2) \in neighbor\_pair\_count_{global}$ do

1318     $bc_{global} \leftarrow bc_{global} + \left( \dfrac{neighbor\_pair\_count_{global}(pair)}{2} \right)$ 1320 return $bc_{global}$

*FIG. 13*

| Methods | Time Complexity | Space Complexity |
|---|---|---|
| BFC-BS[18, 26] | $O\left(\sum_{v\in L} d(v)^2\right)$ | $O(m)$ |
| BFC-IBS[18] | $O\left(\min\left\{\sum_{u\in L} d(u)^2, \sum_{v\in R} d(v)^2\right\}\right)$ | $O(m)$ |
| BFC-VP[27] | $O\left(\sum_{(u,v)\in E} \min\{d(u), d(v)\}\right)$ | $O(m)$ |
| Monarch-Exact-Count | $O\left(\min\left\{\sum_{u\in L} d(u)^2, \sum_{v\in R} d(v)^2\right\}\right)$ | $O(n^2)$ |

TABLE 1: TIME COMPLEXITY AND SPACE COMPLEXITY FOR DIFFERENT EXACT BUTTERFLY COUNTING METHODS

*FIG. 14*

| Dataset | Category | \|L\| | \|R\| | \|E\| | Wedges |
|---|---|---|---|---|---|
| actor-movie | affiliation network | 127,823 | 383,640 | 1,470,404 | 39,482,206 |
| dbtropes-feature | feature network | 64,415 | 87,678 | 3,232,134 | 1,494,276,935 |
| flickr | affiliation network | 395,979 | 103,631 | 8,545,307 | 9,755,612,929 |
| komarix-citeseer | authorship network | 105,353 | 181,395 | 512,267 | 6,600,745 |
| komarix-imdb | affiliation network | 685,568 | 186,414 | 2,715,604 | 86,342,427 |
| wiki-en-cat | feature network | 1,853,493 | 182,947 | 3,795,796 | 898,164,591 |
| bookcrossing_rating | rating network | 77,802 | 185,955 | 433,652 | 80,944,469 |
| dblp-author | authorship network | 1,953,085 | 5,624,219 | 12,282,059 | 320,739,707 |
| dbpedia-occupation | affiliation network | 127,577 | 101,730 | 250,945 | 335,154,441 |
| dbpedia-producer | authorship network | 48,833 | 138,844 | 207,268 | 4,461,275 |
| dbpedia-recordlabel | affiliation network | 168,337 | 18,421 | 233,286 | 144,874,235 |
| dbpedia-team | affiliation network | 901,166 | 34,461 | 1,366,466 | 336,279,376 |
| dbpedia-writer | authorship network | 89,356 | 46,213 | 144,340 | 1,125,315 |
| github | authorship network | 56,519 | 120,867 | 440,237 | 53,048,506 |
| livejournal | affiliation network | 3,201,203 | 7,489,073 | 112,307,385 | 2,703,813,727,685 |
| orkut | affiliation network | 2,783,196 | 8,730,857 | 327,037,487 | 2,528,039,357,274 |
| trackers-trackers | hyperlink network | 27,665,730 | 12,756,244 | 140,613,762 | 106,441,673,202,003 |

TABLE 2: CHARACTERISTICS OF BIPARTITE NETWORKS

FIG. 15

| Datasets | Execution Time (s) | | | |
|---|---|---|---|---|
| | 1 node | 2 nodes | 4 nodes | 8 nodes |
| actor-movie | 17.668 | 9.243 | 5.494 | 3.850 |
| dbtropes-feature | 202.628 | 108.287 | 59.857 | 38.176 |
| flickr | 283.561 | 145.415 | 89.698 | 58.896 |
| komarix-citeseer | 2.016 | 1.033 | 0.630 | 0.383 |
| komarix-imdb | 2.231 | 1.197 | 0.693 | 0.495 |
| wiki-en-cat | 4.071 | 2.263 | 1.191 | 0.799 |
| bookcrossing_rating | 297.781 | 160.629 | 89.832 | 65.090 |
| dblp-author | 140.998 | 78.487 | 42.413 | 31.608 |
| dbpedia-occupation | 3.066 | 1.617 | 0.934 | 0.578 |
| dbpedia-producer | 4.009 | 2.194 | 1.265 | 0.760 |
| dbpedia-recordlabel | 1.528 | 0.838 | 0.495 | 0.320 |
| dbpedia-team | 2.009 | 1.118 | 0.625 | 0.385 |
| dbpedia-writer | 1.397 | 0.776 | 0.430 | 0.281 |
| github | 4.507 | 2.326 | 1.483 | 0.944 |
| livejournal | 2145.177 | 1190.306 | 689.779 | 470.497 |
| orkut | 4352.157 | 2227.964 | 1402.765 | 930.499 |
| trackers-trackers | 1879.128 | 993.107 | 574.892 | 403.058 |

TABLE 3: RUNNING TIME FOR TOTAL BUTTERFLY COUNTING ON DIFFERENT BIPARTITE GRAPHS ON DISTRIBUTED CLUSTER

*FIG. 16*

| Datasets | Execution Time (s) | | | |
| --- | --- | --- | --- | --- |
| | 1 node | 2 nodes | 4 nodes | 8 nodes |
| actor-movie | 23.26 | 12.077 | 6.83 | 4.399 |
| dbtropes-feature | 264.656 | 146.132 | 79.691 | 57.122 |
| flickr | 389.523 | 203.505 | 117.776 | 84.626 |
| komarix-citeseer | 2.672 | 1.381 | 0.845 | 0.495 |
| komarix-imdb | 2.881 | 1.512 | 0.938 | 0.613 |
| wiki-en-cat | 5.685 | 3.035 | 1.841 | 1.124 |
| bookcrossing_rating | 376.214 | 201.998 | 113.359 | 81.464 |
| dblp-author | 201.247 | 105.625 | 63.353 | 38.652 |
| dbpedia-occupation | 4.223 | 2.232 | 1.225 | 0.900 |
| dbpedia-producer | 5.122 | 2.799 | 1.6 | 1.073 |
| dbpedia-recordlabel | 1.931 | 1.01 | 0.573 | 0.416 |
| dbpedia-team | 2.514 | 1.301 | 0.801 | 0.514 |
| dbpedia-writer | 1.751 | 0.947 | 0.556 | 0.351 |
| github | 6.439 | 3.379 | 1.925 | 1.2003 |
| livejournal | 2672.811 | 1485.368 | 802.598 | 510.663 |
| orkut | 6027.308 | 3341.82 | 1869.889 | 1179.531 |
| trackers-trackers | 2583.899 | 1331.831 | 835.397 | 571.098 |

TABLE 4: RUNNING TIME FOR BUTTERFLY PER VERTEX COUNTING IN DIFFERENT BIPARTITE GRAPHS ON DISTRIBUTED CLUSTER

*FIG. 17*

| Datasets | Execution Time (s) | | | |
|---|---|---|---|---|
| | 1 node | 2 nodes | 4 nodes | 8 nodes |
| *actor–movie* | 24.497 | 12.815 | 8.04 | 4.772 |
| *dbtropes–feature* | 279.84 | 145.016 | 81.45 | 59.291 |
| *flickr* | 409.372 | 211.034 | 123.547 | 78.902 |
| *komarix–citeseer* | 2.913 | 1.558 | 0.906 | 0.647 |
| *komarix–imdb* | 3.038 | 1.589 | 0.956 | 0.615 |
| *wiki–en–cat* | 5.97 | 3.116 | 1.922 | 1.174 |
| *bookcrossing_rating* | 397.059 | 207.324 | 130.317 | 80.366 |
| *dblp–author* | 209.116 | 109.45 | 64.262 | 46.283 |
| *dbpedia–occupation* | 4.438 | 2.275 | 1.413 | 0.906 |
| *dbpedia–producer* | 5.402 | 2.848 | 1.653 | 1.151 |
| *dbpedia–recordlabel* | 2.038 | 1.085 | 0.643 | 0.45 |
| *dbpedia–team* | 2.755 | 1.534 | 0.902 | 0.573 |
| *dbpedia–writer* | 1.849 | 1.027 | 0.563 | 0.403 |
| *github* | 6.755 | 3.632 | 2.105 | 1.449 |
| *livejournal* | 2822.973 | 1443.72 | 825.613 | 567.022 |
| *orkut* | 6331.959 | 3359.655 | 1907.415 | 1336.743 |
| *trackers–trackers* | 2735.438 | 1466.495 | 855.118 | 567.205 |

TABLE 5: RUNNING TIME FOR BUTTERFLY PER EDGE COUNTING IN DIFFERENT BIPARTITE GRAPHS ON DISTRIBUTED CLUSTER

*FIG. 18*

| Datasets | Execution Time (s) | | | |
|---|---|---|---|---|
| | 1 node | 2 nodes | 4 nodes | 8 nodes |
| actor-movie | 27.127 | 14.697 | 8.204 | 6.029 |
| dbtropes-feature | 284.918 | 147.545 | 84.163 | 56.426 |
| flickr | 417.879 | 223.909 | 130.989 | 93.67 |
| komarix-citeseer | 2.874 | 1.558 | 0.886 | 0.548 |
| komarix-imdb | 3.105 | 1.701 | 0.983 | 0.641 |
| wiki-en-cat | 6.192 | 3.45 | 2.001 | 1.198 |
| bookcrossing_rating | 405.992 | 220.716 | 118.611 | 90.785 |
| dblp-author | 215.346 | 111.045 | 65.951 | 40.001 |
| dbpedia-occupation | 4.63 | 2.496 | 1.369 | 1.016 |
| dbpedia-producer | 6.122 | 3.289 | 1.779 | 1.15 |
| dbpedia-recordlabel | 2.584 | 1.156 | 0.645 | 0.43 |
| dbpedia-team | 2.715 | 1.442 | 0.809 | 0.537 |
| dbpedia-writer | 2.321 | 0.991 | 0.633 | 0.387 |
| github | 6.9 | 3.591 | 2.058 | 1.462 |
| livejournal | 2887.328 | 1559.886 | 871.92 | 639.937 |
| orkut | 6462.524 | 3502.436 | 2023.772 | 1443.099 |
| trackers-trackers | 2771.812 | 1424.42 | 900.876 | 548.057 |

TABLE 6: RUNNING TIME FOR BUTTERFLY ENUMERATION IN DIFFERENT BIPARTITE GRAPHS ON DISTRIBUTED CLUSTER

*FIG. 19*

DISTRIBUTED BICLIQUE QUANTIFICATION FOR LARGE-SCALE BIPARTITE GRAPHS

BACKGROUND

Many forms of analysis can be performed using graphical analysis on graphical models of real-world phenomena. In a graphical model, objects, concepts, entities, or other things can be represented as "nodes" or "vertices" and the relationships between those things can be represented by edges connecting those nodes. For example, in biology, a "food web" diagram (a form of graph) can comprise nodes corresponding to animals, plants, and other living organisms. Directed edges in a food web can correspond to the predator-prey relationships between those living organisms.

When real-world systems are represented by graphs, such systems can be analyzed using graph analysis techniques, e.g., in order to find structures or "subgraphs" within such graphs that may have significance to corresponding real-world systems. For example, analyzing the degree (e.g., the number of edges connected to a particular node) of organism nodes in a food web can help determine which nodes are highly connected. These highly connected nodes could correspond to organisms that important to a given ecosystem, and could be used to, e.g., prioritize conservation efforts. As another example, in financial systems, large numbers of repeated transactions between small groups of individuals or other entities may evidence money laundering. As such, using graph analysis techniques to detect cycles in a financial transaction graph may be useful for detecting instances of money laundering.

Many graph analysis methods are performed using computer systems, as they are often infeasible to perform by hand even for relatively small graphs or simple graph analysis methods. However, for large-scale graphs, e.g., comprising billions of nodes, even advanced computing systems may be inadequate for performing graph analysis. This is because the time it takes to perform many graph analysis methods scales non-linearly (e.g., exponentially) with the number of nodes and/or edges in a graph. As such graph analysis method that may be completed in a practical amount of time for e.g., a graph comprising one hundred thousand nodes may take e.g., millions of years to complete for a graph comprising one hundred million nodes.

Parallel computing is one technique that can be used to reduce the amount of computation time associated with graph analysis methods. By dividing a graph analysis task among multiple computer systems, those computer systems can complete that graph analysis task more quickly than a single computer system performing graph analysis alone. However, many graph analysis methods cannot easily be parallelized. Further, even if a graph analysis method can be parallelized, for sufficiently large and complex graphs, parallel computing may be inadequate, as it may be impossible for even a very large distributed computing system to complete graph analysis in a reasonable amount of time.

Embodiments address these and other problems, individually and collectively.

SUMMARY

Embodiments of the present disclosure are directed to methods and systems for quantifying 2×2-biclique subgraphs in the data structures of bipartite graphs stored within databases. These methods can relate to the identification, counting, and enumeration of 2×2-bicliques, also referred to as "butterflies." A computer system (which can comprise a distributed computing system comprising multiple distributed computing nodes) can enumerate through pairs of vertices that are common neighbors to other vertices in a bipartite graph. Based on these pairs of neighbor vertices, the computer system can count 2×2-bicliques, including counting the total number of 2×2-bicliques, the number of 2×2-bicliques per vertex in the bipartite graph, and the number of 2×2-bicliques per edge in the bipartite graph. Additionally, methods according to embodiments can be used to enumerate and list all 2×2-bicliques in a bipartite graph. Such techniques provide efficiency and scalability in analyzing large datasets in databases with numerous applications.

One embodiment is directed to a method performed by a computer system for quantifying interactions between two data types in a database. These interactions can form 2×2-biclique subgraphs in a bipartite graph comprising a plurality of left vertices, each corresponding to a data object of a first data type, and a plurality of right vertices, each corresponding to a data object of a second data type. The plurality of left vertices can be connected to the plurality of right vertices by a plurality of edges. The computer system can receive a request to quantify the interactions between data objects of the first data type and the second data type in the database, e.g., from a requestor. For each left vertex in the plurality of left vertices, the computer system can determine a plurality of neighbor vertices of the left vertex in the plurality of right vertices. A neighbor vertex can correspond to a data object of the second data type that the database indicates has interacted with a data object of the first data type corresponding to the left vertex. The computer system can determine one or more pairs of neighbor vertices of the plurality of neighbor vertices. For each pair of neighbor vertices of the one or more pairs of neighbor vertices, the computer system can increment a pair count associated with that pair of neighbor vertices. The computer system can increment a 2×2-biclique count based on the pair count. The computer system can provide the 2×2-biclique count responsive to the request, e.g., to a requestor.

Another embodiment is directed to a method performed by a computer system for quantifying interactions between two data types in a database. These interactions can form 2×2-biclique subgraphs in a bipartite graph comprising a plurality of left vertices, each corresponding to a data object of a first data type, and a plurality of right vertices, each corresponding to a data object of a second data type. The plurality of left vertices can be connected to the plurality of right vertices by a plurality of edges. The computer system can receive a request to quantify the interactions between data objects of the first data type and the second data type in the database, e.g., from a requestor. The computer system can determine a plurality of pair counts and a left vertex list. To do so, for each left vertex in the plurality of left vertices, the computer system can determine a plurality of neighbor vertices in the plurality of right vertices. Each neighbor vertex can correspond to a data object of the second data type that the database indicates has interacted with a data object of the first data type corresponding to the left vertex. The computer system can determine one or more pairs of neighbor vertices of the plurality of neighbor vertices. For each pair of vertices of the one or more pairs of vertices, the computer system can increment a pair count (associated with a pair of neighbor vertices) of the plurality of pair counts. The computer system can also add a left vertex to the left vertex list in association with the pair of neighbor vertices. After performing these steps for each left vertex in the plurality of left vertices, the computer system can determine a plurality of 2×2-biclique counts based on the plurality of pair counts and the left vertex list. The computer system can provide the plurality of 2×2-biclique counts responsive to the request, e.g., to a requestor.

In some embodiments, the plurality of 2×2-biclique counts can comprise a plurality of vertex 2×2-biclique counts corresponding to a plurality of vertices in the bipartite graph, e.g., each vertex 2×2-biclique count can indicate the number of 2×2-bicliques that a corresponding vertex is a part of. In other embodiments, the plurality of 2×2-biclique counts can comprise a plurality of edge 2×2-biclique counts corresponding to a plurality of edges in the bipartite graph, e.g., each edge 2×2-biclique count can indicate the number of 2×2-bicliques that a corresponding edge is a part of.

Another embodiment is directed to a method performed by a computer system for quantifying interactions between two data types in a database. These interactions can form 2×2-biclique subgraphs in a bipartite graph comprising a plurality of left vertices, each corresponding to a data object of a first data type, and a plurality of right vertices, each corresponding to a data object of a second data type. The plurality of left vertices can be connected to the plurality of right vertices by a plurality of edges. The computer system can receive a request to quantify the interactions between data objects of the first data type in the database, e.g., from a requestor. For each left vertex in the plurality of left vertices, the computer system can determine a plurality of neighbor vertices of the left vertex in the plurality of right vertices. Each neighbor vertex can correspond to a data object of the second data type that the database indicates has interacted with a data object of the first data type corresponding to the left vertex. The computer system can determine one or more pairs of neighbor vertices of the plurality of neighbor vertices. For each pair of neighbor vertices of the one or more pairs of neighbor vertices, the computer system can add the left vertex to a left vertex list in association with the pair of neighbor vertices. After performing these steps for each left vertex in the plurality of left vertices, the computer system can determine a plurality of 2×2-biclique subgraphs based on the left vertex list. The computer system can provide the plurality of 2×2-biclique subgraphs responsive to the request, e.g., to a requestor.

Some other embodiments are directed to computer systems and other devices configured to perform the above-noted methods and other methods. For example, one embodiment is directed to a computer system comprising a processor and a non-transitory computer readable medium coupled to the processor. The non-transitory computer readable medium can comprise code, executable by the processor for performing the above-noted methods (or other methods described herein).

Terms

A "server computer" may refer to a computer or cluster of computers. A server computer may be a powerful computing system, such as a large mainframe. Server computers can also include minicomputer clusters or a group of servers functioning as a unit. As one example, a server computer can include a database server coupled to a web server. A server computer may comprise one or more computational apparatuses and may use any of a variety of computing structures, arrangements, and compilations for servicing requests from one or more client computers.

A "client computer" may refer to a computer or cluster of computers that receives some service from a server computer (or another computing system). A client computer may access this service via a communication network such as the Internet or any other appropriate communication network. A client computer may make requests to server computers including requests for data. As an example, a client computer can request a video stream from a server computer associated with a movie streaming service. As another example, a client computer may request data from a database server. A client computer may comprise one or more computational apparatuses and may use a variety of computing structures, arrangements, and compilations for performing its functions, including requesting and receiving data or services from server computers.

A "distributed computing system" may refer to a network of computers operating together to perform a computing task. Distributed computing can be used to parallelize computing tasks so that they can be performed more quickly by a distributed computing system than an individual computer. Computers in a distributing computing system may be referred to as "computing nodes" or "distributed computing nodes." A "computing node group" may refer to some collection of computing nodes, e.g., a subset of computing nodes within a distributed computing system. A "coordinator computer" may refer to a computer or computer system that manages a distributed computing system, e.g., by distributing computing tasks or subtasks among computing nodes in the distributed computing system. A coordinator computer may be included in a distributed computing system.

A "memory" may refer to any suitable device or devices that may store electronic data. A suitable memory may comprise a non-transitory computer readable medium that stores instructions that can be executed by a processor to implement a desired method. Examples of memories including one or more memory chips, disk drives, etc. Such memories may operate using any suitable electrical, optical, and/or magnetic mode of operation.

A "processor" may refer to any suitable data computation device or devices. A processor may comprise one or more microprocessors working together to achieve a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or Xscale; and/or the like processor(s).

A "message" may refer to any information that may be communicated between entities. A message may be communicated by a "sender" to a "receiver," e.g., from a server computer sender to a client computer receiver. The sender may refer to the originator of the message and the receiver may refer to the recipient of a message. Most forms of digital data can be represented as messages and transmitted between senders and receivers over communication networks such as the Internet.

A "user" may refer to an entity that uses something for some purpose. An example of a user is a person who uses a "user device" (e.g., a smartphone, wearable device, laptop, tablet, desktop computer, credit card, etc.). Another example of a user is a person who uses some service, such as a person who uses a delivery service, a member of an online video streaming service, a person who uses a tax preparation service, a person who receives healthcare from a hospital or other organization, etc. A user of a credit card may be referred to as a "cardholder". A user may be associated with "user data," data which describes the user or their use of something (e.g., their use of a user device or a service). In some circumstances, a user may be referred to as an "end user."

A "user device" may refer to any suitable device that can be used by a user. An exemplary user device can process and/or communicate information to other devices. The user device may also each include an external communication interface for communicating with other entities. Examples of user devices may include mobile devices such as mobile phones and laptop computers, wearable devices (e.g., glasses, rings, watches, etc.), hardware modules such as a touch screen device within a larger devices such as an automobile, credit cards with chip or magnetic stripe interfaces, etc.

A "resource provider" may refer to an entity that provides a "resource." A "resource" may broadly refer to something which can be provided. Examples of resources include material resources such as iron, monetary resources such as dollars, and consumer goods such as cleaning supplies, clothing, food, etc. Resources may also refer to services, such as cleaning services. Access to something may also qualify as a resource, e.g., access to a secure building. Examples of resource providers include merchants, government entities, guards, etc. A resource provider may operate a "resource provider computer."

A "graph" may refer to a structure used to represent data. A graph may comprise "vertices" and "edges." In a graph, vertices (usually represented as points) may be connected by edges (usually represented as lines). In a "directed graph" the edges may have a direction, such that they point from one connected vertex to another connected vertex. In directed graphs, edges may be represented by arrows.

A "hash table" may refer to a type of data structure that implements an associative array (also called a dictionary) that maps keys to values based on a hash function. Herein, the term "hash table" may also include similar data structures such as "hash maps", "hash lists", or "hash sets". A hash table can use a hash function to compute an index or "hash code" which can be used to look up data values stored in the hash table.

A "data object" may refer to a unit of data or a collection of associated units of data. For example, a data object may comprise a single value (e.g., a numerical identifier) corresponding to an individual, or a data object may comprise multiple related measurements (e.g., a numerical identifier, a height measurement, a weight measurement, a blood pressure measurement, a heartrate measurement, etc.) corresponding to an individual. A data object may have one or more associated "data types", which may relate to the data object, any data values corresponding to the data object, or which may otherwise label the data object. For example, a data object comprising a number may have a "numerical" data type, while a data object comprising a string of alphanumeric characters may have a "string" data type. A data object comprising healthcare related data may have a "healthcare" data type, data object corresponding to a credit card holder, transaction, or merchant may have a "credit card holder", "transaction", or "merchant" data type, etc.

A "database" can refer to an organized collection of data (e.g., data objects) or a data store used to store the collection of data. Databases can be stored on file systems of computer systems, either locally (e.g., on a local hard drive or solid state drive) or on external server computers, computer clusters, or cloud storage systems (e.g., for larger databases). Some databases may be managed using database management system (DBMS) software. In some cases, data can be retrieved from a database using queries, e.g., Structured Query Language (SQL) queries.

BRIEF DESCRIPTION OF THE DRAWINGS

FIGS. 3A-3C show flowcharts corresponding to methods for quantifying interactions based on 2×2-biclique counting according to some embodiments.

FIG. 4 shows pseudocode corresponding to a 2×2-biclique counting method and a two-element enumeration method according to some embodiments.

FIGS. 5A-5B show flowcharts corresponding to methods for quantifying interactions based on per-vertex 2×2-biclique counting according to some embodiments.

FIG. 6 shows pseudocode corresponding to a per-vertex 2×2-biclique counting method according to some embodiments.

FIGS. 7A-7B show flowcharts corresponding to methods for quantifying interactions based on per-edge 2×2-biclique counting according to some embodiments.

FIG. 8 shows pseudocode corresponding to a per-edge 2×2-biclique counting method according to some embodiments.

FIGS. 9A-9B show flowcharts corresponding to methods for quantifying interactions based on 2×2-biclique enumeration according to some embodiments.

FIG. 10 shows pseudocode corresponding to a 2×2-biclique enumeration method according to some embodiments.

FIG. 13 shows pseudocode corresponding to a distributed implementation of a 2×2-biclique counting method according to some embodiments.

FIG. 14 shows a table comparing the time complexity and space complexity for different 2×2-biclique counting methods.

FIG. 15 shows a table describing some characteristics of experimental datasets used to perform 2×2-biclique related experiments.

FIG. 16 shows a table detailing the running time of a 2×2-biclique counting method according to embodiments for various experimental datasets and various numbers of computing nodes.

FIG. 17 shows a table detailing the running time of a per-vertex 2×2-biclique counting method according to embodiments for various experimental datasets and various numbers of computing nodes.

FIG. 18 shows a table detailing the running time of a per-edge 2×2-biclique counting method according to embodiments for various experimental datasets and various numbers of computing nodes.

FIG. 19 shows a table detailing the running time of a 2×2-biclique enumeration method according to embodiments for various experimental datasets and various numbers of computing nodes.

DETAILED DESCRIPTION

Figure 1:
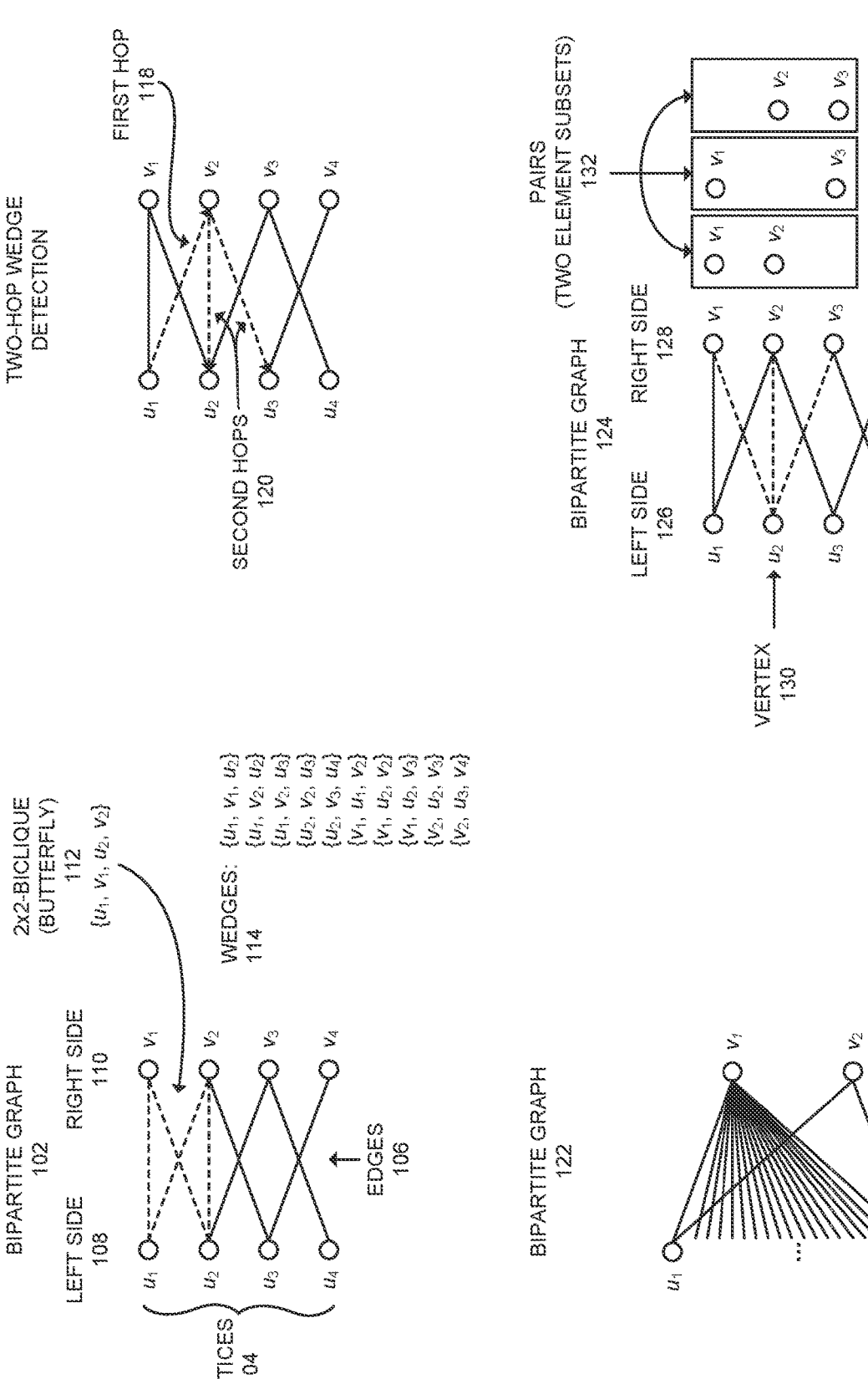
FIG. 1 shows a diagram used to summarize some aspects of bipartite graphs and 2×2-biclique detection methods.

Methods and system for quantifying interactions based on bipartite graph analysis are disclosed, particularly related to the identification and counting of 2×2-bicliques, also referred to as "butterflies", which can comprise the smallest non-trivial cohesive units within bipartite graphs. The detection of 2×2-bicliques can be useful for quantifying or qualifying bipartite graphs, e.g., as a metric for the interconnectedness of such graphs, which can be used to draw useful conclusions about the systems or interactions represented by such bipartite graphs. The detection of 2×2-bicliques can also be used in other systems, e.g., recommender systems. Existing wedge aggregation methods for 2×2-biclique detection do not perform well on large-scale bipartite graph or in distributed computing environments, and consequently are not useful for 2×2-biclique detection in large-scale bipartite graphs. By contrast, methods and systems according to embodiments are efficient even for large-scale bipartite graphs and can be efficiently parallelized for distributed computing environments.

As described in more detail further below, a bipartite graph is a graph in which nodes can be partitioned into two disjoint and independent sets or "sides" (e.g., a "left side" and a "right side"). In a bipartite graph, nodes (also referred to as "vertices") on one side of the graph may be connected to nodes on the other side of the graph via edges, but may not be connected to other nodes within the same side. Bipartite graphs can be used to model many real-world systems, phenomena, or interactions between things. For example, a group of individuals and a group of movies can be modeled as a bipartite graph, in which nodes on one side of the graph correspond to individuals and node on the other side of the graph correspond to movies. An edge connecting an individual node to a movie node can indicate that an individual has seen a corresponding movie. Graph analysis can be performed on such a graph for a variety of reasons, e.g., in order to identify movies that are commonly enjoyed together for the purpose of recommending movies to individuals.

A 2×2-biclique, or "butterfly" is a type of subgraph that can exist within a bipartite graph and can represent the smallest non-trivial cohesive unit within that bipartite graph. Defined in more detail further below, a butterfly can comprise four nodes from a bipartite graph: two from one side and two from the other side, such that each node on one side is connected to each node on the other side. Detecting, counting, or otherwise quantifying butterflies in a bipartite graph can be useful for analyzing systems represented by bipartite graphs. For example, the number of butterflies in a bipartite graph can be used as a measure of the "interconnectedness" of nodes in a bipartite graph, i.e., a bipartite graph with a larger number of butterflies is generally more interconnected than a similar bipartite graph with a smaller number of butterflies.

Quantifying butterflies can also be useful in other examples of big data analysis, resulting in better efficiency and scalability. For example, quantifying butterflies can also be useful in recommender systems, e.g., a movie recommendation system. For a bipartite graph corresponding to users of a video streaming service and movies, a butterfly can comprise a pair of movies that have both been watched by a pair of users. If there are a large number of butterflies corresponding to a given pair of movies (e.g., corresponding to different pairs of users), it can indicate that users that watch one of those films typically watch the other. As such, a recommender system could recommend one of the films to a viewer who has watched the other film (but hasn't yet watched the recommended film). Other applications can also benefit from detecting, counting, or otherwise quantifying butterflies in bipartite graphs.

I. BIPARTITE GRAPHS AND 2×2-BICLIQUES

As described above, embodiments of the present disclosure are directed to methods for counting or otherwise quantifying 2×2-bicliques (butterflies) in bipartite graphs, e.g., enabling the analysis of real-world systems or of interactions between data of various data types that can be represented by bipartite graphs. As described above, many state-of-the-art graph analysis methods are computationally inefficient, and as a result cannot be performed on large (e.g., billion node) bipartite graphs. Further, many graph analysis methods are not amenable to parallel computing, further preventing their use in analyzing large bipartite graphs. Unfortunately, existing state-of-the-art butterfly counting and quantification methods suffer from these problems. However, some embodiments of the present disclosure relate to efficient, highly-parallelizable methods of butterfly counting and quantification, enabling the detection and counting of butterflies in bipartite graphs comprising billions of nodes.

Prior to describing embodiments of the present disclosure in more detail, it may be helpful to review some concepts related to bipartite graphs and 2×2-bicliques (i.e., butterflies). FIG. 1 shows a bipartite graph 102 comprising eight vertices 104 (i.e., $u_1$, $u_2$, $u_3$, $u_4$, $v_1$, $v_2$, $v_3$, $v_4$) and eight edges 106. The vertices in bipartite graph 102 can be divided into two disjoint and independent sets, such that there are no edges between vertices within a given set. In bipartite graph 102, these sets comprise vertices $\{u_1, u_2, u_3, u_4\}$ and $\{v_1, v_2, v_3, v_4\}$. These "sets" can be referred to as the "sides" of the bipartite graph 102, e.g., the left side 108 and the right side 110. However, it should be understood that there is typically no spatial significance in bipartite graphs, and that the "sides" are a means to frame the disjoint and independent subsets in easier to understand terms, rather than indicate their relative spatial position to one another.

Regardless, edges 106 in bipartite graph 102 can span between vertices on the left side 108 and vertices on the right side 110. Such edges can form structures or subgraphs within bipartite graph 102, including wedges and 2×2-bicliques (butterflies). Bipartite graph 102 of FIG. 1 includes one butterfly 112 comprising vertices $\{u_1, v_1, u_2, \text{and } v_2\}$ and ten wedges 114. Wedges and butterflies, and some variables and mathematical expressions used throughout the disclosure are provided in more detail below.

For an undirected bipartite graph G:(N=(L∪R),E), L may refer to a set of vertices on the left side (e.g., left side 108), R may refer to a set of vertices on the right side (e.g., right side 110), and E may refer to a set of edges (e.g., edges 106) that connect L and R. The expression N(v) may denote the neighbor set of a vertex v∈(L∪R), i.e., a set of vertices connected to vertex v via edges. The expression d(v) can denote the degree of a vertex v (i.e., the number of edges connected to that vertex v), and as such d(v)=|N(v)|. The variable n can represent the total number of vertices, and the variable m can represent the total number of edges in the bipartite graph G.

For an undirected bipartite graph G:(N=(L∪R),E), a wedge can be defined as a complete subgraph W(U,V)

comprising a vertex triple {u, v, w} subject to {u, v, w} ⊂ (L∪R) and {(u,v), (v,w)} ⊂ E. Expressed in other words, a wedge can comprise a set of three nodes in a bipartite graph, where two of those nodes are on one side of the bipartite graph and the third node is on the other side of the bipartite graph, and where the two nodes are connected to the third node via two edges. In bipartite graph 102 for example, vertex $u_3$ is connected to vertices $v_2$ and $v_4$ via edges 106, and thus the subgraph {$v_2$, $u_3$, $v_4$} comprises a wedge.

For an undirected bipartite graph G:(N=(L∪R),E), a biclique can be defined as a complete subgraph B(U,V) where U⊂L and V⊂R subject to ∀(u,v)∈U×V, (u,v)∈E.

For an undirected bipartite graph G:(N=(L∪R),E), a (p,q)-biclique can be defined as a complete subgraph B(U,V) where |U|=p and |V|=q.

For an undirected bipartite graph G:(N=(L∪R),E), a butterfly (or 2×2-biclique) can be defined as a complete subgraph B(U,V) where |U|=p and |V|=q. Expressed in other words, a butterfly or 2×2-biclique can comprise a set of two nodes on one side of a bipartite graph, each connected by edges to a set of two nodes on the other side of the bipartite graph. Bipartite graph 102 of FIG. 1 comprises a single butterfly 112, comprising the set of vertices {$u_1$, $v_1$, $u_2$, $v_2$}.

Bipartite graphs can be used to model a variety of real-world systems and data. As such, the analysis of bipartite graphs is used in a variety of fields, including computer science, sociology [24], and biology [13] among others. Bipartite graphs are sometimes used to model relationships between two distinct categories of entities or objects, such as author-paper relationships and consumer-product relationships [38]. In such bipartite graphs, vertices can correspond to entities or objects and edges can correspond to relationships between those entities or objects. For example, in a bipartite graph 102, a plurality of left vertices (i.e., vertices on left side 108) could correspond to a plurality of users of a service, such as users of a payment processing service (e.g., cardholders), and the plurality of right vertices could correspond to a plurality of resource providers, e.g., merchants that provide goods or services to consumers. In such a case, edges 106 could correspond to a plurality of interactions between the plurality of users and the plurality of resource providers. Such interactions could comprise credit card transactions between the plurality of cardholders and the plurality of resource providers.

Performing graph analysis on bipartite graphs can provide useful information about the underlying systems represented by those graphs, or can be used for other useful purposes. For example, a recommender system may use bipartite graphs for the purpose of making personalized recommendation to people corresponding to those bipartite graphs. In the context of a cardholder-restaurant bipartite graph, graphical representations of transactions (edges) between cardholders and merchants (vertices) could be used to identify restaurants that a cardholder might enjoy, based on other restaurants visited by that cardholder as well as restaurants visited by other similar cardholders.

2×2-biclique (butterfly) counting and enumeration are graph analysis tasks that can be performed on bipartite graphs. In such bipartite graphs, a butterfly can comprise a small non-trivial cohesive unit, which may comprise a fundamental motif structure, and which may be useful for drawing conclusions about bipartite graphs or the systems they represent. The number of butterflies within a bipartite graph cam indicate how densely nodes within that graph are connected. Bipartite graphs with more butterflies are generally more connected than bipartite graphs with fewer butterflies, and bipartite graphs are fully connected when the number of butterflies is maximized. In the context of, e.g., social network analysis, a sociologist could compare two different social networks (each represented by a bipartite graph) based on the number of butterflies in each social network.

Identifying and analyzing butterflies can lead to a deeper understanding of systems and behaviors modeled by different types of bipartite graphs [15, 25]. Additionally, butterfly counting and enumeration can also be used as a building block for more complex forms of graph analysis or other applications. For example, recommendation systems can be use butterfly counting or enumeration in order to determine and provide recommendations for users [5, 22]. For example, in the context of a cardholder-restaurant bipartite graph, a butterfly can represent two restaurants visited by two different cardholders. If there are a large number of butterflies corresponding to a given pair of restaurants, it may indicate that cardholders that like the first restaurant typically enjoy the second restaurant. If a given cardholder has visited the first restaurant, but not the second, the recommendation system could recommend the second restaurant to the cardholder on the basis of the number of butterflies comprising those two restaurants. Some advanced graph motifs (e.g., k-tip and k-wing [19]) can be built from butterflies. As such, butterfly counting and enumeration can be used to count and enumerate these more advanced graph motifs.

II. CHALLENGES FOR COUNTING AND ENUMERATING 2×2-BICLIQUES

However, butterfly searching, counting, and enumeration are inherently complex and computationally intensive tasks. The complexity of these tasks can become a problem for large-scale bipartite graphs, e.g., bipartite graphs comprising millions or billions of vertices and edges. Such large-scale bipartite graphs can correspond to large and complex systems, such as global social networks and transactional networks. As described below, many current state-of-the-art butterfly counting and enumeration methods cannot be completed in reasonable amounts of time on large-scale bipartite graphs or cannot be implemented efficiently in distributed computing environments. As a consequence, it is difficult or impossible to both count or enumerate butterflies in such large-scale bipartite graphs using current state-of-the-art methods and implement useful applications based on 2×2-biclique counting or enumerating (such as recommender systems). However, as described further below, methods according to embodiments enable efficient distributed butterfly counting and enumeration. This not only improves the efficiency of butterfly counting, enumeration, and applications (e.g., recommender systems) based on those tasks, but also enable butterfly counting, enumeration, and associated applications to be performed on large-scale bipartite graphs, which is generally not possible using current state-of-the-art butterfly counting and enumeration techniques.

Research has been performed for determining various methods for counting and enumerating butterflies in a bipartite graph, including some of the first butterfly counting methods [26], randomized methods [18], parallel methods [20], temporal butterfly counting and enumeration [4], exact butterfly counting using vertex priority [27], butterfly counting using precise node ordering [8], butterfly counting methods based on uncertain butterflies and uncertain wedges [39], and precise estimation of butterflies and bi-triangles [37].

A butterfly can comprise two wedges. For example, the $2\times2$-biclique 112 from FIG. 1 comprises wedges $\{u_1, v_1, u_2\}$ and $\{u_1, v_2, u_2\}$ (or alternatively wedges $\{v_1, u_1, v_2\}$ and $\{v_1, u_2, v_2\}$). Most current state-of-the-art butterfly counting and enumeration methods (such as those described above), use wedge counting or wedge detection for purpose of identifying and counting butterflies. These methods often use "two-hop wedge detection". In two-hop wedge detection, a computer system (or other device performing butterfly counting or enumeration) starts at a vertex on one side (e.g., the left side) of a bipartite graph and determines the neighbors of that vertex. The computer system then makes a "first hop" to a neighboring vertex on the other side of the bipartite graph and determines the neighbors of that vertex. The computer system then makes a "second hop" back to a neighboring vertex on the first side of the bipartite graph. The original vertex, the vertex visited in the first hop, and the vertex visited in the second hop collectively comprise a wedge in the bipartite graph. In FIG. 1, a first hop 118 is shown from vertex $u_1$ to vertex $v_2$, and two second hops are shown from vertex $v_2$ to vertices $u_2$ and $u_3$. In this way, two wedges: $\{u_1, v_2, u_2\}$ and $\{u_2, v_2, u_3\}$ were detected. A computer system can exhaustively perform the process described above to identify every wedge in a bipartite graph. Butterflies can then be detected or counted using pairs of identified wedges. For example, based on detected wedges $\{u_1, v_1, u_2\}$ and $\{u_1, v_2, u_2\}$, a computer system could determine that a butterfly exists comprising those two wedges.

While existing state-of-the-art butterfly counting and enumeration methods are effective, they often cannot scale up to larger and more complex bipartite graphs. As the scale of bipartite graphs grow larger, the number of two-hop neighbors increases exponentially. As such, enumerating through all two-hop neighbors can result in a significant reduction in computing speed. These methods often struggle with computational capacity and memory constraints when performed using a single computer, which are bottlenecks when processing fast-growing, large-scale bipartite graphs in areas such as bioinformatics and social network analysis. Additionally, two-hop wedge detection methods are generally not amenable to parallelization because they cannot be distributed efficiently among computing nodes in a computing cluster, as identifying two-hop neighbors in a distributed computing environment often results in a considerable volume of unnecessary network traffic between computing node. Consequently, it is difficult or impossible to both count or enumerate butterflies in large-scale bipartite graphs using current state-of-the-art methods.

Additionally, many bipartite graphs corresponding to real-world systems are unbalanced, i.e., there are significantly more vertices on one side of the bipartite graph than the other. For example, for a bipartite graph corresponding to viewership of movies, e.g., on a streaming service, there are typically significantly more viewers than movies, as movies can be expensive to produce and a single movie can be viewed by millions of people. Additionally, the "viewership share" of movies may be dominated by a small number of movies, while many movies may have significantly less viewers. Butterfly counting and quantification methods based on two-hop wedge detection generally perform poorly on such graphs.

Bipartite graph 122 exemplifies this problem. In bipartite graph 122, there are a large number (k) of left side nodes and only two right side nodes. There is only a single butterfly $(u_1, v_1, u_k, v_2)$. However, because of the large degree of right side node $v_1$, there are a large number of wedges that include right side node $v_1$. Enumerating through all of these wedges using two-hop wedge detection is very time consuming and generally unproductive, as only two wedges $\{u_1, v_1, u_k\}$ and $\{u_1, v_2, u_k\}$ are relevant to the only butterfly in the bipartite graph.

By contrast, methods and systems according to embodiments of the present disclosure can be used to efficiently quantify, count, and enumerate through butterflies in bipartite graphs in a scalable and distributable manner. Methods according to embodiments minimize communication overhead, preventing communication inefficiencies that counteract the benefits of distributed computing. Further, Embodiments are capable of horizonal scaling, enabling the use of increasing numbers of computing nodes to handle increasingly large bipartite graphs, enabling methods according to embodiments to scale seamlessly billion-sized bipartite graphs and make use of thousands of computing cores. Embodiments are faster than at least two baseline methods: BFC-IBS and improved BFC-VPS. While the description below primarily focuses on the quantification of $2\times2$-bicliques, embodiments can even be extended to process (p, q)-bicliques [33], and can be adapted for the discovery of dense subgraph structures within bipartite graphs.

In contrast to existing state-of-the art methods, methods according to embodiments of the present disclosure do not use two-hop wedge detection, and only need to use first-hop neighbor information to identify wedges, greatly decreasing computation time and communication overhead in distributed systems. Some method according to embodiments involve enumerating through pairs (i.e., two-element subsets) of neighbor vertices in order to detect wedges. This method is briefly summarized in FIG. 1 with reference to bipartite graph 124. A computer system can iterate through vertices on one side (e.g., left side 126) of bipartite graph 124. The computer system can then determine, for each vertex, all neighboring vertices on the other side of the bipartite graph 124 (e.g., right side 128). For example, for vertex 130 $(u_2)$, the neighboring vertices comprise vertices $v_1$, $v_2$, and $v_3$ on right side 128. The computer system can then determine pairs 132 of those neighboring vertices, i.e., $\{v_1, v_2\}$, $\{v_1, v_3\}$, and $\{v_2, v_3\}$. Each of these pairs 132 and vertex 130 can comprise wedges, i.e., wedges $\{v_1, u_2, v_2\}$, $\{v_1, u_2, v_3\}$, and $\{v_2, u_2, v_3\}$. By repeating this process for all vertices on the left side 126 of the bipartite graph 124, the computer system can detect all wedges in the bipartite graph 124, which can be used to count or otherwise quantify butterflies in bipartite graph 124, as described in more detail further below.

An advantage of this method is it is more amenable to parallelization. Unlike two-hop wedge detection, each computing node in a parallel computing system does not need to store the entire bipartite graph in memory in order to detect wedges via pairs of neighboring vertices. A computing node tasked with, e.g., detecting wedges involving vertex 130 only needs a list of the vertices neighboring vertex 130 (i.e., vertices $v_1$, $v_2$, and $v_3$), and can perform a two-element on those vertices without needed access to other vertices in the bipartite graph. This enables vertices on a particular side of a bipartite graph (e.g., vertices on left side 126 of bipartite graph 124) to be distributed among computing nodes in a distributed computing system, enabling enumeration of pairs of neighboring vertices to be determined in parallel. Afterwards, the pairs determined by each computing node can be merged and the number of $2\times2$-bicliques in a bipartite graph can be determined based on these pairs. Because this enumeration of pairs can be distributed among computing nodes in this manner, methods according to embodiments seamlessly scale across billion scale graphs and outperform current state-of-the-art butterfly counting and enumeration methods.

III. SYSTEM FOR QUANTIFYING 2×2-BICLIQUES

Figure 2:
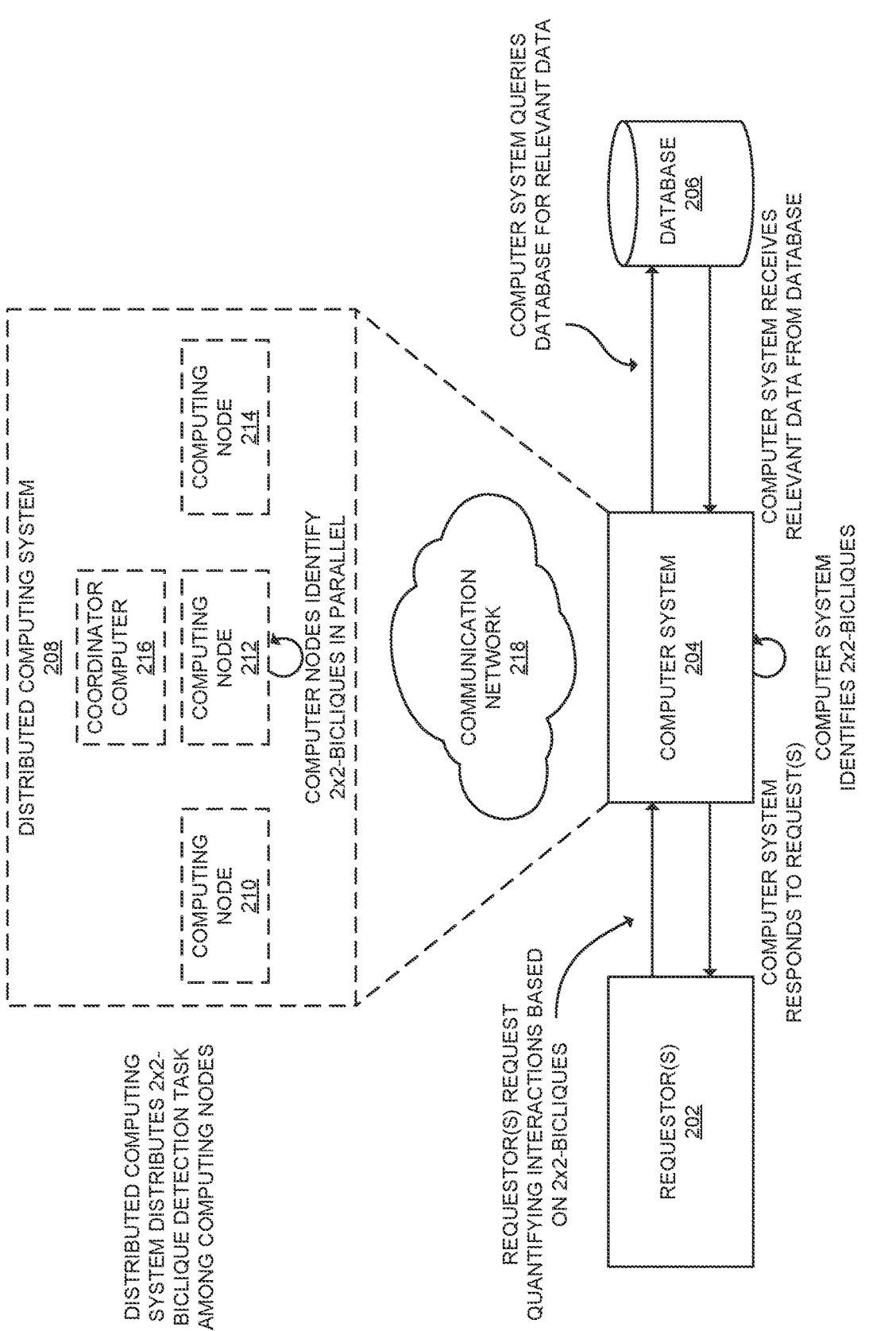
FIG. 2 shows a block diagram of an exemplary system for quantifying interactions based on 2×2-bicliques according to some embodiments.

A biclique quantification system according to some embodiments is summarized with reference to FIG. 2. Such a system can include a computer system 204, which can perform 2×2-biclique quantification methods according to embodiments described below, including 2×2-biclique counting, per-vertex 2×2-biclique counting, per-edge 2×2-biclique counting, and 2×2-biclique enumeration. As described in more detail with reference to FIG. 20, a computer system such as computer system 204 can comprise a processor and a non-transitory computer readable computer readable medium (e.g., a hard drive) coupled to the processor. The non-transitory computer readable medium can comprise code or instructions, executable by the processor for performing methods according to embodiments described herein.

In some embodiments, computer system 204 can comprise a distributed computing system (e.g., distributing computing system 208). Distributing computing system 208 can comprise a coordinator computer 216 and a plurality of computing nodes (which may also be referred to as a "plurality of distributed computing nodes"), e.g., computing nodes 210-214. Such a distributed computing system can perform distributed biclique quantification methods, e.g., distributed 2×2-biclique counting, distributed vertex 2×2-biclique counting, distributed edge 2×2-biclique counting, and distributed 2×2-biclique enumeration.

For simplicity of illustration, a certain number of devices, entities, and components are shown in FIG. 2. It should be understood however that systems according to embodiments of the present disclosure can include more than one of each device, entity, and/or component. In addition, some systems according to embodiments may include a lesser number of devices, entities, and/or components or a greater number of devices, entities, and/or components than those shown in FIG. 2.

In some embodiments, the computer system 204 (or distributed computing system 208) can communicate or otherwise interface with one or more requestor(s) 202. The requestor(s) 202 can request quantification of interactions corresponding to bipartite graphs. For example, for a cardholder-merchant bipartite graph, interactions could correspond to transactions performed between cardholders and merchants. A requestor, e.g., a computer system associated with a payment processing network, could request quantification of these interactions using the 2×2-biclique counting and enumeration methods described herein, and the computer system 204 could perform these methods in order to service the requestor(s) 202 requests.

A requestor 202 can comprise a requestor computer system. As such, a requestor 202 may comprise a client computer and the computer system 204 may comprise a server computer (or, e.g., a collection of server computers in the case of distributed computing system 208). Requestor(s) 202 may communicate with the computer system 204 over a communications network 218. A communications network such as communications network 218 can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between computers and devices in the system of FIG. 2 and/or over communication network 218 may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like. Any suitable communications protocol can be used to communicate over the communications network 218, e.g., for the purpose of creating one or more communication channels. A communications channel may, in some instances, comprise a secure communication channel, which may be established in any known manner, such as through the use of mutual authentication, a session key, and establishment of a Secure Socket Layer (SSL) session.

In some embodiments, the computer system 204 and the requestor(s) 202 may comprise parts of the same computer network, system, or organization. For example, a video streaming service may possess a server (e.g., computer system 204) for the purpose of quantifying interactions based on bipartite graphs for the purpose of generating movie recommendations, and a requestor 202 may comprise, e.g., another server computer associated with the video streaming service that streams videos and provides a graphical user interface (on which recommendations can be displayed) to client devices.

Methods according to embodiments are described in considerably more detail below. However, as a general summary, the computer system 204 can receive request(s) from requestor(s) 202 requesting quantification of interactions based on 2×2-bicliques in bipartite graphs. The computer system 204 can query a database 206 to retrieve any relevant data (e.g., data representative of bipartite graphs) in order to service the request(s). In some embodiments, the database 206 may comprise a relational database, and the computer system 204 may query the database using a Structured Query Language (SQL) query or other type of query. After receiving the relevant data from the database, the computer system can count and/or identify 2×2-bicliques. The computer system can return 2×2-biclique counts (including total 2×2-biclique counts, per-vertex 2×2-biclique counts, per-edge 2×2-biclique counts) to the requestor(s) 202 responsive to their request(s). In this way, the computer system 204 can quantify interactions based on bipartite graphs and 2×2-biclique counts.

As described below, some methods according to embodiments can be implemented as distributed 2×2-biclique counting and enumeration methods. As such, computer system 204 may comprise a distributed computing system 208. The distributed computing system 208 can include a coordinator computer 216 and a plurality of distributed computing nodes, e.g., computing nodes 210-212. The coordinator computer can partition and distributed 2×2-biclique counting or enumeration tasks among computing nodes 210-214 and can aggregate the results of those tasks to produce 2×2-biclique count(s) (e.g., total counts, per-vertex counts, per-edge counts, etc.) or lists of 2×2-bicliques (e.g., in the case of 2×2-biclique enumeration). For example, the coordinator computer 216 could partition left vertices in a bipartite graph into left vertex subsets, and could assign each left vertex subset to a different computing node of computing nodes 210-214. Each computing node could computer a plurality of pair counts corresponding to their respective left vertex subset. The coordinator computer 216 could aggregate these pair counts, then use the aggregated pair counts to determine 2×2-biclique count(s), which could then be returned to requestor(s) 202 responsive to their request(s). Methods of 2×2-biclique counting, and enumeration, including distributed methods summarized above, are described in more detail in the following sections.

IV. 2×2-BICLIQUE COUNTING

Some methods according to embodiments are described below with reference to FIGS. 3A-3C and 4. These methods may be used to determine an exact total count of the number of 2×2-bicliques (butterflies) in a bipartite graph and may be referred to as "exact counting" methods. Such methods can be used to efficiently quantify interactions between two data types in a database that can be represented as elements (e.g., vertices) in a bipartite graph. Such a bipartite graph can comprise a plurality of left vertices corresponding to data objects of a first data type and a plurality of right vertices corresponding to data objects of a second data type. For example, the plurality of left vertices could correspond to a plurality of user data records (data objects of a first data type) for users of a streaming service, and the plurality of right vertices could correspond to a plurality of movie data records (data objects of a second data type) for movies hosted by that streaming service.

As described above, a plurality of left vertices in a bipartite graph can be connected by a plurality of right vertices in the bipartite graph by a plurality of edges, e.g., in the context of a streaming service bipartite graph, a plurality of edges could indicate that users corresponding to user data objects (left vertices) have watched movies corresponding to movie data objects (right vertices). The interactions between data objects of the first data type and data objects of the second data type can form or otherwise be represented by 2×2-biclique subgraphs in the bipartite graph. As such, the computer system can quantify these interactions by determining an exact total count of the number of 2×2-bicliques in a bipartite graph corresponding to the data types from the aforementioned database.

At step 302, the computer system can receive a request to quantify the interactions between data objects of the first data type and the second data type in the database. The computer system can receive this request from a requestor, which could comprise, e.g., a client computer of the computer system (which may comprise a server computer). As an example, the computer system could be part of an organization that provides data analysis services to clients, e.g., in the context of consumer-product bipartite graphs, the computer system could detect 2×2-bicliques for the purpose of identifying products that are commonly purchased together, which may be useful information to advertising or marketing clients. The computer system could receive such a request over a communication network such as the Internet, or via any other suitable means. As another example, the computer system could comprise a distributed computing system (or part of a distributed computing system) comprising a plurality of computing nodes. In such a case, the computer system could receive the request to quantify interactions from a coordinator computer (which may be a part of the distributed computing system), and which may coordinate and distribute computing tasks among computing nodes in the distributed computing system for the purpose of performing parallel computing.

At step 304, the computer system can query a database or otherwise retrieve data corresponding to (or representative of) the bipartite graph. The computer system can, for example, query a relational database using a query language, such as the Structured Query Language (SQL). In some embodiments, the bipartite graph can be represented by a data table (stored in the database) that contains columns and rows of data objects (e.g., data objects of a first data type and data objects of a second data type) corresponding to the plurality of left vertices and the plurality of right vertices. For example, in some embodiments the plurality of left vertices can correspond to a first plurality of rows in a first column in the data table, and the plurality of right vertices can correspond to a plurality of rows in a second column in the data table.

As an example, the data table could comprise a plurality of transaction records (rows) corresponding to transactions performed between a plurality of users (identified by a plurality of data objects of the first data type in the first column) and a plurality of resource providers (identified by a plurality of data objects of the second data type in the second column, which may comprise resource provider data records corresponding to a plurality of resource providers). In some embodiments, this plurality of users could comprise a plurality of cardholders and the plurality of resource providers could comprise a plurality of merchants. As such, the plurality of left vertices in the bipartite graph can correspond to the plurality of users (e.g., cardholders) and e.g., the first column in the data table, and the plurality of right vertices in the bipartite graph could correspond to a plurality of resource providers (e.g., merchants) and e.g., the second column in the data table. The plurality of edges in the bipartite graph can correspond to a plurality of interactions between the plurality of users and the plurality of resource providers, and can further correspond to the rows in the data table. In some embodiments, the plurality of interactions can comprise a plurality of credit card transactions between the plurality of cardholders and the plurality of merchants.

At step 306, the computer system can initialize a hash table. It should be understood that the term "hash table" is used to refer to any appropriate hash based data structure, including e.g., hash lists, hash maps, hash sets, etc., or any other data structure that can be used as a substitute. It should be understood that the term hash table refers to this general class of hash based data structure, and not to, e.g., any particular implementation of a particular subclass of hash based data structure in a particular language. In Java, for example, hash tables are synchronized and do not allow for null keys or values, while hash maps are not synchronized and do allow for null keys or values. Herein however, the term "hash table" can refer to either of these data structures.

As described further below, the hash table may be used to store pair counts associated with pairs of neighbor vertices. Each pair of neighbor vertices can be hashed using a hash function to produce a key used to identify the associated pair count (value) within the hash table. In some embodiments, the hash function may be order invariant with respect to an order of a pair of neighbor vertices, such that the hash of a pair of neighbor vertices is order invariant. This may prevent the computer system from "double recording" pairs of neighbor vertices in the hash table, e.g., recording separate counts for pairs $\{v_1, v_2\}$ and $\{v_2, v_1\}$, even though these pairs comprise the same two vertices.

Additionally at step 306, the computer system can initialize a 2×2-biclique count, e.g., to zero. This value may be incremented during subsequent steps of the flowchart of FIG. 3A, and may eventually equal the total number of 2×2-bicliques in the bipartite graph. Step 306 generally corresponds to lines 402 and 404 of the pseudocode of FIG. 4. In line 402, the 2×2-biclique count (butterfly count) bc is initialized to zero. In line 404, the HashMap neighbor_pair-_count is initialized as an empty hash map or hash table.

As described above, bipartite graphs can comprise two disjoint and independent sets of vertices, which can be labeled, e.g., as a "left set of vertices" and a "right set of vertices", a "first set of vertices" and a "second set of vertices" or using any other labels. Methods described with reference to FIGS. 3A-3B and 4 generally describe a series of steps performed for each vertex in one of these sets of vertices, more specifically, the plurality of left vertices. However, it should be understood that because the labels of "left" and "right" are somewhat arbitrary, these methods could also be performed for each right vertex in the plurality of right vertices, rather than each vertex in the plurality of left vertices.

Still, in some cases it may be more efficient to perform method steps for each vertex of one set of vertices rather than the other. As described in more detail below, e.g., with reference to step 312, the computer system can enumerate through two neighbor combinations for each vertex v on one "side" of the bipartite graph, and the time complexity of this enumeration is $O(d(v)^2)$, where $d(v)$ is the degree of the vertices. As such, the time complexity of these methods is lower when performed based on the vertex set with a lower sum of degree squared than the vertex set with the higher sum of degree squared. As the methods described with reference to FIGS. 3A-3B and 4 are described as being performed "for each left vertex of the plurality of left vertices", in some embodiments it may be preferable for the plurality of left vertices to comprise the set of vertices in the bipartite graph with the lower sum of degree squared.

Consequently, at optional step 308, the computer system can identify the plurality of left vertices and the plurality of right vertices in the bipartite graph. The plurality of left vertices can comprise a set of vertices with a lower sum of degree squared, and the plurality of right vertices can comprise a set of vertices with a higher sum of degree squared. This optimization can reduce the amount of time it takes to perform subsequent method steps (e.g., steps 310-316), and can improve the speed and efficiency of 2×2-biclique quantification methods according to embodiments. Step 308 is described in more detail with reference to FIG. 3B. It should be understood however that in some embodiments, the computer system can e.g., arbitrarily identify the plurality of left vertices and right vertices, e.g., if the sum of degree squared for each side of the bipartite graph are expected to be of similar magnitude. As such, it bears repeating that the steps described below with reference to FIG. 3B are optional.

Figure 3B:
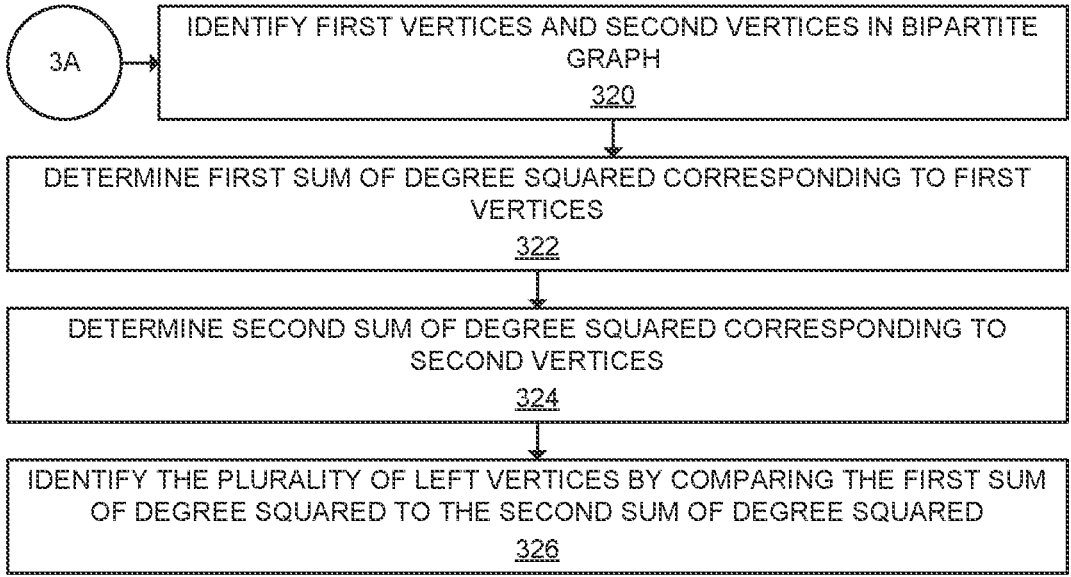

Referring to FIG. 3B, at step 320, the computer system can identify a plurality of first vertices and a plurality of second vertices in the bipartite graph. These plurality of first vertices and plurality of second vertices can comprise the two disjoint sets making up the "sides" of the bipartite graph. As such, the plurality of first vertices can comprise one of the plurality of left vertices and the plurality of right vertices, and the plurality of second vertices can comprise the other of the plurality of left vertices and the plurality of right vertices. For example, the plurality of first vertices may comprise the plurality of left vertices and the plurality of second vertices may comprise the plurality of right vertices, or alternatively the plurality of first vertices may comprise the plurality of right vertices and the plurality of second vertices may comprise the plurality of left vertices.

The computer system can identify the plurality of first vertices and the plurality of second vertices in the bipartite graph using a variety of means, which may depend on how the bipartite graph is represented in computer memory or in a database or other data structure. For example, for a bipartite graph represented by a data table comprising two columns, the first plurality of vertices could correspond to data objects stored in the rows of the first column in the bipartite graph, and the second plurality of vertices could correspond to data objects stored in the rows of the second column in the bipartite graph. As such, the computer system could identify the first plurality of vertices by accessing the rows in the first column of the data table (e.g., using a SELECT statement and a structured query language), and could identify the second plurality of vertices by accessing the rows in the second column of the data table. For other data arrangements and representations of the bipartite graph, other methods can be used by the computer system to identify the plurality of first vertices and the plurality of second vertices, and an exhaustive list of such methods will not be provided herein.

At step 322, the computer system can determine a first sum of degree squared corresponding to the plurality of first vertices. The computer system can do so by determining the number of neighbor vertices for each first vertex, squaring these numbers of neighbor vertices, and summing the results. A variety of methods can be used to determine the first sum of degree squared depending on the structure or representation of the bipartite graph. For example, for a bipartite graph represented as vertex data structures, each with an associated array of vertex pointers pointing to neighboring vertices, the computer system could determine the number of neighbor vertices based on the size (or number of pointers contained within) each associated array, then perform the operations described above based on these numbers of neighbor vertices. As another example, for a bipartite graph represented by a data table, a structured query language could be used to identify all the rows corresponding to unique records in the first column of the data table, then count the number of unique data records corresponding to the second column of the data table that share a row with the unique records of the first column, thereby determining the number of neighboring vertices for each unique record in the first column. Afterwards, the computer system could performed the operations described above based on these numbers of neighbor vertices. However, it should be understood that other data arrangements and representations of bipartite graphs are possible, that other methods for determining a first sum of degree squared can be employed, and an exhaustive list of such methods will not be provided herein.

At step 324, the computer system can determine a second sum of degree squared corresponding to the plurality of second vertices. This can be accomplished using substantially the same techniques described above with reference to step 322 (or any other appropriate techniques). Consequently, step 324 can be generally understood with reference to the description of step 322 above.

At step 326, the computer system can identify the plurality of left vertices and the plurality of right vertices by comparing the first sum of degree squared to the second sum of degree squared. The computer system can, e.g., identify that the plurality of left vertices comprise the plurality of first vertices if the first sum of degree squared is less than or equal to the second sum of degree squared, and thereby identify that the plurality of right vertices comprise the plurality of second vertices. Alternatively, the computer system can identify that the plurality of left vertices comprise the plurality of second vertices if the first sum of degree squared is greater than the second sum of degree squared, and thereby identify that the plurality of right vertices comprise the plurality of first vertices. In other words, at step 326, the computer system can determine that the plurality of left vertices comprises the plurality of vertices (of plurality of first vertices and the plurality of second vertices) that has the lower sum of degree squared.

Step 308 (and steps 320-326) can reduce the number of operations performed in subsequent steps of 2×2-biclique quantification methods according to embodiments, and can consequently improve the speed and efficiency of such methods. This optimization is particularly useful for unbalanced bipartite graphs, which frequently occur when modeling real-world systems. For example, in the context of a streaming service, a given movie may be watched by millions of users, however, an individual user may only watch, e.g., 5-100 movies provided by that streaming service. As a consequence, for a bipartite graph representing such a system, "movie vertices" may have considerably higher sum of degree squared than user vertices. As such, performing two-element neighbor enumerations (as described further below with reference to step 312 of FIG. 3A) based on the neighbors of the movie vertices (i.e., the users) may be considerably slower than performing such enumerations based on the neighbors of the user vertices (i.e., the movies), and consequently it may take more time to identify and count 2×2-bicliques (butterflies) within such a bipartite graph, why may hinder the implementation of, e.g., a movie recommendation service based on 2×2-biclique counts.

Returning to FIG. 3A, the computer system can perform steps 310 and 312 for each left vertex in the plurality of left vertices (e.g., as identified above in step 308). These steps generally correspond to the "for loop" of lines 406-416 of FIG. 4. At step 310, for each left vertex, the computer system can determine a plurality of neighbor vertices of that left vertex in the plurality of right vertices. Each neighbor vertex can correspond to a data object of the second data type that a database indicates has interacted with a data object of the first data type corresponding to the left vertex. For example, if the plurality of left vertices correspond to a plurality of credit card holders (identified, e.g., by payment account numbers, which can comprise data objects of the first data type), and the plurality of right vertices can correspond to a plurality of merchants (identified, e.g., by merchant identifier numbers, which can comprise data objects of the second data type), then the interactions between these data objects could comprise transactions conducted between the cardholders and the merchants.

The computer system can determine the neighbor vertices for each left vertex using a variety of methods, which may depend on the data structure or representation of the bipartite graph. As an example if the bipartite graph is represented as a data table in a database, a query (such as an SQL query), e.g., comprising SELECT statements could be used to determine the neighbor vertices (which could be represented by, e.g., rows in one column of the data table) for each left vertex (which could be represented by, e.g., rows in the other column of the data table). Alternatively, if each vertex is represented by a data structure comprising, e.g., a vertex identifier and an array of pointers to neighboring vertices, then the computer system can determine the neighbor vertices for each left vertex using such arrays of pointers. For other bipartite graph representations other methods can be used and an exhaustive list will not be provided.

At step 312, the computer system can determine one or more pairs of neighbor vertices from each plurality of neighbor vertices corresponding to each left vertex. As described further below, these pairs of neighbor vertices can be used to determine pair counts, which can be used to determine the total number of 2×2-bicliques in the bipartite graph. In some embodiments, the computer system can use two-element enumeration to determine these one or more pairs of neighbor vertices. These one or more pairs of neighbor vertices can comprise one or more two-element subsets of neighbor vertices determined via this enumeration. As described above, this is in contrast to many state-of-the-art 2×2-biclique counting methods, which use two-hop wedge detection instead. This two-element enumeration process greatly improves CPU cache locality compared to two-hop wedge detection, and consequently methods according to embodiments are faster and more efficient than current state-of-the-art 2×2-biclique counting methods. Distributed or parallelized methods of determining the one or more pairs of neighbor vertices are described further below with reference to FIGS. 3A, 12, and 13.

Step 312 generally corresponds to lines 408 and 420-428 of FIG. 4. Lines 420-428 of FIG. 4 provide pseudocode of a two-element enumeration method. At line 420, the computer system can initialize a data structure (e.g., a list) used to store two-element subsets (i.e., pairs) of neighbor vertices. In the "for loop" of lines 422-426, for a plurality of neighbor vertices comprising n neighbor vertices, the computer system can iterate through the first n−1 neighbor vertices. In the inner "for loop" of line 424, the computer system can iterate through the i+1 to $n^{th}$ neighbor vertices. Each pair of neighbor vertices based on i, j can be added to the list of pairs of neighbor vertices. The list of pairs of neighbor vertices can be returned at line 428. In this way, the computer system can determine one or more pairs of neighbor vertices for each plurality of neighbor vertices.

At step 314 of FIG. 3A, for each pair of neighbor vertices of the one or more pairs of neighbor vertices, the computer system can increment a pair count associated with that pair of neighbor vertices. Step 314 generally corresponds to line 412 from the pseudocode of FIG. 4. The computer system can increment the pair counts using the hash table (or hash map or any other suitable data structure) initialized at step 306. The computer system can index the hash table using a hash of the pair of neighbor vertices in order to identify a corresponding neighbor pair count, then increase that pair count by one, thereby incrementing the pair count. As described above, in some embodiments, the hash of a pair of neighbor vertices may be order invariant with respect to the order of that pair of neighbor vertices, e.g., to prevent forming separate counts for equivalent pairs of neighbor vertices, e.g., $\{v_1, v_2\}$ and $\{v_2, v_1\}$. Distributed techniques for performing step 314 of FIG. 3A are described in more detail further below with reference to FIGS. 3A, 12, and 13.

Figure 3C:
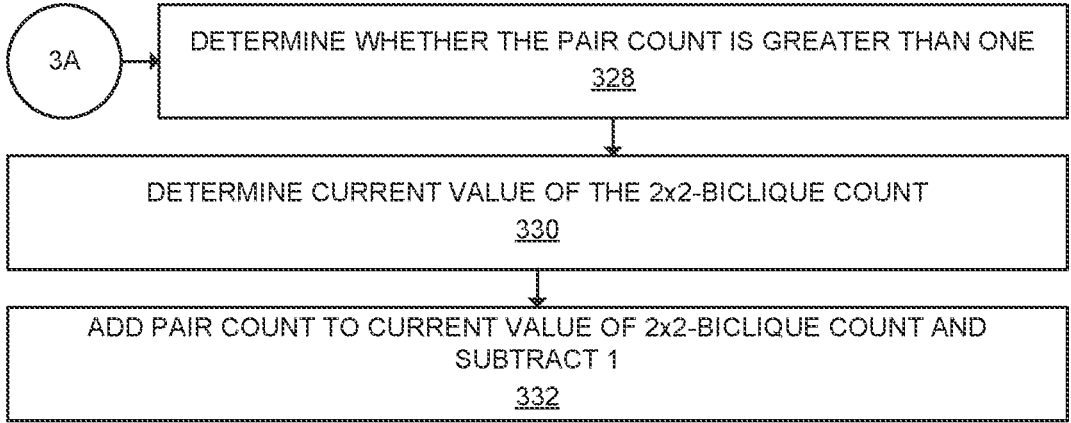

At step 316, for each pair of neighbor vertices and for each left vertex, the computer system can increment a 2×2-biclique count based on that pair count. In this way the computer system can count the number of 2×2-bicliques in the bipartite graph. Step 316 of FIG. 3A generally corresponds to lines 414 and 416 of FIG. 4. FIG. 3C shows a flowchart corresponding to some steps that can be performed by the computer system to increment 2×2-biclique counts.

At step 328 of FIG. 3C, the computer system can determine whether a neighbor pair count is greater than one. This generally corresponds to the "if statement" of line 414 of FIG. 4. If the neighbor pair count associated with a particular pair of neighbor vertices is two or more, it indicates that the particular pair of vertices is part of at least one 2×2-biclique. However, if the pair count associated with a particular pair of vertices is one or less, it does not indicate that the pair of vertices is necessarily part of a 2×2-biclique. As such, the computer system can determine whether the pair count is greater than one in order to determine if the 2×2-biclique count can be incremented.

At step 330, the computer system can determine a current value of the 2×2-biclique count, e.g., by accessing the 2×2-biclique count (e.g., bc from the pseudocode of FIG. 4) from memory. Afterwards, at step 332, the computer system can determine a new value of the 2×2-biclique count by adding a pair count to the 2×2-biclique count and subtracting one. Steps 330 and 332 generally correspond to line 416 of FIG. 4. Generally, one is subtracted from the pair count in order to prevent double counting of 2×2-bicliques, as the method of FIGS. 3A-3C and 4 is performed for each left vertex of the plurality of left vertices. A 2×2-biclique in the bipartite graph will comprise two left vertices, and thus a given 2×2-biclique may be counted twice, once for each left vertex present in that 2×2-biclique. By subtracting one, the computer system avoids $$\binom{count}{2}$$

and subtracting $$\binom{count-1}{2},$$

but avoids the need to compute binomial coefficients.

At step 318, the computer system can provide the 2×2-biclique count responsive to the request, e.g., to a requestor. For example, if a server computer associated with a streaming service requested a 2×2-biclique count corresponding to a bipartite graph of users and streamed movies, the computer system could provide that 2×2-biclique count to the server computer. The computer system can provide the 2×2-biclique count responsive to the request in any appropriate manner. For example, if the computer system received the request as a message over the Internet, the computer system could send the 2×2-biclique count back to the requestor as a message over the Internet.

A. Proofs

Some theorems and proofs related to the 2×2-biclique counting methods described above with reference to FIGS. 3A-3C and 4 are provided herein. A first theorem is that the 2×2-biclique counting method described above correctly solves the 2×2-biclique counting problem. This is shown by demonstrating that each 2×2-biclique in a bipartite graph G is counted exactly once.

Consider a 2×2-biclique $(u_1, u_2, v_1, v_2)$ in G, where $u_1$, $u_2 \in L$ and $v_1, v_2 \in R$. A butterfly is formed when two vertices on one side (e.g., L) are connected to two vertices on the other side (R). Without loss of generality, assume the method starts from the side with the lower sum of degrees squared, which for this argument is assume to be L. A computer system implementing the method described above enumerates pairs of neighbors for each vertex in L. When considering $u_1$ (or $u_2$), the computer system will enumerate pairs of neighbors which include $v_1$ and $v_2$ among others. Since both $u_1$ and $u_2$ are common neighbors to $v_1$ and $v_2$, the pair $(v_1, v_2)$ will be counted twice, once for each of $u_1$ and $u_2$.

The neighbor_pair_count hash table (or hash map) keeps track of how many times each pair of vertices in R (in this case, $(v_1, v_2)$) appears as neighbors of vertices in L. When a pair appears for the second time (indicating that both vertices in L are connected to the same pair in R), a 2×2-biclique is found and the computer system increases the butterfly count bc. The computer system increases the count bc by neighbor_pair_count (pair)−1 for each pair, ensuring that each 2×2-biclique is counted once and only once. The subtraction of 1 prevents overcounting the first connection, which does not yet form a 2×2-biclique. Therefore, a computer system performing the 2×2-biclique counting methods described above accurately counts each 2×2-biclique exactly once in the graph, irrespective of which side of the bipartite graph it starts counting on.

A second theorem is that the time complexity of the 2×2-biclique counting method described above is $O(\min\{\Sigma_{u \in L} d(u)^2, \Sigma_{u \in R} d(u)^2\})$. The 2×2-biclique counting method involves a computer system enumerating all two neighbor combinations for each vertex v, and the time complexity of this enumeration is $O(d(v)^2)$, assuming that the computer system starts on the side with the lower sum of degree squared, the time complexity of the 2×2-biclique counting method is $O(\min\{\Sigma_{u \in L} d(u)^2, \Sigma_{u \in R} d(u)^2\})$.

A third theorem is that the space complexity of the 2×2-biclique counting method described above is $O(n^2)$, which can be proven immediately. Table 1 from FIG. 14 compares the time and space complexity of several 2×2-biclique counting methods, including some 2×2-biclique counting methods according to embodiments described above with reference to FIGS. 3A-3C and 4 (labelled as "Monarch-Exact-Count" in Table 1).

B. Relational 2×2-Biclique Counting

Figure 11:
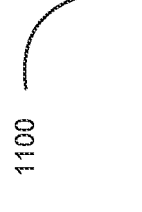
FIG. 11 shows pseudocode corresponding to an exemplary relational query implementation of a 2×2-biclique counting method according to some embodiments.

One advantage of the 2×2-biclique counting methods described above are that they can be implemented as relational queries. As such, they can be implemented on distributed computing clusters through declarative interfaces, e.g., on relational databases, Spark [36], and/or HPC systems. In some embodiments, the database described above may comprise a relational database, and methods according to embodiments may be implemented as a query on the relational database. Such a query can be implemented using a Structured Query Language (SQL) or in any other appropriate manner. FIG. 11 shows a relational implementation 1100 of the 2×2-biclique counting methods described above with reference to FIGS. 3A-3C and 4 using a query language such as SQL.

Generally, the relational implementation 1100 can performed on a dataset (see, e.g., line 1108) comprising a table comprising two columns, one corresponding to data elements of a first data type ("type1") and one corresponding to data elements of a second data type ("type2"). For example, in the context of a video streaming service, the first column could correspond to numerical user identifiers (data elements of the first data type) and the second column could correspond to numerical movie identifiers (data elements of the second data type) corresponding to movies watched by the users corresponding to the numerical user identifiers. As another example, in the context of a payment processing network, the first column could comprise payment account numbers (data elements of the first data type) and the second column could comprise merchant identifiers corresponding to merchants that were transacted with by cardholders corresponding to the payment account numbers.

Each row of dataset could correspond to an interaction between data elements of the first data type and the second data type, or e.g., people or things represented by those data elements. In the context of a video streaming service, a row could comprise a numerical user identifier and a numerical movie identifier, indicating that a user corresponding to the user identifier watched a movie corresponding to the movie identifier. As another example, in the context of a transaction processing service, a row could comprise a payment account number and a merchant identifier, indicating that a transaction took place between a cardholder corresponding to the payment account number and the merchant corresponding to the merchant identifier.

This tabular dataset can be used to derive a bipartite graph, as generally, each row of dataset corresponds to an edge between a left vertex (corresponding to a data element of the first data type, e.g., a user identifier or payment account number) and a right vertex (corresponding to a data element of the second data type, e.g., a movie identifier or merchant identifier). The unique data elements in each column of dataset can correspond to the left and right vertices in the bipartite graph, e.g., the unique data elements of the first data type could comprise the left vertices, and the unique data elements of the second data type could comprise the right vertices. On such a bipartite graph, the methods described above could be performed in order to count 2×2-bicliques. However, it is also possible to determine the total number of 2×2-bicliques without explicitly constructing the bipartite graph, e.g., by using a relational implementation such as relational implementation 1100 of FIG. 11.

In general, relational implementation 1100 can involve the following steps. First a data table that represents wedges in the bipartite graph corresponding to dataset can be created, e.g., in the "inner SELECT statement" of lines 1106-1110. Second, a data table called neighbor_size can be created that indicates the number of wedges corresponding to each unique data elements of type2, e.g., in the "outer SELECT statement" of lines 1104 and 1112. Third, neighbor_size can be used to determine the number of 2×2-bicliques corresponding to each unique pair of data elements of type2, and the sum of these 2×2-biclique counts can be determined in order to determine the total number of 2×2-bicliques in the bipartite graph represented by dataset, e.g., in the SELECT statement of line 1102.

In more detail, in line 1108, a computer system can cast dataset as two datasets d1 and d2, and perform a join on these datasets in order to implement a self-join on dataset. The inner SELECT statement of lines 1106-1110 can be applied to this self-joined dataset. The WHERE clause of this SELECT statement (line 1110) can be used to effectively identify wedges within the bipartite graph represented by dataset by identifying pairs of rows that have the same data element of one type (see the d1.type1=d2.type1 condition of line 1110) but have different data elements of the other data type (see the d1.type2<d2.type2 condition of line 1110). By using a less than comparison, rather than a general inequality, the relational implementation 1100 avoids double counting wedges. The result is a data table with three columns, one corresponding to data elements of type1, another corresponding to data elements of type2 (i.e., type21), and a third corresponding to different data elements of type2 (i.e., type22). As such, a given row of this data table comprises a data element of type1, a data element of type2, and a different data element of type2, and can represent a wedge in the bipartite graph corresponding to dataset, e.g., a pair of movies viewed by the same user or a pair of merchants transacted with by the same cardholder.

The outer SELECT statement (lines 1104 and 1112) can be applied to the result of the inner SELECT statement, i.e., the three column data table described above, in order to produce the table neighbor_size. Generally, this SELECT statement can involve grouping the data elements of type1 based on each pair of data elements of type2 (i.e., type21 and type22). For example, grouping all users who have viewed the same pairs of movies or all cardholders who have shopped at the same pairs of merchants. Afterwards, a count of distinct data elements corresponding to each pair of data elements of type2 can be determined (see line 1104: COUNT (DISTINCT type1))). The result is a data table neighbor_size (see line 1104) comprising at least one numerical column of counts. Each row of neighbor_size can correspond to a different pair of data elements of type2, and the count contained in that row can comprise the number of distinct data elements of type1 corresponding to that pair of data elements of type2. For example, in the context of a video streaming service, each row could correspond to a pair of movies, and each count could correspond to the number of users who have watched both movies in the corresponding pair of movies. As another example, in the context of a payment processing network, each row could correspond to a pair of merchants, and each count could correspond to the number of cardholders who have transacted with the corresponding pair of merchants.

Each of these counts in neighbor_size is effectively equal to the number of wedges containing a corresponding pair of data elements of type2, which can be used to determine the number of 2×2-bicliques containing each pair of data elements of type2. Since a 2×2-biclique comprises two wedges, the number of 2×2-bicliques corresponding to a given pair of data elements of type2 is equal to the number of two-element subsets of elements of type1 that are associated with that pair of data elements of type2. The number of two-element subsets from n elements is given by the formula $$\frac{n(n-1)}{2}.$$

As such, by applying this formula to each row of neighbor_size, then summing the resulting values from each row, the total number of 2×2-bicliques in the bipartite graph represented by dataset can be determined, e.g., as in the SELECT SUM (neighbor_size*(neighbor_size−1)/2) statement in line 1102. In this way, the 2×2-biclique counting methods described above can be applied on relational data tables.

A relational implementation such as relational implementation 1100 is advantageous because it can be implemented efficiently as relational statements (e.g., SQL statements) without needing additional code, and can be implemented on parallel processing systems such as Spark, or other systems that use MapReduce frameworks very efficiently. As shown in the relational implementation 1100, two-element enumeration can be implemented using a self-join operation and 2×2-biclique counting can be implemented using one join and two aggregation operations. Further, such operations do not require explicit materialization of all neighbors or explicit construction of the bipartite graph, reducing the number of pre-processing operations that are performed.

C. Distributed 2×2-Biclique Counting

As described above, one advantage of 2×2-biclique counting methods according to embodiments is that they can be implemented using distributed computing systems. As such, and as described with reference to FIG. 2, in some embodiments the computer system can comprise a distributed computing system comprising a plurality of distributed computing nodes. By contrast, 2×2-biclique counting methods based on two-hop wedge detection (which include many of the current state-of-the-art 2×2-biclique counting methods) cannot be implemented efficiently on distributed computing systems for the reasons described further above, e.g., considerable communication overhead between computing nodes. Distributed methods of 2×2-biclique counting are described below with reference to FIGS. 12 and 13.

Because large-scale bipartite graphs are often sparse, distributed 2×2-biclique counting can be performed using vertex-centric partitioning in order to avoid high communication overhead. Once data is distributed between computing nodes in the distributed computing system, the computing nodes can enumerate and count pairs of neighbor vertices in parallel. The computing nodes can using techniques similar to those described above, e.g., with reference to steps 312 and 314 of FIG. 3A. The distributed computing system can aggregate those pair counts and use them to determine the number of 2×2-bicliques in the bipartite graph.

Figure 12:
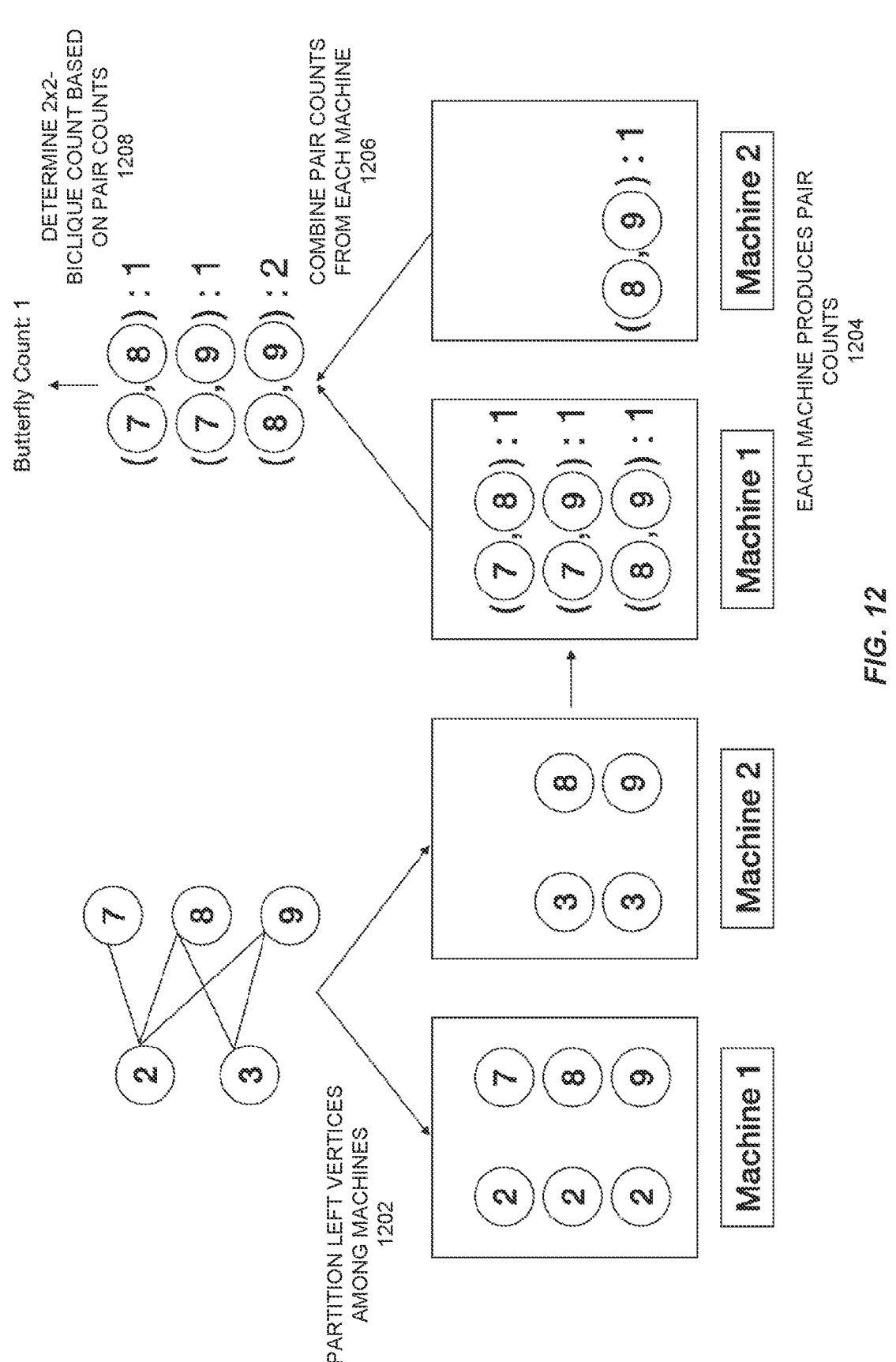
FIG. 12 shows a diagram used to describe a distributed 2×2-biclique counting method according to some embodiments.

FIG. 12 summarizes a distributed 2×2-biclique counting method on a bipartite graph comprising five vertices: two left vertices and three right vertices. At step 1202, the distributed computing system (or e.g., a coordinator computer) can partition left vertices among machines (computing nodes) in the distributed computing system. In FIG. 12, Machine 1 has been assigned left vertex 2, and Machine 2 has been assigned left vertex 3. Each computing node may have access to the neighbors of their respective left vertices, e.g., right vertices 7, 8, 9 for Machine 1 and right vertices 8 and 9 for Machine 2.

Subsequently, at step 1204, each computing node can produce pair counts for each pair of right vertices, e.g., using methods or techniques similar to those described above with reference to step 314 of FIG. 3A. In FIG. 12, Machine 1 determined a pair count of one for pairs {7, 8}, {7, 9}, and {8, 9}, and Machine 2 determined a pair count of two for pair {8, 9}.

At step 1206, the distributed computing system can combine pair counts from each computing node. As both Machines 1 and 2 identified a pair of vertices {8, 9}, the pair count associated with {8, 9} increases by one in the combined pair count, while the pair counts for pairs {7, 8} and {7, 9} remain the same. Afterwards, at step 1208, the distributed computing system can determine a 2×2-biclique count based on the pair counts, e.g., using techniques similar to those described above with reference to step 316 of FIG. 3A and with reference to FIG. 3C. In FIG. 12, the 2×2-biclique (butterfly) count is one, corresponding to the 2×2-biclique comprising vertices {2, 3, 8, 9}.

Distributed 2×2-biclique counting methods according to embodiments can also be understood with reference to FIGS. 3A-3C and the pseudocode of FIG. 13. In some embodiments, in distributed 2×2-biclique counting performed by a computer system comprising a distributed computing system, determining one or more pairs of neighbor vertices of the plurality of neighbor vertices for each left vertex (step 312 of FIG. 3A) can comprise the substeps described below. In one substep, the distributed computing system can determine a plurality of left vertex subsets from the plurality of left vertices. This substep generally corresponds to line 1302 of FIG. 13. In FIG. 12, for example, the plurality of left vertex subsets comprised two subsets, one containing left vertex 2 and one containing left vertex 3.

The distributed computing system can assign the plurality of left vertex subsets to a plurality of computing nodes in the distributed computing system. This substep generally corresponds to step 1202 of FIG. 12, in which the first left vertex subset was assigned to Machine 1 and the second left vertex subset was assigned to Machine 2. The distributed computing system can use each computing node to determine a corresponding one or more pairs of neighbor vertices based on a corresponding left vertex subset. In this way, the distributed computing system can determine a plurality of pairs of neighbor vertices, and the one or more neighbor vertices can comprise the plurality of pairs of neighbor vertices. Expressed in other words, each computing node can effectively identify pairs of neighbor vertices for its given left vertex subset, using, e.g., two-element enumeration techniques as described above with reference to step 312 of FIG. 3A or any other appropriate techniques. This substep generally corresponds to step 1204 of FIG. 12, in which Machine 1 identified three pairs of neighbor vertices {7, 8}, {7, 9}, and {8, 9}, and Machine 2 identified a single pair of neighbor vertices {8, 9}. This substep also generally corresponds to line 1308 of FIG. 13, in which each computing node uses two-element enumeration to produce their own local neighbor_pair_set.

Additionally, in distributed 2×2-biclique counting methods according to embodiments, incrementing each pair count associated with each pair of neighbor vertices (step 314 of FIG. 3A) can be performed by the plurality of computing nodes in the distributed computing system. The distributing computing system can increment each pair count using a computing node assigned a left vertex subset corresponding to that pair of neighbor vertices. This step generally corresponds to step 1204 of FIG. 12, and lines 1310-1312 of FIG. 13. The distributed computing system can then aggregate the counts produced by each computing node to determine a global 2×2-biclique count (bc global in FIG. 13), which generally corresponds to steps 1206 and 1208 of FIG. 12 and lines 1314-1320 of FIG. 13. In this way the distributed computing system can determine a 2×2-biclique count corresponding to the bipartite graph.

V. PER VERTEX 2×2-BICLIQUE COUNTING METHODS

In addition to exact 2×2-biclique counting methods, some embodiments of the present disclosure are directed to per-vertex 2×2-biclique counting methods. Such methods can be used to determine a plurality of vertex 2×2-biclique counts corresponding to a plurality of vertices in a bipartite graph. These methods are described below with reference to FIGS. 3B, 5A, 5B, and 6. Such methods can be used to efficiently quantify interactions between two data types in a database which can be represented as elements (e.g., vertices) in a bipartite graph. Such a bipartite graph can comprise a plurality of left vertices correspond to data objects of a first data type and a plurality of right vertices corresponding to data objects of a second data type. For example, the plurality of left vertices could correspond to a plurality of user data records (data objects of a first data type) for users of a streaming service, and the plurality of right vertices could correspond to a plurality of movie data records (data objects of a second data type) for movies hosted by that streaming service.

As described above, a plurality of left vertices in a bipartite graph can be connected to a plurality of right vertices in the bipartite graph by a plurality of edges, e.g., in the context of a streaming service bipartite graph, a plurality of edges could indicate that users corresponding to user data objects (left vertices) have watched movies corresponding to movie data objects (right vertices). The interactions between data objects of the first data type and data objects of the second data type can form or otherwise be represented by 2×2-biclique subgraphs in the bipartite graph. As such, the computer system can quantify these interactions by determining a plurality of vertex 2×2-biclique counts corresponding to a plurality of vertices in the bipartite graph. Such vertex 2×2-biclique counts could be used to determine, e.g., which movies on a streaming service (represented by vertices) are commonly watched with other movies by large numbers of users, e.g., for the purpose of recommending movies to users.

Referring to FIG. 5A, at step 502 a computer system can receive a request to quantify the interactions between data objects of the first data type and the second data type in a database. In some embodiments, the computer system can receive this request from a requestor, which could comprise, e.g., a client computer of the computer system (which may comprise a server computer). As an example, the computer system could be part of an organization that provides data analysis services to clients, e.g., in the context of consumer-product bipartite graphs, the computer system could count 2×2-bicliques associated with product vertices for the purpose of identifying products that are commonly purchased together and products that are purchased by large numbers of customers, which may be useful information to advertising or marketing clients. The computer system could receive such a request over a communication network such as the Internet, or via any other suitable means. As another example, the computer system could comprise a distributed computing system (or part of a distributed computing system) comprising a plurality of computing nodes. In such a case, the computer system could receive the request to quantify interactions from a coordinator computer (which may be a part of the distributed computing system), and which may coordinate and distribute computing tasks among computing nodes in the distributed computing system for the purpose of performing parallel computing.

At step 504, the computer system can query a database or otherwise retrieve data corresponding to (or representative of) the bipartite graph. The computer system can, for example, query a relational database using a query language, such as the Structured Query Language (SQL). In some embodiments, the bipartite graph can be represented by a data table (stored in the database) that contains columns and rows of data objects (e.g., data objects of a first data type and data objects of a second data type) corresponding to the plurality of left vertices and the plurality of right vertices. For example, in some embodiments the plurality of left vertices can correspond to a first plurality of rows in a first column in the data table, and the plurality of right vertices can correspond to a plurality of rows in a second column in the data table.

As an example, the data table could comprise a plurality of transaction records (rows) corresponding to transactions performed between a plurality of users (identified by a plurality of data objects of the first data type in the first column) and a plurality of resource providers (identified by a plurality of data objects of the second data type in the second column, which may comprise resource provider data records corresponding to a plurality of resource providers). In some embodiments, this plurality of users could comprise a plurality of cardholders and the plurality of resource providers could comprise a plurality of merchants. As such, the plurality of left vertices in the bipartite graph can correspond to the plurality of users (e.g., cardholders) and e.g., the first column in the data table, and the plurality of right vertices in the bipartite graph could correspond to a plurality of resource providers (e.g., merchants) and e.g., the second column in the data table. The plurality of edges in the bipartite graph can correspond to a plurality of interactions between the plurality of users and the plurality of resource providers, and can further correspond to the rows in the data table. In some embodiments, the plurality of interactions can comprise a plurality of credit card transactions between the plurality of cardholders and the plurality of merchants.

At step 506, the computer system can initialize a pair count hash table which may be used to store pairs counts associated with pairs of neighbor vertices. Each pair of neighbor vertices can be hashed using a hash function to produce a key used to identify the associated pair count within the hash table. In some embodiments, the hash function may be order invariant with respect to an order of a pair of neighbor vertices, such that the hash of a pair of neighbor vertices is order invariant. This may prevent the computer system from "double recording" pairs of neighbor vertices in the hash table, e.g., recording separate counts for pairs $\{v_1, v_2\}$ and $\{v_2, v_1\}$, even though these pairs comprise the same two vertices. This operation generally correspond to line 604 of the pseudocode of FIG. 6.

Additionally, at step 506 the computer system can initialize a left vertex list hash table used to store a plurality of left vertex identifiers corresponding to the plurality of left vertices. The left vertex list may be used to identify pairs of neighbor vertices associated with each left vertex (e.g., neighbor vertices that form a wedge with that left vertex), which may be used to determine the number of 2×2-bicliques containing each left vertex, in order to produce a plurality of vertex 2×2-biclique counts. This operation generally corresponds to line 606 of the pseudocode of FIG. 6.

Further, at step 506 the computer system can initialize a plurality of vertex 2×2-biclique counts, e.g., to zero. These vertex 2×2-biclique counts may be incremented during subsequent steps of the flowchart of FIG. 5A, and may eventually equal the total number of 2×2-bicliques corresponding to the plurality of vertices in the bipartite graph. This operation generally correspond to line 602 of the pseudocode of FIG. 6. In line 602, the plurality of vertex 2×2-biclique counts are initialized as an empty data structure bc_vertex.

As described above with reference to FIGS. 3A and 3B, it may be preferable to perform methods according to embodiments on the side of the bipartite graph with lower sum of degree squared, which may be referred to as the left side of the bipartite graph. As such, optionally at step 508, the computer system may identify the plurality of left vertices in the bipartite graph and the plurality of right vertices in the bipartite graph. This optimization can reduce the amount of time it takes to perform subsequent method steps, and can improve the speed and efficiency of 2×2-biclique quantification methods according to embodiments. Step 508 can be understood with reference to FIG. 3B and the description of FIG. 3B further above, and will not be repeated at the same level of detail. As a general summary however, at step 320 of FIG. 3B, the computer system can identify a plurality of first vertices and a plurality of second vertices in the bipartite graph. At step 322, the computer system can determine a first sum of degree squared corresponding to the plurality of first vertices. At step 324, the computer system can determine a second sum of degree squared corresponding to the plurality of second vertices. At step 326, the computer system can identify the plurality of left vertices and the plurality of right vertices by comparing the first sum of degree squared to the second sum of degree squared, and can, e.g., identify the plurality of left vertices as the plurality of first vertices if the plurality of first vertices has a lower sum of degree squared, and identify the plurality of left vertices as the plurality of second vertices if the plurality of second vertices has a lower sum of degree squared.

Returning to FIG. 5A, the computer system can determine a plurality of pair counts and a left vertex list by performing a series of steps for each left vertex in the plurality of left vertices. These steps generally correspond to the "for loop" of lines 608-616 of FIG. 6. At step 510, for each left vertex, the computer system can determine a plurality of neighbor vertices of that left vertex in the plurality of right vertices. Each neighbor vertex can correspond to a data object of the second data type that a database indicates has interacted with a data object of the first data type corresponding to the left vertex. For example, if the plurality of left vertices correspond to a plurality of credit card holders (identified, e.g., by payment account numbers, which can comprise data objects of the first data type), and the plurality of right vertices correspond to a plurality of merchants (identified, e.g., by merchant identifier numbers, which can comprise data objects of the second data type), then the interactions between these data objects could comprise transactions conducted between the cardholders and the merchants.

The computer system can determine the neighbor vertices for each left vertex using a variety of methods, which may depend on the data structure or representation of the bipartite graph. As an example if the bipartite graph is represented as a data table in a database, a query (such as an SQL query), e.g., comprising SELECT statements, could be used to determine the neighbor vertices (which could be represented by rows in one column of the data table) for each left vertex (which could be represented by rows in the other column of the data table). Alternatively, if each vertex is represented by a data structure comprising, e.g., a vertex identifier and an array of pointers to neighboring vertices, then the computer system can determine the neighbor vertices for each left vertex using such arrays of pointers. For other bipartite graph representations other methods can be used and an exhaustive list will not be provided.

At step 512, the computer system can determine one or more pairs of neighbor vertices from each plurality of neighbor vertices corresponding to each left vertex. As described further below, these pairs of neighbor vertices can be used to determine pair counts, which can be used to determine a plurality of vertex 2×2-biclique counts corresponding to 2×2-bicliques in the bipartite graph. In some embodiments, the computer system can use two-element enumeration to determine these one or more pairs of neighbor vertices. These one or more pairs of neighbor vertices can comprise one or more two-element subsets of neighbor vertices determined via this enumeration. As described above, this is in contrast to many state-of-the-art 2×2-biclique counting methods, which use two-hop wedge detection instead. This two-element enumeration process greatly improves CPU cache locality compared to two-hop wedge detection, and consequently methods according to embodiments are faster and more efficient than current state-of-the-art 2×2-biclique counting methods.

Step 512 generally corresponds to line 610 of the pseudocode of FIG. 6. The "2-Element-Enumeration" method of line 610 can be better understood with reference to line 420-428 of the pseudocode of FIG. 4. At line 420, the computer system can initialize a data structure (e.g., a list) used to store two-element subsets (i.e., pairs) of neighbor vertices. In the "for loop" of lines 422-426, for a plurality of neighbor vertices comprising n neighbor vertices, the computer system can iterate through the first n−1 neighbor vertices. In the inner "for loop" of line 424, the computer system can iterate through the i+1 to $n^{th}$ neighbor vertices. Each pair of neighbor vertices based on i, j can be added to the list of pairs of neighbor vertices. The list of pairs of neighbor vertices can be returned at line 428. In this way, the computer system can determine one or more pairs of neighbor vertices for each plurality of neighbor vertices.

At step 514 of FIG. 5A, for each pair of neighbor vertices of the one or more pairs of neighbor vertices, the computer system can increment a pair count associated with that pair of neighbor vertices. Step 514 generally corresponds to line 614 of the pseudocode of FIG. 6. The computer system can increment the pair counts using the pair count hash table (or hash map or any other suitable data structure) initialized at step 506. The computer system can index the hash table using a hash of the pair of neighbor vertices in order to identify a corresponding neighbor pair count, then increase that pair count by one, thereby incrementing the pair count. As described above, in some embodiments, the hash of a pair of neighbor vertices may be order invariant with respect to the order of that pair of neighbor vertices, e.g., to prevent forming separate counts for equivalent pairs of neighbor vertices, e.g., $\{v_1, v_2\}$ and $\{v_2, v_1\}$.

At step 516, for each pair of neighbor vertices of the one or more pairs of neighbor vertices, the computer system can add the left vertex to the left vertex list in association with that pair of neighbor vertices. Step 516 generally corresponds to line 616 of the pseudocode of FIG. 6. As indicated in FIG. 6, the computer system can index the left vertex list neighbor_list using a pair of neighbor vertex, then append a left vertex identifier to the left vertex list. As described below, the left vertex list may be used to determine a plurality of vertex 2×2-biclique counts corresponding to a plurality of vertices in the bipartite graph.

At step 518 the computer system can determine a plurality of 2×2-biclique counts based on the plurality of pair counts and the left vertex list. This plurality of 2×2-biclique counts may comprise a plurality of vertex 2×2-biclique counts corresponding to a plurality of vertices in in the bipartite graph, as described above. Step 518 generally corresponds to the "for loop" of lines 618-626 of FIG. 6. In some embodiments, the plurality of vertex 2×2-biclique counts may comprise one or more first vertex 2×2-biclique counts, one or more second vertex 2×2-biclique counts, and one or more common neighbor vertex 2×2-biclique counts, which may correspond to one or more first vertices in a pair of neighbor vertices, one or more second vertices in a pair of neighbor vertices, and one or more common neighbor vertices of that pair of neighbor vertices respectively. One exemplary method for determining the plurality of vertex 2×2-biclique counts is described below with reference to FIG. 5B.

Figure 5B:
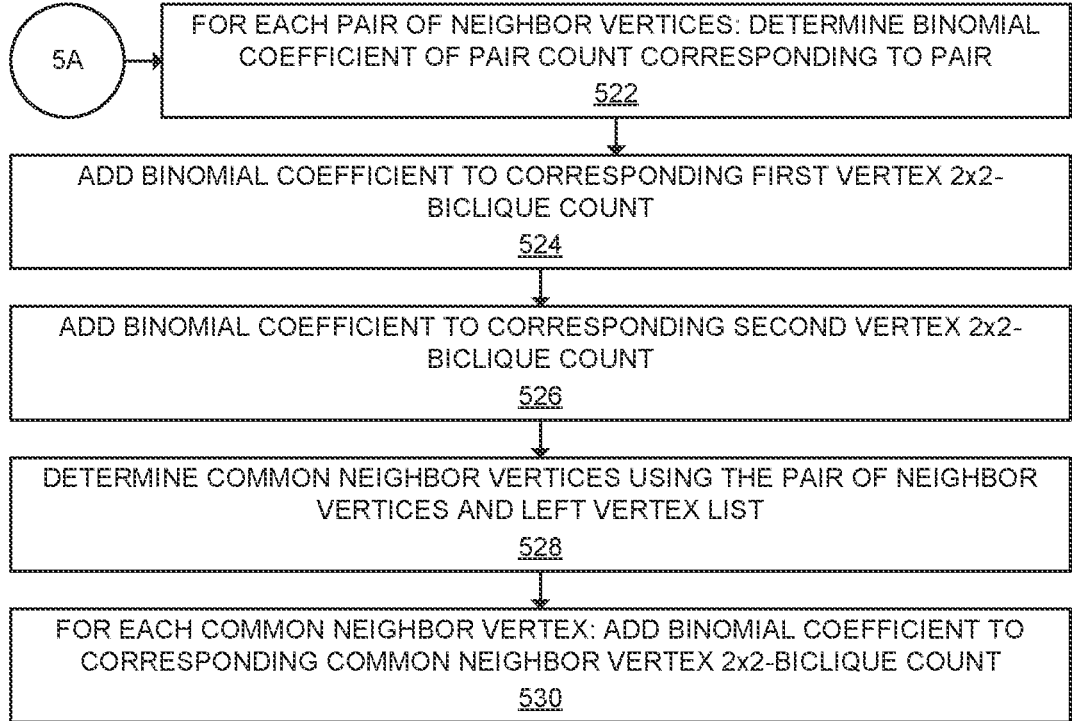

Referring to FIG. 5B, at step 522, for each pair of neighbor vertices the computer system can determine a binomial coefficient of a pair count corresponding to that pair of neighbor vertices and two. The computer system can iterate through the pair of neighbor vertices to perform step 522 using e.g., the left vertex list hash table or the neighbor pair count hash table. This binomial coefficient is effectively equal to the number of two-element subsets of a pair count sized set of vertices, which is equal to a number of 2×2-bicliques including that pair of vertices and a given pair of neighbor vertices. For example, if the pair count associated with a particular pair of neighbor vertices is four, that indicates that four vertices are neighbors of both vertices in that pair of neighbor vertices. There are six two-element subsets of four vertices. As such, that pair of neighbor vertices is part of six 2×2-bicliques based on the pair count of four.

At step 524, the computer system can add the binomial coefficient to a corresponding first vertex 2×2-biclique count of the one or more corresponding first vertex 2×2-biclique counts. This corresponding first vertex 2×2-biclique count can correspond to a first vertex in a pair of neighbor vertices. Step 524 generally corresponds to line 620 of the pseudo-code of FIG. 6. Likewise, at step 526, the computer system can add the binomial coefficient to a corresponding second vertex 2×2-biclique count of the one or more corresponding second vertex 2×2-biclique counts. The corresponding second vertex 2×2-biclique count can correspond to a second vertex in a pair of neighbor vertices (e.g., paired to the first vertex). Step 526 generally corresponds to line 622 of the pseudocode of FIG. 6. In this way, the computer system can increment the vertex 2×2-biclique counts associated with each vertex in each pair of neighbor vertices.

These pairs of vertices may comprise right vertices in the bipartite graph. The computer system may also increment the vertex 2×2-biclique counts associated with left vertices in the bipartite graph. The computer system may use the left vertex list for this purpose. This process generally corresponds to the "for loop" of lines 624 and 626. As such, at step 528 of FIG. 5B, the computer system can determine one or more common neighbor vertices using the pair of neighbor vertices and the left vertex list, e.g., by indexing the left vertex list using the pair of neighbor vertices as an index. These common neighbor vertices may comprise left vertices that are common neighbors of the pairs of neighbor vertices (which may comprise right vertices). Step 528 of FIG. 5B generally corresponds to line 624 of FIG. 6.

Afterwards, at step 530, for each common neighbor vertex of the one or more common neighbor vertices, the computer system can add the binomial coefficient to a corresponding common neighbor vertex 2×2-biclique count of the plurality of common neighbor vertex 2×2-biclique counts. In this way, the computer system can increment the vertex 2×2-biclique counts associated with each common neighbor vertex of each pair of neighbor vertices. By repeating the steps described above for each pair of neighbor vertices in the pair count hash table, the computer system can determine a plurality of vertex 2×2-biclique counts corresponding to a plurality of vertices in the bipartite graph.

Returning to FIG. 5A, at step 520, the computer system can provide the plurality of vertex 2×2-biclique counts responsive to the request, e.g., to a requestor. For example, if a server computer associated with a streaming service requested a plurality of vertex 2×2-biclique counts corresponding to a bipartite graph of users and streamed movies, the computer system could provide that plurality of vertex 2×2-biclique count to the server computer. The computer system can provide the plurality of vertex 2×2-biclique count responsive to the request in any appropriate manner. For example, if the computer system received the request as a message over the Internet, the computer system could send the plurality of vertex 2×2-biclique counts back to the requestor as a message over the Internet.

As described above with reference to the 2×2-biclique counting methods of FIGS. 3A-3C, 4, and 11, 2×2-biclique counting methods according to embodiments can be implemented as relational queries. As such, they can be implemented on distributed computing clusters through declarative interfaces, e.g., on relational databases, Spark, and/or HPC systems. In some embodiments, the database described above may comprise a relational database, and methods according to embodiments (e.g., as described above with reference to FIGS. 5A, 5B, and 6) may be implemented as a query on the relational database. Such a query can be implemented using a Structured Query Language (SQL) or in any other appropriate manner. A relational implementation similar to the relational implementation of FIG. 11 can be used to implement these methods.

Likewise as described above with the 2×2-biclique counting methods of FIGS. 3A-4C, 4, 12, and 13, 2×2-biclique counting methods according to embodiments can be implemented using distributed computing systems. As such, in some embodiments the computer system can comprise a distributed computing system comprising a plurality of distributed computing nodes, and the methods described above with reference to FIGS. 5A, 5B and 6 can be implemented as distributed methods of vertex 2×2-biclique counting, using an implementation similar to the implementations described above with reference to FIGS. 12 and 13.

VI. PER EDGE 2×2-BICLIQUE COUNTING METHODS

In addition to exact 2×2-biclique counting methods and per-vertex 2×2-biclique counting methods, some embodiments of the present disclosure are directed to per-edge 2×2-biclique counting methods. Such methods can be used to determine a plurality of edge 2×2-biclique counts corresponding to a plurality of edges in a bipartite graph. These methods are described below with reference to FIGS. 3B, 7A, 7B, and 8. Such methods can be used to efficiently quantify interactions between two data types in a database which can be represented as elements (e.g., vertices) in a bipartite graph. Such a bipartite graph can comprise a plurality of left vertices correspond to data objects of a first data type and a plurality of right vertices corresponding to data objects of a second data type. For example, the plurality of left vertices could correspond to a plurality of user data records (data objects of a first data type) for users of a streaming service, and the plurality of right vertices could correspond to a plurality of movie data records (data objects of a second data type) for movies hosted by that streaming service.

As described above, a plurality of left vertices in a bipartite graph can be connected to a plurality of right vertices in the bipartite graph by a plurality of edges, e.g., in the context of a streaming service bipartite graph, a plurality of edges could indicate that users corresponding to user data objects (left vertices) have watched movies corresponding to movie data objects (right vertices). The interactions between data objects of the first data type and data objects of the second data type can form or otherwise be represented by 2×2-biclique subgraphs in the bipartite graph. As such, the computer system can quantify these interactions by determining a plurality of edge 2×2-biclique counts corresponding to a plurality of edges in the bipartite graph. Such edge 2×2-biclique counts could be used to determine, e.g., which movies on a streaming service (represented by vertices) are commonly watched with other movies by large numbers of users, e.g., for the purpose of recommending movies to users.

Referring to FIG. 7A, at step 702 a computer system can receive a request to quantify the interactions between data objects of the first data type and the second data type in a database. In some embodiments, the computer system can receive this request from a requestor, which could comprise, e.g., a client computer of the computer system (which may comprise a server computer). As an example, the computer system could be part of an organization that provides data analysis services to clients, e.g., in the context of consumer-product bipartite graphs, the computer system could count 2×2-bicliques associated with transaction edges for the purpose of identifying products that are commonly purchased together and products that are purchased by large numbers of customers, which may be useful information to advertising or marketing clients. The computer system could receive such a request over a communication network such as the Internet, or via any other suitable means. As another example, the computer system could comprise a distributed computing system (or part of a distributed computing system) comprising a plurality of computing nodes. In such a case, the computer system could receive the request to quantify interactions from a coordinator computer (which may be a part of the distributed computing system), and which may coordinate and distribute computing tasks among computing nodes in the distributed computing system for the purpose of performing parallel computing.

At step 704, the computer system can query a database or otherwise retrieve data corresponding to (or representative of) the bipartite graph. The computer system can, for example, query a relational database using a query language, such as the Structured Query Language (SQL). In some embodiments, the bipartite graph can be represented by a data table (stored in the database) that contains columns and rows of data objects (e.g., data objects of a first data type and data objects of a second data type) corresponding to the plurality of left vertices and the plurality of right vertices. For example, in some embodiments the plurality of left vertices can correspond to a first plurality of rows in a first column in the data table, and the plurality of right vertices can correspond to a plurality of rows in a second column in the data table.

As an example, the data table could comprise a plurality of transaction records (rows) corresponding to transactions performed between a plurality of users (identified by a plurality of data objects of the first data type in the first column) and a plurality of resource providers (identified by a plurality of data objects of the second data type in the second column, which may comprise resource provider data records corresponding to a plurality of resource providers). In some embodiments, this plurality of users could comprise a plurality of cardholders and the plurality of resource providers could comprise a plurality of merchants. As such, the plurality of left vertices in the bipartite graph can correspond to the plurality of users (e.g., cardholders) and e.g., the first column in the data table, and the plurality of right vertices in the bipartite graph could correspond to a plurality of resource providers (e.g., merchants) and e.g., the second column in the data table. The plurality of edges in the bipartite graph can correspond to a plurality of interactions between the plurality of users and the plurality of resource providers, and can further correspond to the rows in the data table. In some embodiments, the plurality of interactions can comprise a plurality of credit card transactions between the plurality of cardholders and the plurality of merchants.

At step 706, the computer system can initialize a pair count hash table which may be used to store pairs counts associated with pairs of neighbor vertices. Each pair of neighbor vertices can be hashed using a hash function to produce a key used to identify the associated pair count within the hash table. In some embodiments, the hash function may be order invariant with respect to an order of a pair of neighbor vertices, such that the hash of a pair of neighbor vertices is order invariant. This may prevent the computer system from "double recording" pairs of neighbor vertices in the hash table, e.g., recording separate counts for pairs $\{v_1, v_2\}$ and $\{v_2, v_1\}$, even though these pairs comprise the same two vertices. This operation generally correspond to line 804 of the pseudocode of FIG. 8.

Additionally, at step 706 the computer system can initialize a left vertex list hash table used to store a plurality of left vertex identifiers corresponding to the plurality of left vertices. The left vertex list hash table may be used to identify pairs of neighbor vertices associated with each left vertex (e.g., neighbor vertices that form a wedge with that left vertex), which may be used to determine the number of 2×2-bicliques containing each left vertex, in order to produce a plurality of edge 2×2-biclique counts. This operation generally correspond to line 806 of the pseudocode of FIG. 8.

Further, at step 706 the computer system can initialize a plurality of edge 2×2-biclique counts, e.g., to zero. These edge 2×2-biclique counts may be incremented during subsequent steps of the flowchart of FIG. 7A, and may eventually equal the total number of 2×2-bicliques corresponding to the plurality of edges in the bipartite graph. This operation generally correspond to line 802 of the pseudocode of FIG. 8. In line 802, the plurality of edge 2×2-biclique counts are initialized as an empty data structure bc_edge.

As described above with reference to FIGS. 3A and 3B, it may be preferable to perform methods according to embodiments on the side of the bipartite graph with lower sum of degree squared, which may be referred to as the left side of the bipartite graph. As such, optionally at step 708, the computer system may identify the plurality of left vertices in the bipartite graph and the plurality of right vertices in the bipartite graph. This optimization can reduce the amount of time it takes to perform subsequent method steps, and can improve the speed and efficiency of 2×2-biclique quantification methods according to embodiments. Step 708 can be understood with reference to FIG. 3B and the description of FIG. 3B further above, and will not be repeated at the same level of detail. As a general summary however, at step 320 of FIG. 3B, the computer system can identify a plurality of first vertices and a plurality of second vertices in the bipartite graph. At step 322, the computer system can determine a first sum of degree squared corresponding to the plurality of first vertices. At step 324, the computer system can determine a second sum of degree squared corresponding to the plurality of second vertices. At step 326, the computer system can identify the plurality of left vertices and the plurality of right vertices by comparing the first sum of degree squared to the second sum of degree squared, and can, e.g., identify the plurality of left vertices as the plurality of first vertices if the plurality of first vertices has a lower sum of degree squared, and identify the plurality of left vertices as the plurality of second vertices if the plurality of second vertices has a lower sum of degree squared.

Returning to FIG. 7A, the computer system can determine a plurality of pair counts and a left vertex list by performing a series of steps for each left vertex in the plurality of left vertices. These steps generally correspond to the "for loop" of lines 808-816 of FIG. 8. At step 710, for each left vertex, the computer system can determine a plurality of neighbor vertices of that left vertex in the plurality of right vertices. Each neighbor vertex can correspond to a data object of the second data type that a database indicates has interacted with a data object of the first data type corresponding to the left vertex. For example, if the plurality of left vertices correspond to a plurality of credit card holders (identified, e.g., by payment account numbers, which can comprise data objects of the first data type), and the plurality of right vertices correspond to a plurality of merchants (identified, e.g., by merchant identifier numbers, which can comprise data objects of the second data type), then the interactions between these data objects could comprise transactions conducted between the cardholders and the merchants.

The computer system can determine the neighbor vertices for each left vertex using a variety of methods, which may depend on the data structure or representation of the bipartite graph. As an example if the bipartite graph is represented as a data table in a database, a query (such as an SQL query), e.g., comprising SELECT statements, could be used to determine the neighbor vertices (which could be represented by rows in one column of the data table) for each left vertex (which could be represented by rows in the other column of the data table). Alternatively, if each vertex is represented by a data structure comprising, e.g., a vertex identifier and an array of pointers to neighboring vertices, then the computer system can determine the neighbor vertices for each left vertex using such arrays of pointers. For other bipartite graph representations other methods can be used and an exhaustive list will not be provided.

At step 712, the computer system can determine one or more pairs of neighbor vertices from each plurality of neighbor vertices corresponding to each left vertex. As described further below, these pairs of neighbor vertices can be used to determine pair counts, which can be used to determine a plurality of edge 2×2-biclique counts corresponding to bicliques in the bipartite graph. In some embodiments, the computer system can use two-element enumeration to determine these one or more pairs of neighbor vertices. These one or more pairs of neighbor vertices can comprise one or more two-element subsets of neighbor vertices determined via this enumeration. As described above, this is in contrast to many state-of-the-art 2×2-biclique counting methods, which use two-hop wedge detection instead. This two-element enumeration process greatly improves CPU cache locality compared to two-hop wedge detection, and consequently methods according to embodiments are faster and more efficient than current state-of-the-art 2×2-biclique counting methods.

Step 712 generally corresponds to line 810 of the pseudo-code of FIG. 8. The "2-Element-Enumeration" method of line 810 can be better understood with reference to line 420-428 of the pseudocode of FIG. 4. At line 420, the computer system can initialize a data structure (e.g., a list) used to store two-element subsets (i.e., pairs) of neighbor vertices. In the "for loop" of lines 422-426, for a plurality of neighbor vertices comprising n neighbor vertices, the computer system can iterate through the first n−1 neighbor vertices. In the inner "for loop" of line 424, the computer system can iterate through the i+1 to n$^{th}$ neighbor vertices. Each pair of neighbor vertices based on i, j can be added to the list of pairs of neighbor vertices. The list of pairs of neighbor vertices can be returned at line 428. In this way, the computer system can determine one or more pairs of neighbor vertices for each plurality of neighbor vertices.

At step 714 of FIG. 7A, for each pair of neighbor vertices of the one or more pairs of neighbor vertices, the computer system can increment a pair count associated with that pair of neighbor vertices. Step 714 generally corresponds to line 814 of the pseudocode of FIG. 8. The computer system can increment the pair counts using the pair count hash table (or hash map or any other suitable data structure) initialized at step 706. The computer system can index the hash table using a hash of the pair of neighbor vertices in order to identify a corresponding neighbor pair count, then increase that pair count by one, thereby incrementing the pair count. As described above, in some embodiments, the hash of a pair of neighbor vertices may be order invariant with respect to the order of that pair of neighbor vertices, e.g., to prevent forming separate counts for equivalent pairs of neighbor vertices, e.g., $\{v_1, v_2\}$ and $\{v_2, v_1\}$.

At step 716, for each pair of neighbor vertices of the one or more pairs of neighbor vertices, the computer system can add the left vertex to the left vertex list in association with that pair of neighbor vertices. Step 716 generally corresponds to line 816 of the pseudocode of FIG. 8. As indicated in FIG. 8, the computer system can index the left vertex list neighbor_list using a pair of neighbor vertex, then append a left vertex identifier to the left vertex list. As described below, the left vertex list may be used to determine a plurality of edge 2×2-biclique counts corresponding to a plurality of edges in the bipartite graph.

At step 718 the computer system can determine a plurality of 2×2-biclique counts based on the plurality of pair counts and the left vertex list. This plurality of 2×2-biclique counts may comprise a plurality of edge 2×2-biclique counts corresponding to a plurality of edges in the bipartite graph, as described above. Step 718 generally corresponds to the "for loop" of lines 818-824 of FIG. 8. In some embodiments, the plurality of edge 2×2-biclique counts can comprise one or more first edge 2×2-biclique counts and one or more second edge 2×2-biclique counts. These one or more first edge 2×2-biclique counts can correspond to one or more first edges between left vertices and one or more first neighbor vertices of the pairs of neighbor vertices. Likewise, the one or more second edge 2×2-biclique counts can correspond to one or more second edges between left vertices and one or more second neighbor vertices of the pairs of neighbor vertices. One exemplary method for determining the plurality of edge 2×2-biclique counts is described below with reference to FIG. 7B.

Figure 7B:
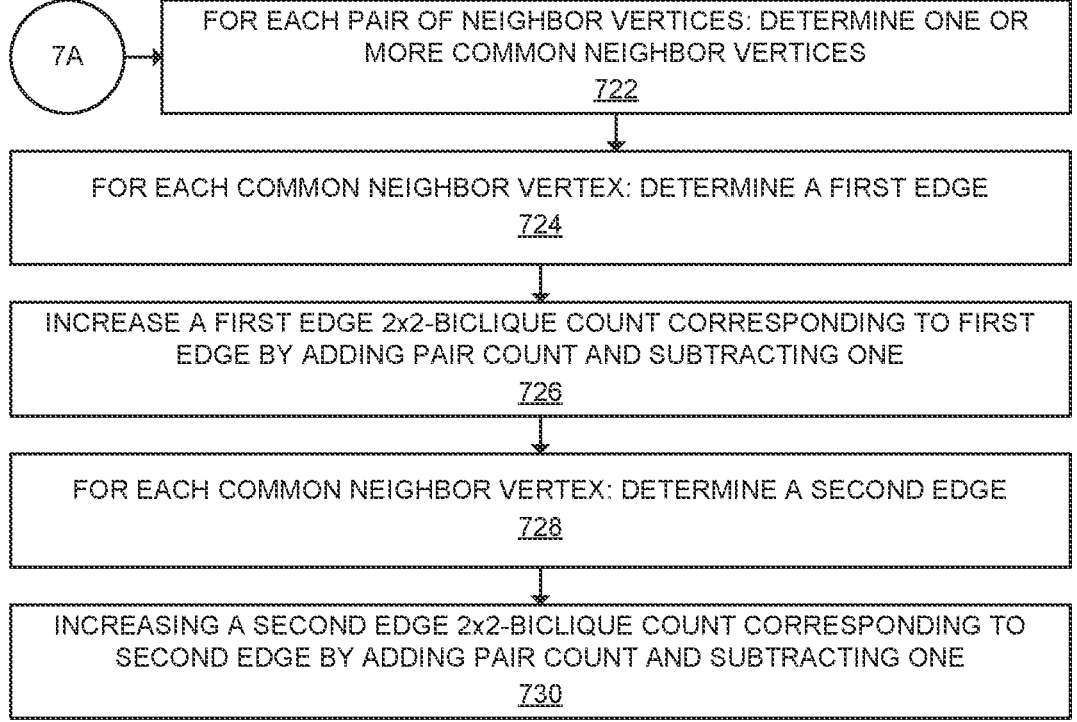

Referring to FIG. 7B, at step 722, for each pair of neighbor vertices, the computer system can determine one or more common neighbor vertices of that pair of neighbor vertices using the left vertex list. The computer system can do so by indexing the left vertex list using a hash of the pair of neighbor vertices as an index, e.g., as indicated in line 820 of FIG. 8. A pair of neighbor vertices and its common neighbor vertices can form 2×2-bicliques, e.g., if a pair of neighbor vertices has two common neighbor vertices, then a single 2×2-biclique exists for that pair of neighbor vertices. If a pair of neighbor vertices instead had four common neighbor vertices, then six 2×2-bicliques exist for that pair of neighbor vertices. As such, determining the one or more common neighbor vertices can enable the computer system to determine a plurality of edge 2×2-biclique counts.

At step 724, for each common neighbor vertex of the one or more common neighbor vertices, the computer system can determine a first edge corresponding to the common neighbor vertex and a first vertex of a pair of neighbor vertices. Subsequently, at step 726, the computer system can increase a first edge 2×2-biclique count of the one or more first edge 2×2-biclique counts corresponding to the first edge. The computer system can do so by adding a pair count corresponding to the pair of neighbor vertices to the first edge 2×2-biclique count and subtracting one. Steps 724 and 726 of FIG. 7B generally correspond to line 822 of FIG. 8. The computer system can avoid double counting 2×2-bicliques by subtracting one from the associated pair count.

At step 728, for each common neighbor vertex of the one or more common neighbor vertices, the computer system can determine a second edge corresponding to the common neighbor vertex and a second vertex of a pair of neighbor vertices. Subsequently, at step 730, the computer system can increase a second edge 2×2-biclique count of the one or more second edge 2×2-biclique counts corresponding to the second edge. The computer system can do so by adding a pair count corresponding to the pair of neighbor vertices to the second edge 2×2-biclique count and subtracting one. Steps 728 and 730 of FIG. 7B generally correspond to line 824 of FIG. 8. As described above, the computer system can avoid double counting 2×2-bicliques by subtracting one from the associated pair count. By repeating the steps described above for each pair of neighbor vertices in the pair count hash table, the computer system can determine a plurality of edge 2×2-biclique counts corresponding to a plurality of edges in the bipartite graph.

Returning to FIG. 7A, at step 720, the computer system can provide the plurality of edge 2×2-biclique counts responsive to the request, e.g., to a requestor. For example, if a server computer associated with a streaming service requested a plurality of edge 2×2-biclique counts corresponding to a bipartite graph of users and streamed movies, the computer system could provide that plurality of edge 2×2-biclique count to the server computer. The computer system can provide the plurality of edge 2×2-biclique count responsive to the request in any appropriate manner. For example, if the computer system received the request as a message over the Internet, the computer system could send the plurality of edge 2×2-biclique counts back to the requestor as a message over the Internet.

As described above with reference to the 2×2-biclique counting methods of FIGS. 3A-3C, 4, and 11, 2×2-biclique counting methods according to embodiments can be implemented as relational queries. As such, they can be implemented on distributed computing clusters through declarative interfaces, e.g., on relational databases, Spark, and/or HPC systems. In some embodiments, the database described above may comprise a relational database, and methods according to embodiments (e.g., as described above with reference to FIGS. 7A, 7B, and 8) may be implemented as a query on the relational database. Such a query can be implemented using a Structured Query Language (SQL) or in any other appropriate manner. A relational implementation similar to the relational implementation of FIG. 11 can be used to implement these methods.

Likewise as described above with the 2×2-biclique counting methods of FIGS. 3A-4C, 4, 12, and 13, 2×2-biclique counting methods according to embodiments can be implemented using distributed computing systems. As such, in some embodiments the computer system can comprise a distributed computing system comprising a plurality of distributed computing nodes, and the methods described above with reference to FIGS. 7A, 7B and 8 can be implemented as distributed methods of edge 2×2-biclique counting, using an implementation similar to the implementations described above with reference to FIGS. 12 and 13.

VII. 2×2-BICLIQUE ENUMERATION METHODS

In addition to exact 2×2-biclique counting methods, pervertex 2×2-biclique counting methods, and per-edge 2×2-biclique counting methods, some embodiments of the present disclosure are directed to 2×2-biclique enumeration. Unlike the 2×2-biclique counting methods described above, the result of 2×2-biclique enumeration is a list of 2×2-bicliques in a bipartite graph, and not, e.g., a count or counts of such 2×2-bicliques. These 2×2-biclique enumeration methods are described below with reference to FIGS. 3B, 9A, 9B, and 10. Such methods can be used to efficiently quantify interactions between two data types in a database which can be represented as elements (e.g., vertices) in a bipartite graph. Such a bipartite graph can comprise a plurality of left vertices corresponding to data objects of a first data type and a plurality of right vertices corresponding to data objects of a second data type. For example, the plurality of left vertices could correspond to a plurality of user data records (data objects of a first data type) for users of a streaming service, and the plurality of right vertices could correspond to a plurality of movie data records (data objects of a second data type) for movies hosted by that streaming service.

As described above, a plurality of left vertices in a bipartite graph can be connected to a plurality of right vertices in the bipartite graph by a plurality of edges, e.g., in the context of a streaming service bipartite graph, a plurality of edges could indicate that users corresponding to user data objects (left vertices) have watched movies corresponding to movie data objects (right vertices). The interactions between data objects of the first data type and data objects of the second data type can form or otherwise be represented by 2×2-biclique subgraphs in the bipartite graph. As such, the computer system can quantify these interactions by determining a plurality of 2×2-biclique subgraphs in the bipartite graph. Such 2×2-biclique subgraphs could be used to determine, e.g., which movies on a streaming service (represented by vertices) are commonly watched with other movies, e.g., for the purpose of recommending movies to users.

Referring to FIG. 9A, at step 902 a computer system can receive a request to quantify the interactions between data objects of the first data type and the second data type in a database. In some embodiments, the computer system can receive this request from a requestor, which could comprise, e.g., a client computer of the computer system (which may comprise a server computer). As an example, the computer system could be part of an organization that provides data analysis services to clients, e.g., in the context of consumer-product bipartite graphs, the computer system could determine 2×2-bicliques subgraphs associated with transactions for the purpose of identifying products that are commonly purchased together, which may be useful information to advertising or marketing clients. The computer system could receive such a request over a communication network such as the Internet, or via any other suitable means. As another example, the computer system could comprise a distributed computing system (or part of a distributed computing system) comprising a plurality of computing nodes. In such a case, the computer system could receive the request to quantify interactions from a coordinator computer (which may be a part of the distributed computing system), and which may coordinate and distribute computing tasks among computing nodes in the distributed computing system for the purpose of performing parallel computing.

At step 904, the computer system can query a database or otherwise retrieve data corresponding to (or representative of) the bipartite graph. The computer system can, for example, query a relational database using a query language, such as the Structured Query Language (SQL). In some embodiments, the bipartite graph can be represented by a data table (stored in the database) that contains columns and rows of data objects (e.g., data objects of a first data type and data objects of a second data type) corresponding to the plurality of left vertices and the plurality of right vertices. For example, in some embodiments the plurality of left vertices can correspond to a first plurality of rows in a first column in the data table, and the plurality of right vertices can correspond to a plurality of rows in a second column in the data table.

As an example, the data table could comprise a plurality of transaction records (rows) corresponding to transactions performed between a plurality of users (identified by a plurality of data objects of the first data type in the first column) and a plurality of resource providers (identified by a plurality of data objects of the second data type in the second column, which may comprise resource provider data records corresponding to a plurality of resource providers). In some embodiments, this plurality of users could comprise a plurality of cardholders and the plurality of resource providers could comprise a plurality of merchants. As such, the plurality of left vertices in the bipartite graph can correspond to the plurality of users (e.g., cardholders) and e.g., the first column in the data table, and the plurality of right vertices in the bipartite graph could correspond to a plurality of resource providers (e.g., merchants) and e.g., the second column in the data table. The plurality of edges in the bipartite graph can correspond to a plurality of interactions between the plurality of users and the plurality of resource providers, and can further correspond to the rows in the data table. In some embodiments, the plurality of interactions can comprise a plurality of credit card transactions between the plurality of cardholders and the plurality of merchants.

At step 906, the computer system can initialize a pair count hash table which may be used to store pairs counts associated with pairs of neighbor vertices. Each pair of neighbor vertices can be hashed using a hash function to produce a key used to identify the associated pair count within the hash table. In some embodiments, the hash function may be order invariant with respect to an order of a pair of neighbor vertices, such that the hash of a pair of neighbor vertices is order invariant. This may prevent the computer system from "double recording" pairs of neighbor vertices in the hash table, e.g., recording separate counts for pairs $\{v_1, v_2\}$ and $\{v_2, v_1\}$, even though these pairs comprise the same two vertices. This operation generally correspond to line 1004 of the pseudocode of FIG. 10.

Additionally, at step 906 the computer system can initialize a left vertex list hash table used to store a plurality of left vertex identifiers corresponding to the plurality of left vertices. The left vertex list hash table may be used to identify pairs of neighbor vertices associated with each left vertex (e.g., neighbor vertices that form a wedge with that left vertex), which may be used to determine the number of 2×2-bicliques containing each left vertex, in order to determine or identify a plurality of 2×2-biclique subgraphs of the bipartite graph. This operation generally correspond to line 1006 of the pseudocode of FIG. 10.

Further, at step 906 the computer system can initialize a data structure used to store data representative of the plurality of 2×2-bicliques, e.g., as an empty data structure. Data representative of the plurality of 2×2-bicliques may be added to this data structure during subsequent steps of the flowchart of FIG. 7A, and this data structure may eventually contain data representative of all 2×2-biclique subgraphs in the bipartite graph. This operation generally corresponds to line 802 of the pseudocode of FIG. 8. In line 802, empty data structure bc_enumerate is initialized.

As described above with reference to FIGS. 3A and 3B, it may be preferable to perform methods according to embodiments on the side of the bipartite graph with lower sum of degree squared, which may be referred to as the left side of the bipartite graph. As such, optionally at step 908, the computer system may identify the plurality of left vertices in the bipartite graph and the plurality of right vertices in the bipartite graph. This optimization can reduce the amount of time it takes to perform subsequent method steps and can improve the speed and efficiency of 2×2-biclique quantification methods according to embodiments.

Step 908 can be understood with reference to FIG. 3B and the description of FIG. 3B further above and will not be repeated at the same level of detail. As a general summary however, at step 320 of FIG. 3B, the computer system can identify a plurality of first vertices and a plurality of second vertices in the bipartite graph. At step 322, the computer system can determine a first sum of degree squared corresponding to the plurality of first vertices. At step 324, the computer system can determine a second sum of degree squared corresponding to the plurality of second vertices. At step 326, the computer system can identify the plurality of left vertices and the plurality of right vertices by comparing the first sum of degree squared to the second sum of degree squared, and can, e.g., identify the plurality of left vertices as the plurality of first vertices if the plurality of first vertices has a lower sum of degree squared, and identify the plurality of left vertices as the plurality of second vertices if the plurality of second vertices has a lower sum of degree squared.

Returning to FIG. 9A, the computer system can determine a plurality of pair counts and a left vertex list by performing a series of steps for each left vertex in the plurality of left vertices. These steps generally correspond to the "for loop" of lines 1008-1016 of FIG. 10. At step 910, for each left vertex, the computer system can determine a plurality of neighbor vertices of that left vertex in the plurality of right vertices. Each neighbor vertex can correspond to a data object of the second data type that a database indicates has interacted with a data object of the first data type corresponding to the left vertex. For example, if the plurality of left vertices correspond to a plurality of credit card holders (identified, e.g., by payment account numbers, which can comprise data objects of the first data type), and the plurality of right vertices correspond to a plurality of merchants (identified, e.g., by merchant identifier numbers, which can comprise data objects of the second data type), then the interactions between these data objects could comprise transactions conducted between the cardholders and the merchants.

The computer system can determine the neighbor vertices for each left vertex using a variety of methods, which may depend on the data structure or representation of the bipartite graph. As an example if the bipartite graph is represented as a data table in a database, a query (such as an SQL query), e.g., comprising SELECT statements, could be used to determine the neighbor vertices (which could be represented by rows in one column of the data table) for each left vertex (which could be represented by rows in the other column of the data table). Alternatively, if each vertex is represented by a data structure comprising, e.g., a vertex identifier and an array of pointers to neighboring vertices, then the computer system can determine the neighbor vertices for each left vertex using such arrays of pointers. For other bipartite graph representations other methods can be used and an exhaustive list will not be provided.

At step 912, the computer system can determine one or more pairs of neighbor vertices from each plurality of neighbor vertices corresponding to each left vertex. As described further below, these pairs of neighbor vertices can be used to determine or identify a plurality of 2×2-biclique subgraphs in the bipartite graph. In some embodiments, the computer system can use two-element enumeration to determine these one or more pairs of neighbor vertices. These one or more pairs of neighbor vertices can comprise one or more two-element subsets of neighbor vertices determined via this enumeration. As described above, this is in contrast to many state-of-the-art 2×2-biclique enumeration methods, which use two-hop wedge detection instead. This two-element enumeration process greatly improves CPU cache locality compared to two-hop wedge detection, and consequently methods according to embodiments are faster and more efficient than current state-of-the-art 2×2-biclique enumeration methods.

Step 912 generally corresponds to line 1010 of the pseudocode of FIG. 10. The "2-Element-Enumeration" method of line 1010 can be better understood with reference to line 420-428 of the pseudocode of FIG. 4. At line 420, the computer system can initialize a data structure (e.g., a list) used to store two-element subsets (i.e., pairs) of neighbor vertices. In the "for loop" of lines 422-426, for a plurality of neighbor vertices comprising n neighbor vertices, the computer system can iterate through the first $n-1$ neighbor vertices. In the inner "for loop" of line 424, the computer system can iterate through the i+1 to $n^{th}$ neighbor vertices. Each pair of neighbor vertices based on i, j can be added to the list of pairs of neighbor vertices. The list of pairs of neighbor vertices can be returned at line 428. In this way, the computer system can determine one or more pairs of neighbor vertices for each plurality of neighbor vertices.

At step 914, for each pair of neighbor vertices of the one or more pairs of neighbor vertices, the computer system can add the left vertex to the left vertex list in association with that pair of neighbor vertices. Step 914 generally corresponds to line 1016 of the pseudocode of FIG. 10. As indicated in FIG. 10, the computer system can index the left vertex list neighbor_list using a pair of neighbor vertex, then append a left vertex identifier to the left vertex list. As described below, the left vertex list may be used to determine a plurality of edge 2×2-biclique counts corresponding to a plurality of edges in the bipartite graph.

At step 916 the computer system can determine a plurality of 2×2-biclique subgraphs based on the left vertex list. Step 916 generally corresponds to the "for loop" of lines 1018-1024 of FIG. 10. One exemplary method for determining the plurality of edge 2×2-biclique counts is described below with reference to FIG. 9B.

Figure 9B:
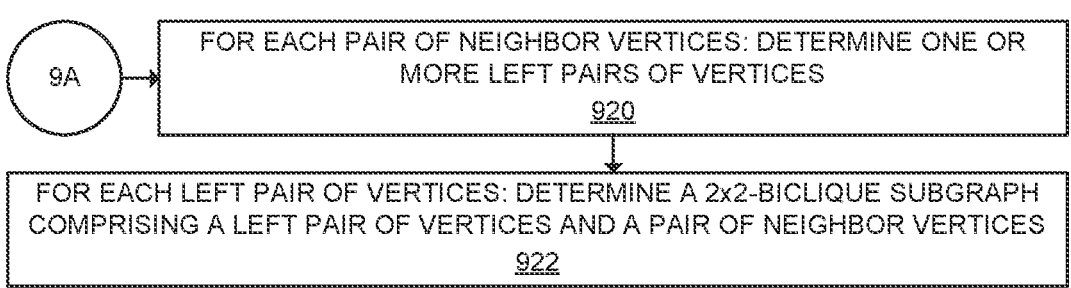

Referring now to FIG. 9B, at step 920, for each pair of neighbor vertices of a plurality of neighbor vertices corresponding to the left vertex list, the computer system can determine one or more left pairs of vertices corresponding each pair of neighbor vertices using the left vertex list. The computer system can do so by indexing the left vertex list hash table using a hash of the pair of neighbor vertices as an index, then perform a two-element enumeration on the resulting left vertices to produce the one or more left pairs of vertices, e.g., as indicated by line 1020 of FIG. 10.

At step 922, for each left pair of vertices of the one or more left pairs of vertices (and for each pair of neighbor vertices), the computer system can determine a 2×2-biclique subgraph of the plurality of 2×2-biclique subgraphs, which can comprise the left pair of vertices and the pair of neighbor vertices. Step 922 of FIG. 9B generally corresponds to lines 1022 and 1024 of FIG. 10. This step may be better understood with reference to a more concrete example. If, for example, a given pair of neighbor (right) vertices $\{v_1, v_2\}$ corresponds to three left vertices $\{u_1, u_2, u_3\}$ in the left vertex list, then at previous step 920, the computer system could determine three pairs of these left vertices: $\{u_1, u_2\}$, $\{u_1, u_3\}$, and $\{u_2, u_3\}$. Since each of these pairs are common neighbors of the pair of neighbor vertices $\{v_1, v_2\}$, each of these pairs of neighbor vertices is part of a 2×2-biclique subgraph along with the pair of neighbor vertices $\{v_1, v_2\}$. As such, the computer system can iterate through these pairs of left vertices to determine the 2×2-biclique subgraphs, i.e., $\{u_1, u_2, v_1, v_2\}$, $\{u_1, u_3, v_1, v_2\}$, and $\{u_2, u_3, v_1, v_2\}$, which can be stored in the data structure initialized at step 906. By repeating the steps described above for each pair of neighbor vertices in the left vertex list hash table, the computer system can determine a plurality of 2×2-biclique subgraphs corresponding to the bipartite graph.

Returning to FIG. 9A, at step 918, the computer system can provide the plurality of 2×2-biclique subgraphs (or any suitable data structure representative of the plurality of 2×2-biclique subgraphs, e.g., the data structure bc_enumerate described above with reference to FIG. 10) responsive to the request, e.g., to a requestor. For example, if a server computer associated with a streaming service requested a plurality of 2×2-biclique subgraphs corresponding to a bipartite graph of users and streamed movies, the computer system could provide that plurality of 2×2-biclique subgraphs to the server computer. The computer system can provide the plurality of 2×2-biclique subgraphs responsive to the request in any appropriate manner. For example, if the computer system received the request as a message over the Internet, the computer system could send the plurality of 2×2-biclique subgraphs (or data representative thereof) back to the requestor as a message over the Internet.

As described above with reference to the 2×2-biclique counting methods of FIGS. 3A-3C, 4, and 11, 2×2-biclique counting methods according to embodiments can be implemented as relational queries. Similarly, 2×2-biclique enumeration methods according to embodiments can be implemented as relational queries, and as such, they can be implemented on distributed computing clusters through declarative interfaces, e.g., on relational databases, Spark, and/or HPC systems. In some embodiments, the database described above may comprise a relational database, and methods according to embodiments (e.g., as described above with reference to FIGS. 9A, 9B, and 10) may be implemented as a query on the relational database. Such a query can be implemented using a Structured Query Language (SQL) or in any other appropriate manner. A relational implementation similar to the relational implementation of FIG. 11 can be used to implement these methods.

Likewise as described above with the 2×2-biclique counting methods of FIGS. 3A-4C, 4, 12, and 13, 2×2-biclique counting methods according to embodiments can be implemented using distributed computing systems. Similarly, 2×2-biclique enumeration methods according to embodiments can be implemented using distributed computing systems, and as such, in some embodiments the computer system can comprise a distributed computing system comprising a plurality of distributed computing nodes, and the methods described above with reference to FIGS. 9A, 9B and 10 can be implemented as distributed methods of 2×2-biclique enumeration, using an implementation similar to the implementations described above with reference to FIGS. 12 and 13.

VIII. EXPERIMENTAL RESULTS

Several experiments were conducted in order to evaluate the execution time of some methods according to embodiments. The experimental data shows that embodiments of the present disclosure can improve a computer system by providing for highly parallelizable methods of 2×2-biclique counting and enumeration. As shown by Tables 3-6 in FIGS. 16-19, execution times decreased as the number of distributed computing nodes increased, demonstrating that methods according to embodiments are amenable to parallelization. By contrast, existing state-of-the-art methods of 2×2- biclique counting and enumeration are not amenable to parallelization. Additionally, methods according to embodiments minimize the volume of unnecessary network traffic between computing nodes, enabling 2×2-biclique counting and enumeration to be performed on bipartite graphs with even tens of millions of vertices. By contrast, identifying two-hop neighbors in a distributed computing environment often results in a considerable volume of unnecessary network traffic between computing nodes. As such, methods according to embodiments scale more effectively to large-scale bipartite graphs than current state-of-the-art methods, and consequently improve computing systems and distributed computing system. In the experiments described below, methods according to embodiments were implemented on top of Spark [36] in Java 8 (1.8.0_361). Such methods were performed using an eight node computing cluster. Each node had Ubuntu 23.04 installed on top of an Intel Xeon Silver 4214 CPU and 128 GB of DDR4 memory. The experiments were divided into two parts and were running on groups of computing nodes comprising 1, 2, 4, and 8 nodes.

Table 2 in FIG. 15 summarizes the datasets used to perform these experiments. These datasets are public datasets selected from KONECT [1] and represent bipartite graphs. Table 2 summarizes the category of each dataset and indicates the number of vertices on the left and right sides of each bipartite graph, as well as the number of edges in each bipartite graph. Additionally, Table 2 indicates the number of wedges in each bipartite graph. Trackers-trackers has a high number of wedges, indicating a dense network structure, and flickr and dbtropes-feature have a high number of edges and wedges relative to the number of vertices, suggesting that these networks are highly interconnected.

Table 3 in FIG. 16 summarizes the results of experiments performed using an exact 2×2-biclique counting method like the methods described above with reference to FIGS. 3A-3C and 4. Each executor was configured with 25 GB memory, 5 cores, and 100 GB of virtual memory. As indicated by Table 3, as the number of computing nodes increases, the execution time for butterfly counting generally decreases for all datasets. For example, the actor-movie dataset's processing time decreased from 17.668 seconds for a single node to 3.85 seconds with eight nodes. Larger datasets such as orkut and livejournal showed a larger reduction in execution time, reducing from several thousand seconds on one machine to under a thousand seconds on eight machines. This highlights the effectiveness of the distributed cluster in handling large-scale data.

Table 4 in FIG. 17 summarizes the results of experiments performed using a per-vertex 2×2-biclique counting method like the methods described above with reference to FIGS. 5A-5B and 6. As indicated by Table 4, across all datasets, there is a consistent reduction in execution time as the number of nodes increases, indicating that methods according to embodiments scale efficiently in distributed computing environments. The extent of execution time reduction with additional computing nodes varies between different datasets, which could be attributed to different dataset characteristics such as graph size, structure, and complexity of the per-vertex counting task. Datasets like dbtropes-feature and flickr exhibit significant time reduction, indicating a higher computational demand satisfied by increased parallelism. For some of the data sets, the reduction in execution time approached a linear speedup.

Table 5 in FIG. 18 summarizes the results of experiments performed using a per-edge 2×2-biclique counting method, e.g., like the methods described above with reference to FIGS. 7A-7B and 8. As indicated by Table 5, there is a decrease in execution time as the number of computing nodes increases. As an example, the time it took to count the number of 2×2-bicliques per edge in the actor-movie dataset decreases from 24.497 seconds on a single node to 4.772 seconds on 8 nodes, demonstrating the benefits of parallel processing. Larger and more complex datasets such as orkut and livejournal exhibit higher execution times overall, but also show substantial reductions as the computing node count increased. This indicates that while more complex computations require more time, they benefit significantly from distributed processing. Datasets like dbtropes-feature, flickr, and bookcrossing_rating have more substantial reductions in execution time compared to datasets like dbpedia-writer and dbpedia-recordlabel, suggesting different levels of complexity and parallelizability. For some datasets, execution time decreased almost linearly with an increasing number of computing nodes.

Table 6 in FIG. 19 summarizes the results of experiments performed using a 2×2-biclique enumeration method, e.g., like the methods described above with reference to FIGS. 9A-9B and 10. As indicated by Table 6, there is a decrease in execution time for all datasets as the number of nodes increases, illustrating the effectiveness of distributed computing in handling computationally intensive tasks like 2×2-biclique enumeration. Large datasets, such as orkut and livejournal, benefit greatly from the distributed approach, with execution times reducing as more computing nodes are utilized. This trend emphasizes the advantages of parallel processing in managing large-scale data. The extent of execution time reduction varied between datasets, indicating that the characteristics of the bipartite graphs (such as size, density, and structure) influence how efficiently the tasks can be parallelized. For example, dbtropes-feature and flickr show large reductions in execution time, indicating a high degree of parallelizability. Increasing the number of computing nodes sometimes resulted in a near-linear speedup, especially for larger datasets.

As described further above, methods according to embodiments achieve superior scalability and performance by using first-hop neighbor information, as opposed to two-hop neighbor information used in current state-of-the-art 2×2-biclique counting and enumeration methods. These results are validated by the experiments described above, which were performed on real-world bipartite graphs, and which cover different 2×2-biclique quantification methods, such as exact 2×2-biclique counting, per-vertex 2×2-biclique counting, per-edge 2×2-biclique counting, and 2×2-biclique enumeration. Many existing methods cannot complete these 2×2-biclique quantification tasks on the data sets used in the experiments above, as they do not scale efficiently with large-scale bipartite graphs. Although direct benchmarking is difficult, methods according to embodiments are faster than both baseline BFC-IBS and BFC-VPS methods for butterfly counting tasks on large-scale bipartite graphs.

IX. COMPUTER SYSTEM

Figure 20:
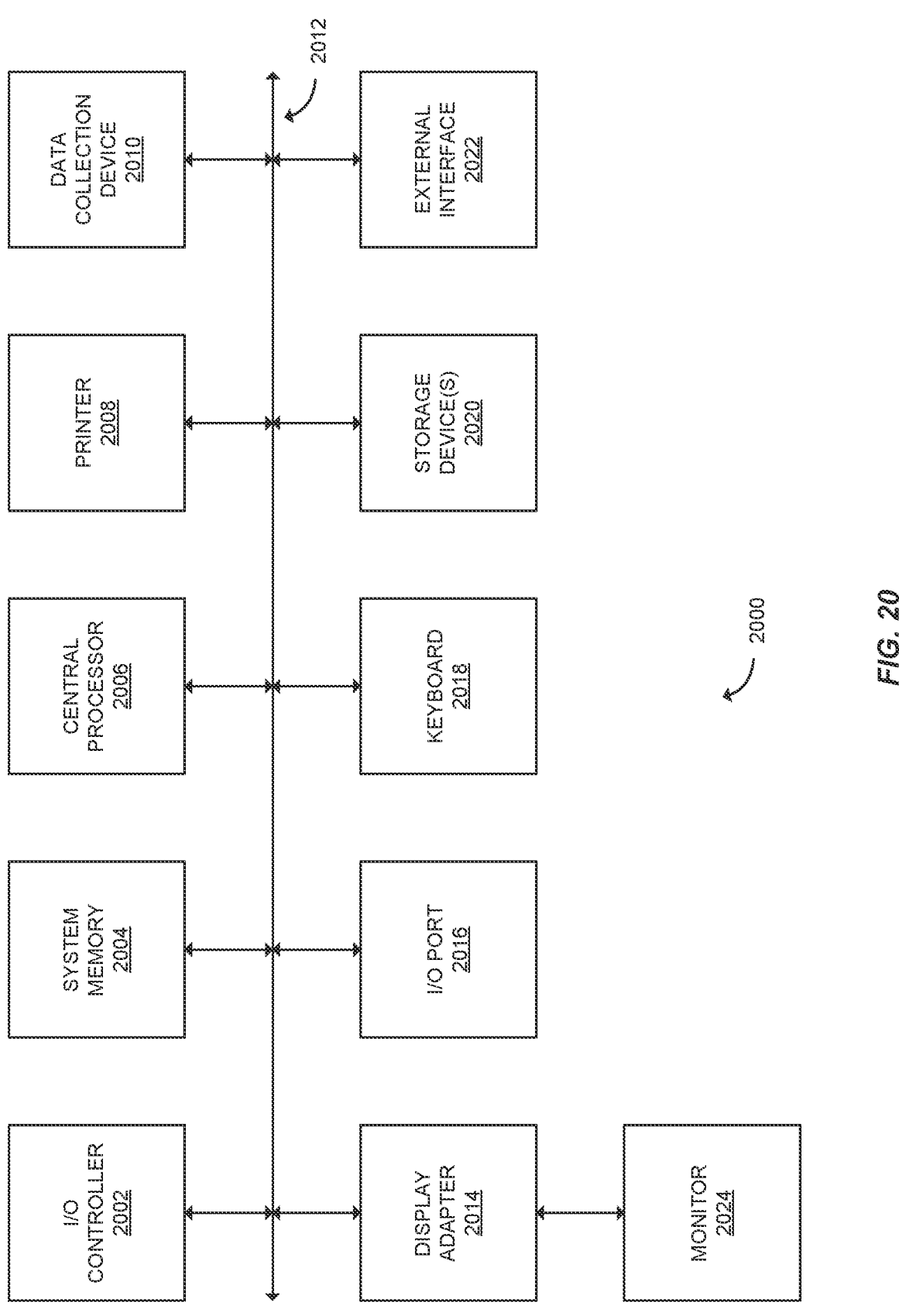
FIG. 20 shows an exemplary computer system according to some embodiments of the present disclosure.

Any of the computer systems mentioned herein may utilize any suitable number of subsystems. Examples of such subsystems are shown in FIG. 20 in computer system 2000. In some embodiments, a computer system includes a single computer apparatus and the subsystems can be the components of the computer apparatus. In other embodiments, a computer system can include multiple computer apparatuses, each being a subsystem with internal components. Examples of computer systems include desktop and laptop computers, server computers, distributed computing systems (e.g., computing clusters), tablets, mobile phones and other mobile devices.

The subsystems shown in FIG. 20 are interconnected via a system bus 2012. Additional subsystems such as a printer 2008, keyboard 2018, storage device(s) 2020, monitor 2024 (e.g., a display screen, such as an LED), which is coupled to display adapter 2014, and others are shown. Peripherals and input/output (I/O) devices, which couple to I/O controller 2002, can be connected to the computer system by any number of means known in the art such as input/output (I/O) port 2016 (e.g., USB, Fire Wire®). For example, I/O port 2016 or external interface 2022 (e.g. Ethernet, Wi-Fi, etc.) can be used to connect computer system 2000 to a wide area network such as the Internet, a mouse input device, or a scanner. The interconnection via system bus 2012 allows the central processor 2006 to communicate with each subsystem and to control the execution of a plurality of instructions from system memory 2004 or the storage device(s) 2020 (e.g., a fixed disk, such as a hard drive, or optical disk), as well as the exchange of information between subsystems. The system memory 2004 and/or the storage device(s) 2020 may embody a computer readable medium. Such a computer readable medium can store or otherwise comprise code or instructions, executable by central processor 2006 to implement some of the methods described herein. Another subsystem is a data collection device 2010, such as a camera, microphone, accelerometer, and the like. Any of the data mentioned herein can be output from one component to another component and can be output to the user.

A computer system can include a plurality of the same components or subsystems, e.g., connected together by external interface 2022, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

X. REFERENCES

[1] [n.d.]. konect.cc

[2] Aman Abidi, Rui Zhou, Lu Chen, and Chengfei Liu. 2020. Pivot-based Maximal Biclique Enumeration. In *IJCAI*. 3558-3564/

[3] Jay A Acosta, Tze Meng Low, and Devangi N Parikh. 2022. Families of Butterfly Counting Algorithms for Bipartite Graphs. In 2022 *IEEE International Parallel and Distributed Processing Symposium Workshops (IP-DPSW)*. IEEE, 304-313.

[4] Xinwei Cai, Xiangyu Ke, Kai Wang, Lu Chen, Tianming Zhang, Qing Liu, and Yunjun Gao. 2023. Efficient Temporal Butterfly Counting and Enumeration on Temporal Bipartite Graphs. *arXiv preprint arXiv: 2306.00893* (2023).

[5] Jihong Chen, Wei Chen, Jinjing Huang, Jinhua Fang, Zhixu Li, An Liu, and Lei Zhao. 2020. Co-purchaser recommendation for online group buying. *Data Science and Engineering* 5 (2020), 280-292.

[6] Lu Chen, Chengfei Liu, Rui Zhou, Jiajie Xu, and Jianxin Li. 2021. Efficient Exact Algorithms for Maximum Balance Biclique Search in Bipartite Graphs. In *Proceedings of the 2021 International Conference on Management of Data* (Virtual Event, China) (SIGMOD '21). Association for Computing Machinery, New York, NY, USA, 248-260. doi.org/10.1145/3448016.3459241

[7] Lu Chen, Chengfei Liu, Rui Zhou, Jiajie Xu, and Jianxin Li. 2022. Efficient maximal biclique enumeration for large sparse bipartite graphs. *Proceedings of the VLDB Endowment* 15, 8 (2022), 1559-1571.

[8] Norishige Chiba and Takao Nishizeki. 1985. Arboricity and subgraph listing algorithms. *SIAM Journal on computing* 14, 1 (1985), 210-223.

[9] Maximilien Danisch, Oana Balalau, and Mauro Sozio. 2018. Listing k-cliques in sparse real-world graphs. In *Proceedings of the* 2018 *World Wide Web Conference*. 589-598.

[10] Tyler Derr, Cassidy Johnson, Yi Chang, and Jiliang Tang. 2019. Balance in signed bipartite networks. In *Proceedings of the 28th ACM International Conference on Information and Knowledge Management*. 1221-1230

[11] Zhongqiang Gao, Chuanqi Cheng, Yanwei Yu, Lei Cao, Chao Huang, and Junyu Dong. 2022. Scalable motif counting for large-scale temporal graphs. In 2022 *IEEE 38th International Conference on Data Engineering (ICDE)*. IEEE, 2659-2668.

[12] Vincent Lacroix, Cristina G Fernandes, and Marie-France Sagot. 2006. *Motif search in graphs: applications to metabolic networks. IEEE/ACM transactions on computational biology and bioinformatics* 3, 4 (2006), 360-368.

[13] Jinyan Li, Guimei Liu, Haiquan li, and Limsoon Wong. 2007. Maximal biclique subgraphs and closed pattern pairs of the adjacency matrix: A one-to-one correspondence and mining algorithms. *IEEE Transactions on Knowledge and Data Engineering* 19, 12 (2007), 1625-1637.

[14] Zhe Pan, Shuibing He, Xu Li, Xuechen Zhang, Rui Wang, and Gang Chen. 2023. Efficient Maximal Biclique Enumeration on GPUs. In *Proceedings of the International Conference for High Performance Computing, Networking, Storage and Analysis*. 1-13.

[15] Amrita Pati, Cecilia Vasquez-Robinet, Lenwood S Heath, Ruth Grene, and T M Murali. 2006. XcisClique: analysis of regulatory bicliques. *BMC bioinformatics* 7 (2006), 1-14.

[16] Pedro Ribeiro, Fernando Silva, and Luís Lopes. 2012. Parallel discovery of network motifs. *J. Parallel and Distrib. Comput.* 72, 2 (2012), 144-154.

[17] Loïc Royer, Matthais Reimann, Bill Andreopoulos, and Michael Schroeder. 2008. Unraveling protein networks with power graph analysis. *PLOS computational biology* 4, 7 (2008), e1000108.

[18] Seyed-Vahid Sanei-Mehri, Ahmet Erdem Sariyüce, and Srikanta Tirthapura. 2018. *Butterfly Counting in Bipartite Networks. In Proceedings of the 24th ACM SIGKDD International Conference on Knowledge Discovery & Data Mining* (London, United Kingdom) (*KDD '18*). Association for Computing Machinery, New York, NY, USA, 2150-2159. doi.org/10.1145/3219819.3220097

[19] Ahmet Erdem Sariyüce and Ali Pinar. 2018. Peeling bipartite networks for dense subgraph discovery. In *Proceedings of the Eleventh ACM International Conference on Web Search and Data Mining*. 504-512

[20] Jessica Shi and Julian Shun. 2020. Parallel algorithms for butterfly computations. In *Symposium on Algorithmic Principles of Computer Systems*. SIAM, 16-30.

[21] George M Slota and Kamesh Madduri. 2014. Complex network analysis using parallel approximate motif counting. In 2014 *IEEE 28th International Parallel and Distributed Processing Symposium*. IEEE 405-414.

[22] Xiaoyuan Su and Taghi M Khosgoftaar. 2009. A survey of collaborative filtering techniques. *Advances in artificial intelligence* 2009 (2009).

[23] Renjie Sun, Yanping Wu, Chen Chen, Xiaoyang Wang, Wenjie Zhang, and Xuemin Lin. 2022. Maximal balanced signed biclique enumeration in signed bipartite graphs. In 2022 *IEEE 38th International Conference on Data Engineering (ICDE)*. IEEE, 1887-1899.

[24] Demival Vasquez Filho and Dion R J O'Neale. 2020. Transitivity and degree assortativity explained: The bipartite structure of social networks. *Physical Review E* 101, 5 (2020), 052305.

[25] Changyu Wang, Kevin Chen-Chuan Chang, Pinghui Wang, Tao Qin, and Xiaohong Guan. 2020. Heterogeneous network crawling: Reaching target nodes by motif-guided navigation. *IEEE Transactions on Knowledge and Data Engineering* 34, 9 (2020), 4285-4297.

[26] Jian Wang, Ada Wai-Chee Fu, and James Cheng. 2014. Rectangle counting in large bipartite graphs. In 2014 *IEEE International Congress on Big Data*. IEEE, 17-24.

[27] Kai Wang, Xuemin Lin, Lu Qin, Wenjie Zhang, and Ying Zhang. 2019. Vertex Priority Based Butterfly Counting for Large-Scale Bipartite Networks. *Proc. VLDB Endow.* 12, 10 (June 2019), 1139-1152. doi.org/10.14778/3339490.3339497

[28] Kai Wang, Xuemin Lin, Lu Qin, Wenjie Zhang, and Ying Zhang. 2020. Efficient bitruss decomposition for large-scale bipartite graphs. In 2020 *IEEE 36th International Conference on Data Engineering (ICDE)*. IEEE, 661-672.

[29] Kai Wang, Xuemin Lin, Lu Qin, Wenjie Zhang, and Ying Zhang. 2022. Towards efficient solutions of bitruss decomposition for large-scale bipartite graphs. *The VLDB Journal* 31, 2 (2022), 203-226.

[30] Kai Wang, Wenjie Zhang, Xuemin Lin, Lu Qin, and Alexander Zhou. 2022. Efficient personalized maximum biclique search. In 2022 *IEEE 38th International Conference on Data Engineering (ICDE)*. IEEE 498-511.

[31] Tongfeng Weng, Xu Zhou, Kenli Li, Kian-Lee Tan, and Keqin Li. 2022. Distributed approaches to butterfly analysis on large dynamic bipartite graphs. *IEEE Transactions on Parallel and Distributed System* 34, 2 (2022), 431-445.

[32] Qingyu Xu, Feng Zhang, Zhiming Yao, Lv Lu, Xiaoyong Du, Dong Deng, and Bingsheng He. 2022. Efficient load-balanced butterfly counting on GPU. *Proceedings of the VLDB Endowment* 15, 11 (2022), 2450-2462.

[32] Jianye Yang, Yun Peng, Dian Ouyang, Wenjin Zhang, Xuemin Lin, and Xiang Zhao. 2023. (p,q)-biclique counting and enumeration for large sparse bipartite graphs. *The VLDB Journal* (2023), 1-25.

[34] Jianye Yang, Yun Peng, and Wenjie Zhang. 2021. (p,q)-biclique counting and enumeration for large sparse bipartite graphs. *Proceedings of the VLDB Endowment* 15, 2 (2021), 141-153.

[35] Yixin Yang, Yixiang Fang, Maria E Orlowska, Wenjie Zhang, and Xuemin Lin. 2021. Efficient bi-triangle counting for large bipartite networks. *Proceedings of the VLDB Endowment* 14, 6 (2021), 984-996.

[36] Matei Zaharia, Mosharaf Chowdhury, Michael J Franklin, Scott Shenker, and Ion Stoica. 2010. Spark: Cluster computing with working sets. In 2^{nd} *USENIX Workshop on Hot Topics in Cloud Computing* (HotCloud 10).

[37] Fangyuan Zhang, Dechuang Chen, Sibo Wang, Yin Yang, and Junhao Gan. 2023. Scalable Approximate Butterfly and Bi-triangle Counting for Large Bipartite Networks. *Proceedings of the ACM on Management of Data* 1, 4 (2023), 1-26.

[38] Lili Zhang, Jennifer Priestley, Joseph DeMaio, Sherry Ni, and Xiaoguang Tian. 2021. Measuring customer similarity and identifying cross-selling products by community detection. *Big data* 9, 2 (2021), 132-143.

[39] Alexander Zhou, Yue Wang, and Lei Chen. 2023. Butterfly counting and bitruss decomposition on uncertain bipartite graphs. *The VLDB Journal* (2023), 1-24.

What is claimed is:

1. A method performed by a computer system for quantifying interactions between two data types in a database, the interactions forming 2×2-biclique subgraphs in a bipartite graph comprising a plurality of left vertices, each corresponding to a data object of a first data type, and a plurality of right vertices, each corresponding to a data object of a second data type, wherein the plurality of left vertices are connected to the plurality of right vertices by a plurality of edges, the method comprising:

receiving a request to quantify the interactions between data objects of the first data type and the second data type in the database;

executing, for each left vertex in the plurality of left vertices, in parallel and independently from other left vertices of the plurality of left vertices:

determining a plurality of neighbor vertices of the left vertex in the plurality of right vertices, wherein a neighbor vertex corresponds to a data object of the second data type that the database indicates has interacted with a data object of the first data type corresponding to the left vertex;

determining one or more pairs of neighbor vertices of the plurality of neighbor vertices by enumerating through each two-element subset of the plurality of neighbor vertices, wherein the one or more pairs of neighbor vertices comprise one or more two-element subsets of neighbor vertices determined via enumeration; and for each pair of neighbor vertices of the one or more pairs of neighbor vertices:

incrementing a pair count corresponding to that pair of neighbor vertices, thereby incrementing one or more pair counts each corresponding to a corresponding pair of neighbor vertices of the one or more pairs of neighbor vertices, and incrementing a 2×2-biclique count based on the pair count; and providing the 2×2-biclique count responsive to the request.

2. The method of claim 1, wherein incrementing the 2×2-biclique count based on the pair count comprises:

determining that the pair count is greater than one;

determining a current value of the 2×2-biclique count; and determining a new value of the 2×2-biclique count by adding the pair count to the current value of the 2×2-biclique count and subtracting one.

3. The method of claim 1, further comprising identifying the plurality of left vertices and the plurality of right vertices by:

identifying a plurality of first vertices and a plurality of second vertices in the bipartite graph, wherein the plurality of first vertices comprise one of the plurality of left vertices and the plurality of right vertices, and wherein the plurality of second vertices comprise the other of the plurality of left vertices and the plurality of right vertices;

determining a first sum of degree squared corresponding to the plurality of first vertices;

determining a second sum of degree squared corresponding to the plurality of second vertices; and identifying the plurality of left vertices and the plurality of right vertices by comparing the first sum of degree squared to the second sum of degree squared, wherein:

the plurality of left vertices comprise the plurality of first vertices if the first sum of degree squared is less than or equal to the second sum of degree squared, and the plurality of left vertices comprise the plurality of second vertices if the first sum of degree squared is greater than the second sum of degree squared.

4. The method of claim 1, further comprising initializing a hash table used to store a plurality of pair counts associated with a plurality of pairs of neighbor vertices, and wherein incrementing the pair count associated with that pair of neighbor vertices comprises incrementing a pair count record in the hash table identified by indexing the hash table using a hash of that pair of neighbor vertices.

5. The method of claim 4, wherein the hash of that pair of neighbor vertices is order invariant with respect to an order of that pair of neighbor vertices.

6. The method of claim 1, wherein the plurality of left vertices correspond to a first plurality of rows in a first column in a data table, wherein the plurality of right vertices correspond to plurality of rows in a second column in the data table, and wherein the data table is stored in the database.

7. The method of claim 6, wherein the database comprises a relational database, and wherein the method is implemented as a query on the relational database.

8. The method of claim 7, wherein the query is implemented using a Structured Query Language (SQL).

9. The method of claim 1, wherein:

the plurality of left vertices correspond to a plurality of users;

a plurality of data objects of the first data type comprise user data corresponding to the plurality of users;

the plurality of right vertices correspond to a plurality of resource providers;

a plurality of data objects of the second data type comprise resource provider data records corresponding to the plurality of resource providers; and the plurality of edges correspond to a plurality of interactions between the plurality of users and the plurality of resource providers.

10. The method of claim 9, wherein:

the plurality of users comprise a plurality of cardholders;

the plurality of resource providers comprise a plurality of merchants; and the plurality of interactions comprise a plurality of credit card transactions between the plurality of cardholders and the plurality of merchants.

11. The method of claim 1, wherein the computer system comprises a distributed computing system comprising a plurality of computing nodes, wherein:

determining one or more pairs of neighbor vertices of the plurality of neighbor vertices for each left vertex comprises:

determining a plurality of left vertex subsets from the plurality of left vertices;

assigning the plurality of left vertex subsets to the plurality of computing nodes, and determining, using each computing node, a corresponding one or more pairs of neighbor vertices based on a corresponding left vertex subset, thereby determining a plurality of pairs of neighbor vertices, wherein the one or more neighbor vertices comprise the plurality of pairs of neighbor vertices; and wherein incrementing each pair count associated with each pair of neighbor vertices comprises incrementing each pair count using a computing node assigned to a left vertex subset corresponding to that pair of neighbor vertices.

12. A method performed by a computer system for quantifying interactions between two data types in a database, the interactions forming 2×2-biclique subgraphs in a bipartite graph, wherein the bipartite graph comprises a plurality of left vertices, each corresponding to a data object of a first data type, and a plurality of right vertices, each corresponding to a data object of a second data type, wherein the plurality of left vertices are connected to the plurality of right vertices by a plurality of edges, and wherein the method comprises:

receiving a request to quantify the interactions between data objects of the first data type and the second data type in the database;

determining a plurality of pair counts and a left vertex list by performing, for each left vertex in the plurality of left vertices:

determining a plurality of neighbor vertices in the plurality of right vertices, wherein a neighbor vertex corresponds to a data object of the second data type that the database indicates has interacted with a data object of the first data type corresponding to the left vertex, determining one or more pairs of neighbor vertices of the plurality of neighbor vertices by enumerating through each two-element subset of the plurality of neighbor vertices, wherein the one or more pairs of neighbor vertices comprise one or more two-element subsets of neighbor vertices determined via enumeration, and executing, for each pair of neighbor vertices of the one or more pairs of neighbor vertices, in parallel and independently from other left vertices of the plurality of left vertices:

incrementing a pair count of the plurality of pair counts, wherein the pair count corresponds to that pair of neighbor vertices, wherein each pair count thereby corresponds to a corresponding pair of neighbor vertices of the one or more pairs of neighbor vertices, and adding the left vertex to the left vertex list in association with the pair of neighbor vertices;

determining a plurality of 2×2-biclique counts based on the plurality of pair counts and the left vertex list; and providing the plurality of 2×2-biclique counts responsive to the request.

13. The method of claim 12, further comprising:

initializing a pair count hash table used to store a plurality of pair counts associated with a plurality of pairs of neighbor vertices, wherein incrementing the pair count of the plurality of pair counts comprising incrementing a pair count record in the pair count hash table identified by indexing the pair count hash table using a hash of an associated pair of neighbor vertices; and initializing a left vertex list hash table used to store a plurality of left vertex identifiers corresponding to the plurality of left vertices, wherein adding the left vertex to the left vertex list in association with the pair of neighbor vertices comprises adding a left vertex identifier to the left vertex list hash table by indexing the left vertex list hash table using a hash of the associated pair of neighbor vertices.

14. The method of claim 12, wherein the plurality of 2×2-biclique counts comprises a plurality of vertex 2×2-biclique counts corresponding to a plurality of vertices in the bipartite graph.

15. The method of claim 14, wherein the plurality of vertex 2×2-biclique counts comprises one or more first vertex 2×2-biclique counts, one or more second vertex 2×2-biclique counts, and a plurality of common neighbor vertex 2×2-biclique counts, and wherein determining the plurality of 2×2-biclique counts comprises, for each pair of neighbor vertices comprising a first vertex and a second vertex of a plurality of pairs of neighbor vertices corresponding to the plurality of pair counts:

determining a binomial coefficient of a pair count corresponding to the pair of neighbor vertices and two;

adding the binomial coefficient to a corresponding first vertex 2×2-biclique count of the one or more corresponding first vertex 2×2-biclique counts, wherein the corresponding first vertex 2×2-biclique count corresponds to the first vertex;

adding the binomial coefficient to a corresponding second vertex 2×2-biclique count of the one or more corresponding second vertex 2×2-biclique counts, wherein the corresponding second vertex 2×2-biclique count corresponds to the second vertex;

determining one or more common neighbor vertices using the pair of neighbor vertices and the left vertex list; and for each common neighbor vertex of the one or more common neighbor vertices, adding the binomial coefficient to a corresponding common neighbor vertex 2×2-biclique count of the plurality of common neighbor vertex 2×2-biclique counts.

16. The method of claim 12, wherein the plurality of 2×2-biclique counts comprises a plurality of edge 2×2-biclique counts corresponding to a plurality of edges in the bipartite graph.

17. The method of claim 16, wherein the plurality of edge 2×2-biclique counts comprises one or more first edge 2×2-biclique counts and one or more second edge 2×2-biclique counts, and wherein determining the plurality of edge 2×2-biclique counts based on the plurality of pair counts and the left vertex list comprises, for each pair of neighbor vertices comprising a first vertex and a second vertex, of a plurality of neighbor vertices corresponding to the plurality of pair counts:

determining one or more common neighbor vertices of the pair of neighbor vertices using the left vertex list; and for each common neighbor vertex of the one or more common neighbor vertices:

determining a first edge corresponding to the common neighbor vertex and the first vertex, increasing a first edge 2×2-biclique count of the one or more first edge 2×2-biclique counts corresponding to the first edge by adding a pair count corresponding to the pair of neighbor vertices to the first edge 2×2-biclique count and subtracting one, determining a second edge corresponding to the common neighbor vertex and the second vertex, and increasing a second edge 2×2-biclique count of the one or more second edge 2×2-biclique counts corresponding to the second edge by adding the pair count corresponding to the pair of neighbor vertices to the second edge 2×2-biclique count and subtracting one.

18. A method performed by a computer system for quantifying interactions between two data types in a database, the interactions forming 2×2-biclique subgraphs in a bipartite graph comprising a plurality of left vertices, each corresponding to a data object of a first data type, and a plurality of right vertices, each corresponding to a data object of a second data type, wherein the plurality of left vertices are connected to the plurality of right vertices by a plurality of edges, the method comprising:

receiving a request to quantify the interactions between data objects of the first data type and the second data type in the database;

executing, for each left vertex in the plurality of left vertices, in parallel and independently from other left vertices of the plurality of left vertices:

determining a plurality of neighbor vertices of the left vertex in the plurality of right vertices, wherein a neighbor vertex corresponds to a data object of the second data type that the database indicates has interacted with a data object of the first data type corresponding to the left vertex, determining one or more pairs of neighbor vertices of the plurality of neighbor vertices by enumerating through each two-element subset of the plurality of neighbor vertices, wherein the one or more pairs of neighbor vertices comprise one or more two element-subsets of neighbor vertices determined via enumeration, for each pair of neighbor vertices of the one or more pairs of neighbor vertices, adding the left vertex to a left vertex list in association with the pair of neighbor vertices, thereby recording a correspondence between each pair of neighbor vertices and the left vertex in the left vertex;

determining a plurality of 2×2-biclique subgraphs based on the left vertex list; and providing the plurality of 2×2-biclique subgraphs responsive to the request.

19. The method of claim 18, wherein determining the plurality of 2×2-biclique subgraphs based on the left vertex list comprises, for each pair of neighbor vertices of a plurality of neighbor vertices corresponding to the left vertex list:

determining one or more left pairs of vertices corresponding to the pair of neighbor vertices using the left vertex list; and for each left pair of vertices of the one or more left pairs of vertices:

determining a 2×2-biclique subgraph of the plurality of 2×2-biclique subgraphs comprising the left pair of vertices and the pair of neighbor vertices.

20. The method of claim 1, wherein the bipartite graph comprises at least one hundred thousand vertices.

* * * * *